United States Patent
Kernan et al.

(10) Patent No.: US 7,250,134 B2
(45) Date of Patent: *Jul. 31, 2007

(54) INFILTRATING A POWDER METAL SKELETON BY A SIMILAR ALLOY WITH DEPRESSED MELTING POINT EXPLOITING A PERSISTENT LIQUID PHASE AT EQUILIBRIUM, SUITABLE FOR FABRICATING STEEL PARTS

(75) Inventors: Brian D. Kernan, Arlington, MA (US); Emanuel M. Sachs, Newton, MA (US); Samuel M. Allen, Jamaica Plain, MA (US); Adam M. Lorenz, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 489 days.

This patent is subject to a terminal disclaimer.

(21) Appl. No.: 10/723,989

(22) Filed: Nov. 26, 2003

(65) Prior Publication Data

US 2005/0109431 A1    May 26, 2005

(51) Int. Cl.
*B22F 3/26* (2006.01)
(52) U.S. Cl. ............................... 419/2; 419/27; 419/32
(58) Field of Classification Search .................... 419/2, 419/32
See application file for complete search history.

(56) References Cited

U.S. PATENT DOCUMENTS 3,652,261 A    3/1972    Taubenblat (Continued)

FOREIGN PATENT DOCUMENTS

WO    WO 01/90427 A1    11/2001

(Continued)

OTHER PUBLICATIONS

Banerjee, S., Oberacker, R., and Goetzel, C., "Experimental Study of Capillary Force Induced Infiltration of Compacted Iron Powders with Cast Iron," Modern Developments in Powder Metallurgy, vol. 16, Metal Powder Industries Federation: Princeton, NJ, pp. 209-244, 1984.

(Continued)

*Primary Examiner*—George P. Wyszomierski
(74) *Attorney, Agent, or Firm*—Steven J. Weissburg

(57) ABSTRACT

A steel powder metal skeleton is infiltrated with an infiltrant composition similar to the skeleton, with an additional agent that depresses the melting point of the infiltrant relative to the skeleton. Infiltration is driven primarily by capillary pressure. The powder and infiltrant compositions differ primarily only in a higher concentration of a melting point depressant agent "MPD" in the infiltrant. Carbon (C) and silicon (Si) and several other elements can be elements in an MPD, either alone or in combination. Certain steel target compositions are such that a complementary infiltrant, and skeleton can be chosen such that a skeleton will remain solid at an infiltration temperature at which the infiltrant can be melted and fully infiltrated, and further where there is a persistent two phase field, with a liquid phase that is large enough (greater than 7% vol, and typically between 20 and 40 vol %) so that flow can be maintained without choke off from diffusional solidification. The solid and the liquid phases remaining after any diffusional solidification have different compositions, with a bulk composition of the target. Typically the difference is slight, and the full part is substantially homogeneous. Heat treating, such as austenitizing, quenching, or slow cooling and tempering, can improve homogeneity and mechanical properties. The MPD can have a relatively high diffusivity and solubility in the skeleton. Methods of designing systems of target, skeleton and infiltrant compositions and infiltration temperature are disclosed.

43 Claims, 22 Drawing Sheets

U.S. PATENT DOCUMENTS

| | | | |
|---|---|---|---|
| 4,286,987 | A | 9/1981 | Matthews |
| 4,327,156 | A | 4/1982 | Dillon et al. |
| 4,455,354 | A | 6/1984 | Dillon et al. |
| 4,478,638 | A | 10/1984 | Smith, Jr. et al. |
| 4,710,273 | A | 12/1987 | Okamoto |
| 4,964,908 | A | 10/1990 | Greetham et al. |
| 4,971,755 | A | 11/1990 | Kawano et al. |
| 5,204,055 | A | 4/1993 | Sachs et al. |
| 5,236,032 | A | 8/1993 | Nukami et al. |
| 5,509,555 | A | 4/1996 | Chiang et al. |
| 5,745,834 | A | 4/1998 | Bampton et al. |
| 5,791,397 | A | 8/1998 | Suzuoki et al. |
| 5,848,349 | A | 12/1998 | Newkirk et al. |
| 6,508,980 | B1 | 1/2003 | Sachs et al. |
| 6,719,948 | B2 | 4/2004 | Lorenz et al. |
| 7,060,222 | B2 * | 6/2006 | Sachs et al. .................. 419/27 |
| 2004/0009086 | A1 | 1/2004 | Lorenz et al. |

FOREIGN PATENT DOCUMENTS

WO     WO 02/094484 A1    11/2002

OTHER PUBLICATIONS

Carman, C., Flow of gases through porous media. Butterworths: London, pp. 8-13, 1956.

Goetzel, Claus G., "Infiltration," ASM Handbook, vol. 7, Powder Metallurgy, pp. 551-566, 1984.

Langford, George, "High Speed Steel made by Liquid Infiltration," Materials Science and Engineering, 28, pp. 275-284, 1977.

Langford, George and Cunningham, Robert E., "Steel Casting by Diffusion Solidification", Metallurgical Transactions B, vol. 9B, pp. 5-19, Mar. 1978.

Lorenz, A., "Transient Liquid-Phase Infiltration of Powder-Metal Skeleton," submitted to the Massachusetts Institute of Technology, Department of Mechanical Engineering, in Jun. of 2002, catalogued on Mar. 13, 2003, pp. 1, 2, 4, 5, 92-101, 113, 114.

Lorenz, A., Sachs, E., Allen, S., Rafflenbeul, L. and Kernan, B., "Densification of a Powder-Metal Skeleton by Transient Liquid-Phase Infiltration," Metallurgical and Materials Transactions A, vol. 35A, pp. 631-640, Feb. 2004.

Lorenz, A., Sachs, E. and Allen, S., "Freeze-Off Limits in Transient Liquid Phase Infiltration," Metallurgical and Materials Transactions A, vol. 35A, pp. 641-653, Feb. 2004.

Messner, R. and Chiang, Y., "Liquid-Phase Reaction-Bonding of Silicon Carbide Using Alloyed Silicon-Molybdenum Melts," Journal of the American Ceramic Society, vol. 73, No. 5, pp. 1193-1200, 1990.

Scherer, G., "Theory of Drying," Journal of the American Ceramic Society, vol. 73, No. 1, pp. 3-14, 1990.

Sercombe, T., Loretto M., and Wu, X., "The Production of Improved Rapid Tooling Materials," Advances in Powder Metallurgy and Particulate Materials, pp. 3-25 to 3-36, Proceedings of the 2000 International Conference of Powder Metallurgy and Particulate Materials, May 30-Jun. 3, 2000. Metal Powder Industries Federation: Princeton, NJ.

Tanzilli, R. and Heckel, R., "Numerical Solutions to the Finite, Diffusion-Controlled, Two-Phase, Moving-Interface Problem (with Planar, Cylindrical, and Spherical Interfaces)," Transactions of the Metallurgical Society of AIME, vol. 242, pp. 2313-2321, Nov. 1968.

Thorsen, K., Hanse, S., and Kjaergaard, O., "Infiltration of Sintered Steel with a Near-Eutectic Fe-C-P Alloy," Powder Metallurgy International, vol. 15, No. 2, pp. 91-93, 1983.

Zhuang, H., Chen, J., and Lugscheider, E., "Wide gap brazing of stainless steel with nickel-base brazing alloys," Welding in the World, vol. 24, No. 9/10, pp. 200-208, 1986.

Zhuang, W. and Eagar, T., "Liquid infiltrated powder interlayer bonding: a process for large gap joining," Science and Technology of Welding and Joining, vol. 5, No. 3, pp. 125-134, 2000.

* cited by examiner

D2 60%s/40%l at 1306°C and 70%s/30%l at 1279°C

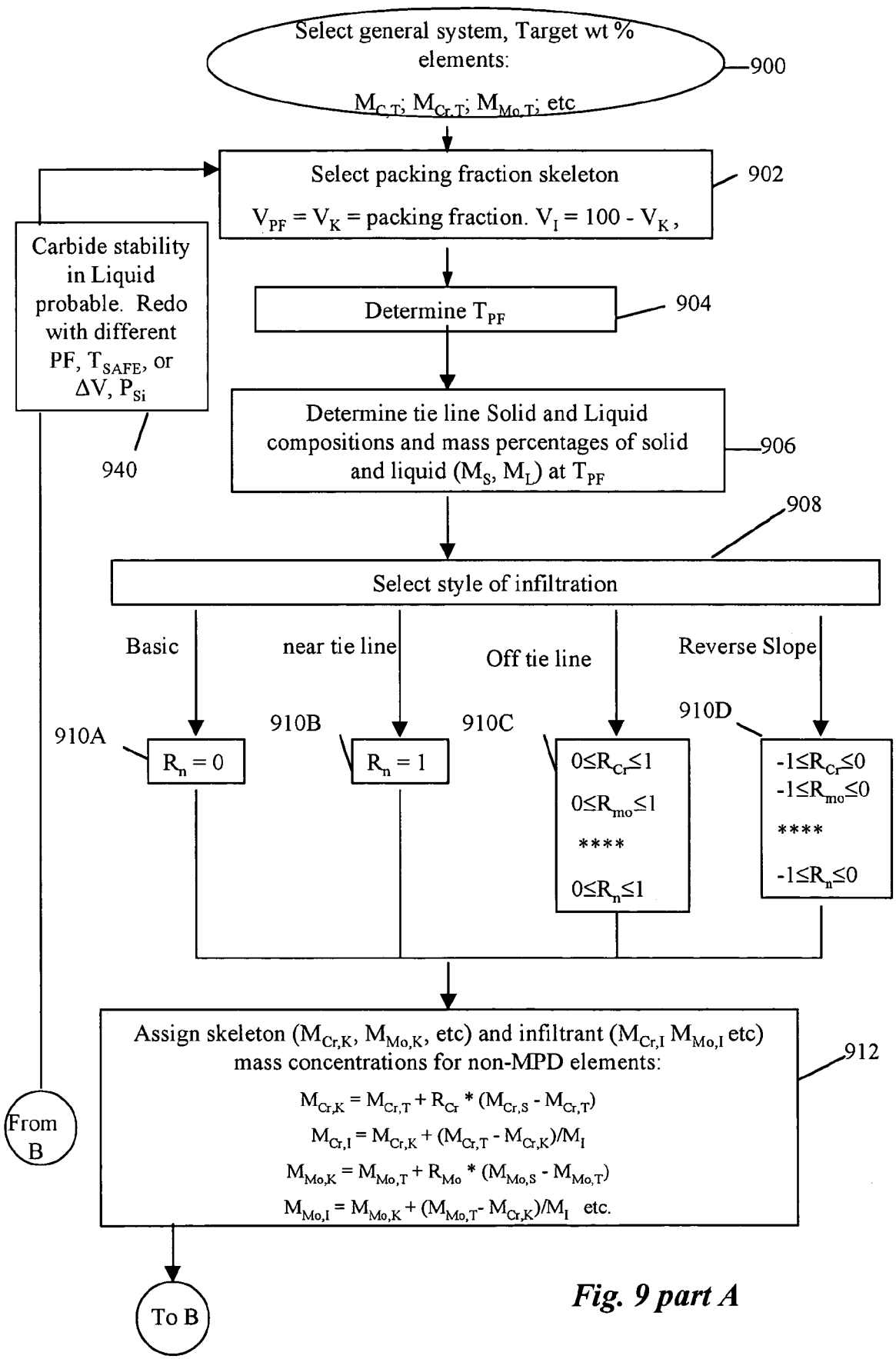
Fig. 9 part A

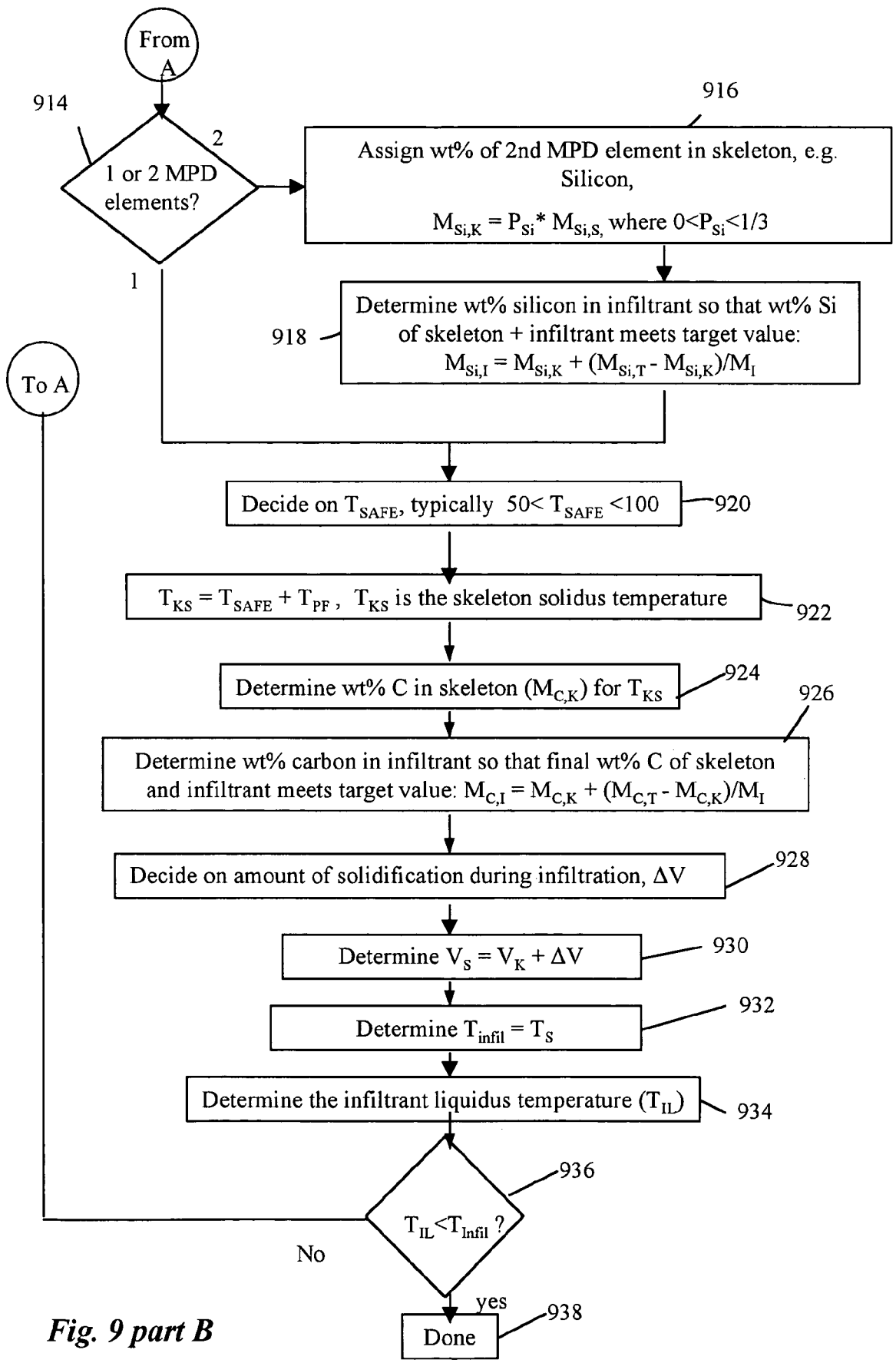
Fig. 9 part B

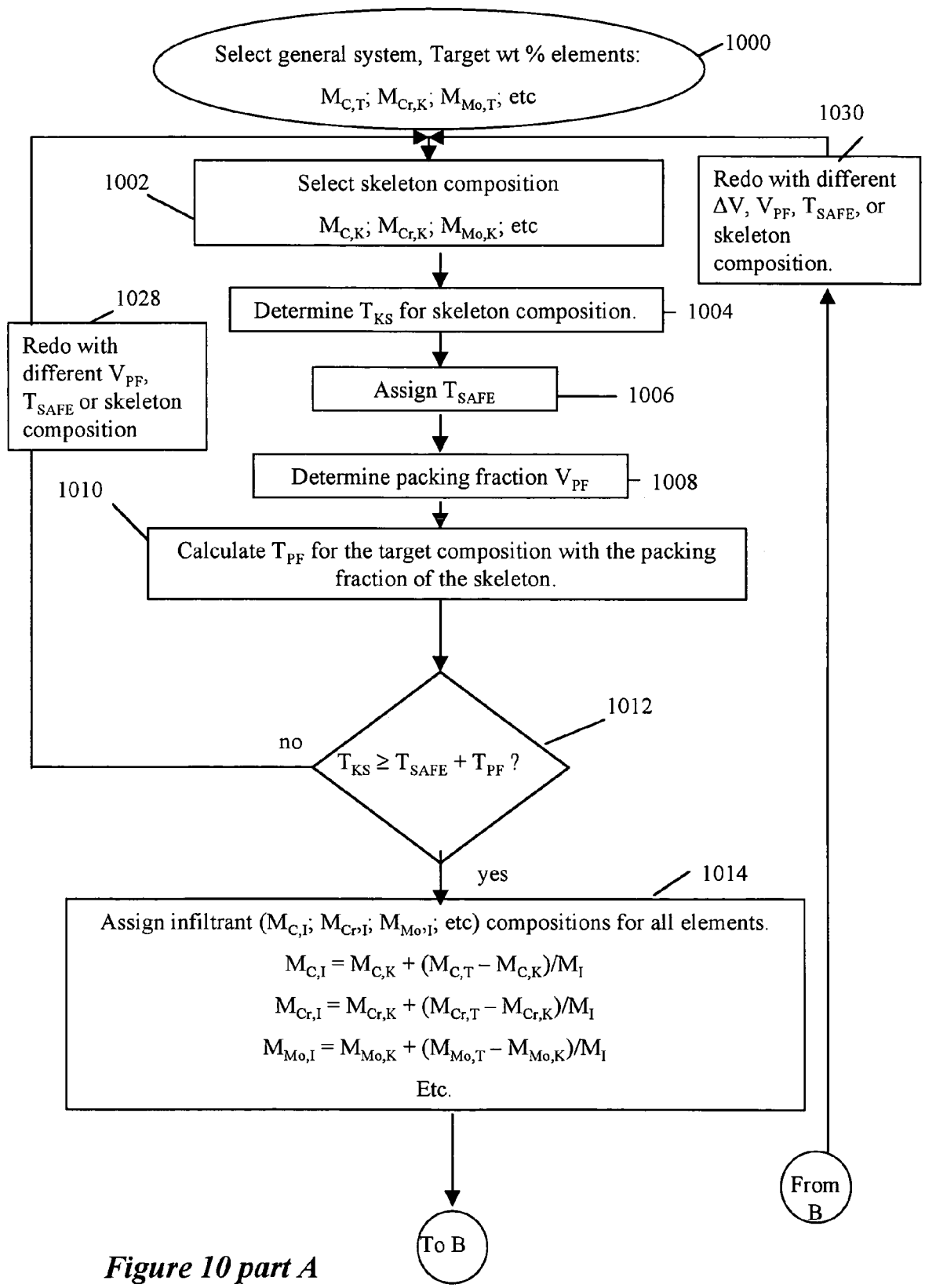
*Figure 10 part A*

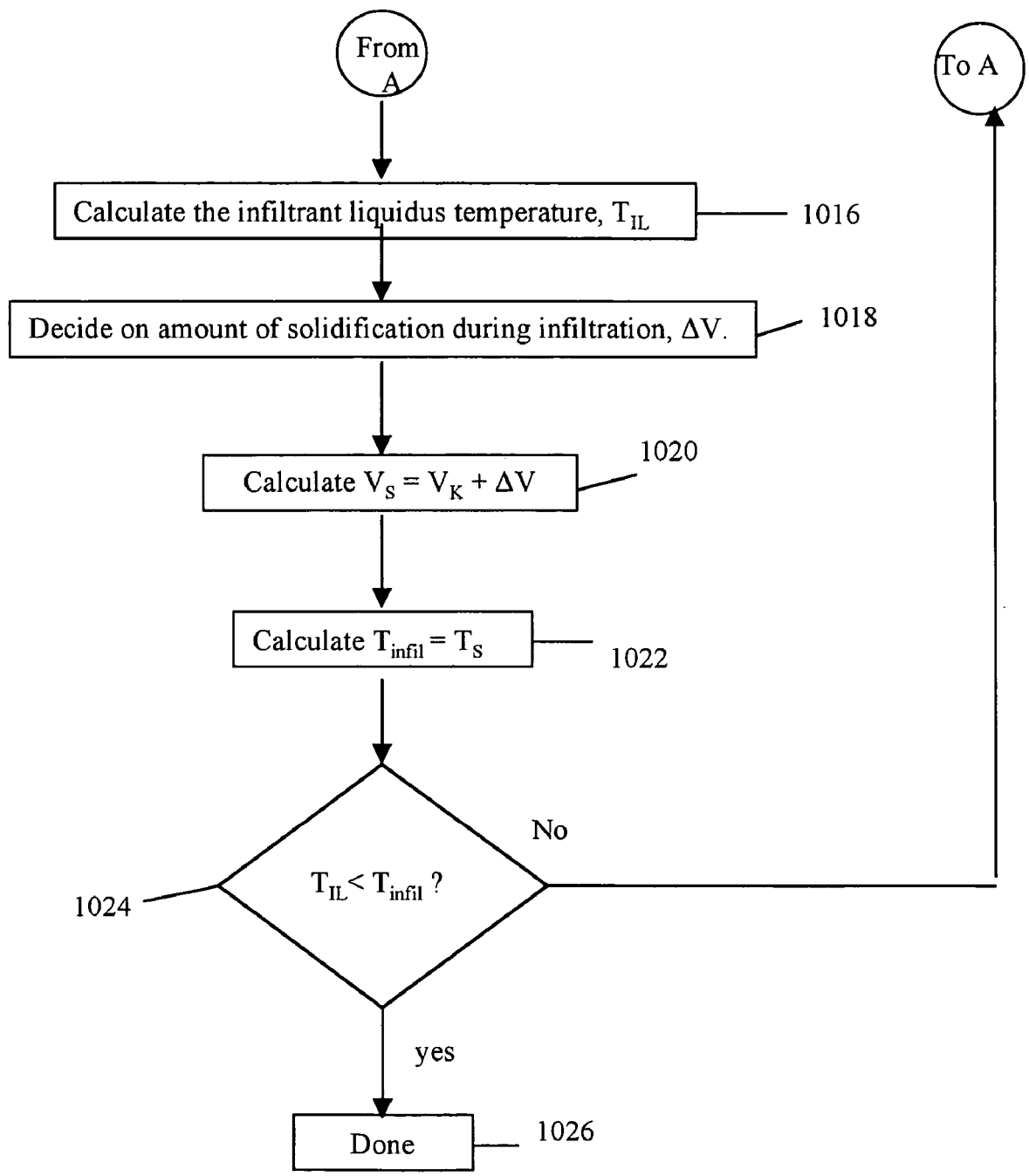
*Figure 10 part B*

D2 at 1279°C 70%s/30%l

D2 60%skel./40%infil. equilibrium 70%s/30%l at 1279°C

*A3 1351°C 60%s/40%l Mo, V function of Cr*

A3 60%s/40%l at 1351°C and 70%s/30%l at 1330°C

Cn-7MS at 1261°C 60%s/40%l

CN-7MS 60%s/40%l

D2 70%s/30%l

Austenitic Manganese Grade C at 1295°C

Austenitic Manganese Steel Grade C

Fe-12Cr-C

INFILTRATING A POWDER METAL SKELETON BY A SIMILAR ALLOY WITH DEPRESSED MELTING POINT EXPLOITING A PERSISTENT LIQUID PHASE AT EQUILIBRIUM, SUITABLE FOR FABRICATING STEEL PARTS

GOVERNMENT RIGHTS

The United States Government has certain rights in this invention pursuant to the Office of Naval Research contract/grant #N00014-99-1-1090.

A partial summary is provided below, preceding the claims.

The inventions disclosed herein will be understood with regard to the following description, appended claims and accompanying drawings, where:

BRIEF DESCRIPTION OF THE DRAWINGS

FIG. 1A—initial, FIG. 1B—half way and FIG. 1C—complete;

FIG. 9 is a schematic flowchart in two parts, A and B, showing steps to design an infiltration system that is generally packing fraction driven, and to infiltrate a skeleton;

FIG. 10 is a schematic flow chart in two parts, A and B, showing steps to design an infiltration system that is generally skeleton composition driven, and to infiltrate such a skeleton;

NOMENCLATURE

Figure 1:
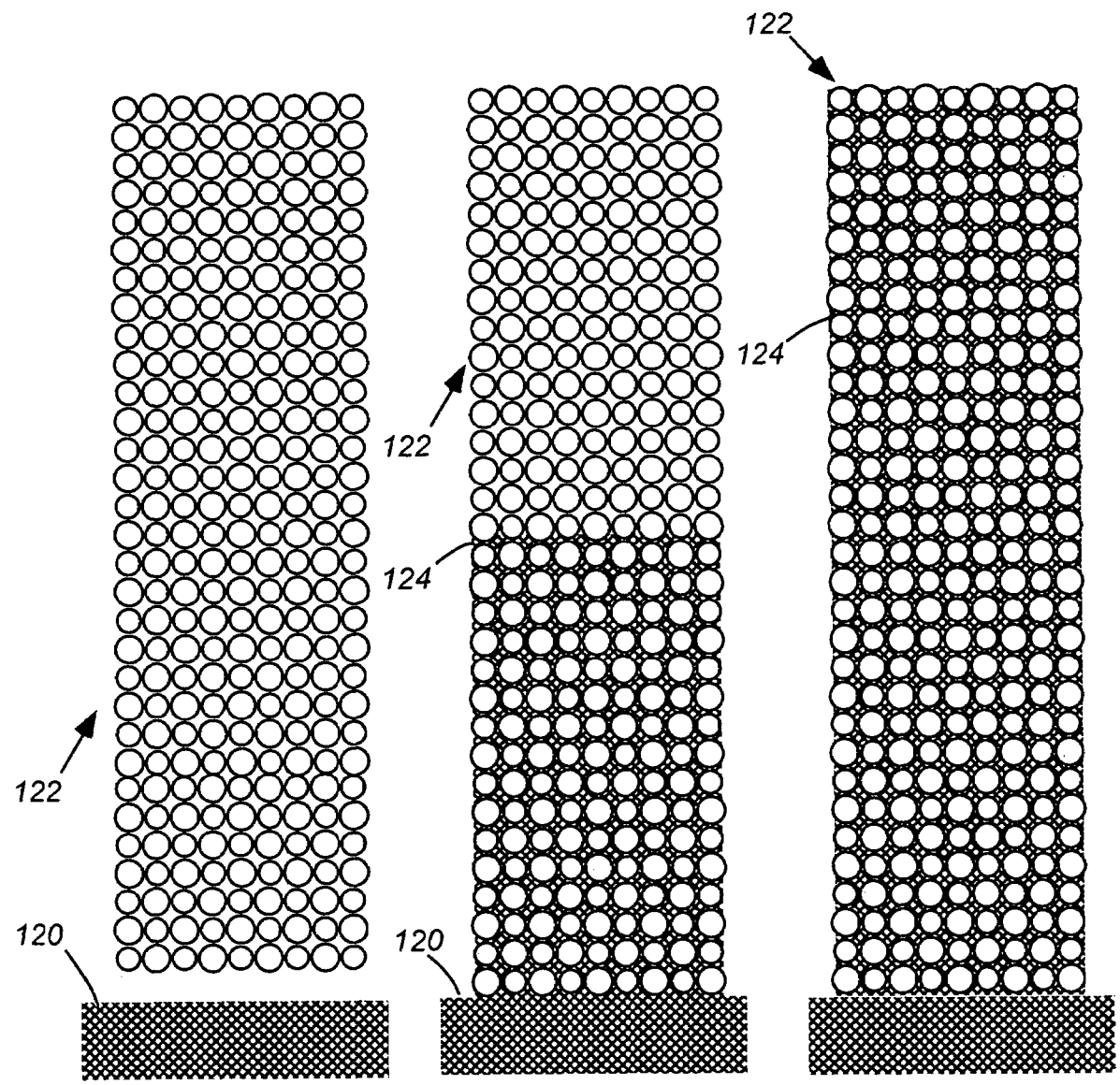
FIGS. 1A, 1B and 1C are a schematic representation of a skeleton of particles being infiltrated, showing three stages of infiltration.

The following symbols and abbreviations are used herein. In many examples and figures, for instance FIG. 9, and the accompanying discussion, carbon (C) is used as the major melting point depressant (MPD) element, silicon (Si) is used as a second MPD element, and chromium (Cr) is used as an example of a typical non-MPD element.

For the target composition:

$M_{Cr,T}$ is mass (or weight) % Cr.

T is target composition.

$M_{MPD-max,T}$ is the maximum concentration of MPD in this target composition, T.

For the solid:

$M_{Cr,S}$ is mass % Cr.

$V_S$ is total volume % solid at the infiltration temperature (60% is typical in most discussions herein).

$$V_S = 100 - V_L.$$

$M_S$ is total mass % solid.

$$M_S = 100 - M_L.$$

A number in the subscript refers to a Mass % solid measured at the volume % specified by the subscript.

$T_{Sxx}$—The temperature where the solid has an equilibrium volume % of xx.

$M_{C-max}$—The maximum amount of carbon that may be dissolved in the single phase base material (normally austenite) at the eutectic temperature.

S—The composition of a solid in equilibrium with the target composition.

For the liquid:

$M_{Cr,L}$ is mass % Cr.

$V_L$ is total volume % liquid (40% is typical in most discussions herein).

$$V_L = 100 - V_S.$$

$M_L$ is total mass % liquid.

$$M_L = 100 - M_S.$$

$T_{Lyy}$—The temperature where the liquid has an equilibrium volume % of yy. When $T_{Sxx}=T_{Lyy}$ then xx+yy=100.

$M_{C-su}$—The amount of carbon present at the eutectic composition.

L—The composition of a liquid in equilibrium with the target composition.

For the skeleton (the k subscript is a mnemonic for the k in the word skeleton):

$M_{Cr,K}$ is mass % Cr.

$M_K$ is mass % solid of skeleton based on the packing fraction of the powder and instantaneous infiltration of Infiltrant.

$$M_K = 100 - M_I.$$

In the instances of no diffusional solidification at the infiltration temperature, $M_K = M_S$. A number (or PF) in the subscript refers to the mass % solid measured at the volume fraction specified by the subscript (or the packing fraction of the skeleton.)

$V_K$ is the volume % of the skeleton, also known as the packing fraction.

$V_{PF} = V_K$.

$T_{KS}$—The solidus temperature of the skeleton composition.

$T_{PF}$—The temperature where the equilibrium solid volume % XX is equal to the packing fraction of the skeleton. If PF=70%, then $T_{PF} = T_{S70}$.

K—The composition of a skeleton in an unspecified style.

KA—The skeleton composition in a basic style.

KB—The skeleton composition in a near tie-line style.

KC—The skeleton composition in an off tie-line style.

KD—The skeleton composition in a reverse slope style.

For the infiltrant:

$M_{Cr,I}$ is mass % Cr.

$M_I$ is mass % infiltrant, based on void fraction of skeleton, assuming instantaneous infiltration of infiltrant.

$$M_I = 100 - M_K.$$

In the instances of no diffusional solidification at infiltration temperature, $M_1 = M_L$.

$V_I$ is the volume fraction of the infiltrant, also known as the void fraction of the skeleton.

$V_{VF} = V_I$.

$T_{IL}$—The liquidus temperature of the infiltrant.

$T_{infil}$—The infiltration temperature.

I—The composition of an infiltrant in an unspecified style.

IA—The infiltrant composition in a basic style.

IB—The infiltrant composition in a near tie line style.

IC—The infiltrant composition in an off tie line style.

ID—The infiltrant composition in a reverse slope style.

Parameter $P_{Si}$ (or $P_C$):

This is the fractional amount of silicon (or carbon) in the skeleton for two MPD elements case, $M_{Si,K} = P_{Si} * M_{Si,S}$.

Typically, $0 < P_{SI} < 1/3$ or $0 < P_C < 1/3$.

Parameter R:

Parameter R is a style parameter. In general, $-1 <= R <= 1$.

For R=0, the basic style method is used. For R=1, the off tie-line style method is used. For 0<R<1, the near tie line style method is used. For −1<R<0 the reverse slope style method is used. For off tie line and reverse slope style methods, a different parameter R may be used for each non-MPD element.

DETAILED DESCRIPTION

Traditional manufacturing processes using powder metallurgy ("PM") without pressing produce a near net shape part which is only initially 50-70% dense. These 'green' parts then undergo further processing to achieve full density and the desired mechanical properties either through lightly sintering and infiltrating with a lower melting temperature alloy or through a high temperature sintering alone. In the first method, the part's dimensional change is typically only ~1% making it suitable for fairly large (~0.5 m on a side) parts, but the resulting material composition will be a heterogeneous mixture of the powder material and the lower melting temperature infiltrant. In the second method, sintering the powder to full density will result in a homogeneous final material, but a part starting at 60% density will undergo ~15% linear shrinkage. For this reason, full-density sintering is typically only used for smaller (<5 cm on a side) parts. (Some of this initial discussion and the immediately following discussion is taken from copending, coassigned U.S. patent application Ser. No. 09/863,073, filed May 21, 2001, in the names of three of the inventors hereof, Lorenz, Sachs and Allen, claiming the benefit of provisional application 60/206,066, filed on May 22, 2000. A corresponding PCT application, No. PCT/US02/15635, was published as WO 02/094484 A1 on Nov. 28, 2002. The full text of all three of which are hereby incorporated by reference completely herein. The published application is referred to herein as the WO 02/094484A1 application. It is explicitly denied that any of these three items constitute prior art, and their mention herein may not be taken as an admission that any of them constitute prior art.)

In some cases, infiltration can be done extremely rapidly by the application of external pressure. However, this requires a mold and typically expensive processing equipment.

The inventions disclosed herein are directed to pressureless infiltration, where the primary driving force for infiltration is capillarity. In some cases, a vacuum pressure is created around both the porous skeleton and the infiltrant source. This vacuum is to remove any gases that might be residing within the skeleton, which could prevent infiltrant from filling the skeleton at the location of the gas. However, there is no pressure difference between that of the infiltrant source and within the skeleton. "Pressureless" or "capillary" infiltration as used herein means such infiltration, without the application of a pressure difference between the infiltrant source and the pore spaces within the skeleton, whether or not a vacuum is applied around both.

FIGS. 1A-1C show such pressureless infiltration at three representative stages. On the left, FIG. 1A, an infiltrant pool 120 is below a porous skeleton 122, which is composed of interconnected, adhered particles. At the moment shown in FIG. 1A, infiltration has not yet begun. As shown in FIG. 1B, the skeleton 122 has been brought into contact with the infiltrant in a pool 120, and infiltrant 124 has been drawn up into the skeleton 122 by capillary forces, about half-way to its top. As shown in FIG. 1C, the infiltrant 124 has been drawn all the way to the top of the skeleton 122, fully infiltrating it.

In many critical applications (structural, aerospace, military), a material of homogeneous composition (or with homogeneous properties) is preferable because of certification issues, corrosion issues, machinability, or temperature limitations that might be imposed by the lower melting point infiltrant. Further, because designers of metal components are not accustomed to working with composites of heterogeneous composition, they experience a psychological barrier to adoption.

Creation of very large parts with homogeneous composition or properties via powder metallurgy extends the benefits of PM processing to very large finished parts. This can be done using an infiltration step to densify the green part without significant dimensional change, but in such a way that the final material has a homogeneous composition or properties to enable significant advantages over traditional powder metal processing. Solid freeform fabrication processes, (such as three-dimensional printing, selective laser sintering, fused deposition modeling, laminated object manufacturing, stereo lithography), metal injection molding, or other PM processes will be enabled to make homogeneous net shape parts in a wide range of sizes by methods described herein. Also disclosed is the potential of matching the final part composition or properties to existing commercial material systems. Principally, many steel alloy systems are very important commercial material systems. Several of these systems can be matched with inventions disclosed herein, where a powder skeleton is infiltrated with a liquid infiltrant of nearly the same composition. The compositions differ such that the melting point of the infiltrant is significantly lower than that of the skeleton, and such that after infiltration and solidification, the bulk composition of the part is approximately the same as a commercial steel.

By three-dimensional printing, it is meant the processes described generally in U.S. Pat. Nos. 5,204,055, 5,387,380, 5,490,882, 5,775,402, which are incorporated herein by reference.

A general concept, explored more fully below, is to use an infiltrant composition similar to that of the powder skeleton, but with the addition of a material such that the melting point of the infiltrant is depressed relative to that of the skeleton. The infiltrant quickly fills the powder skeleton.

It is important to design the infiltrant and skeleton system so that the infiltrant has the chance to fill the entire open pore space of the skeleton before solidification and freeze off takes place. In some systems, there are one or more elements in the infiltrant that diffuse into the skeleton. As they leave the liquid infiltrant, in some cases, the solidification point of the remaining infiltrant increases. Thus, it may be that for constant temperature, the composition of the liquid infiltrant becomes such that it solidifies, because the material that had depressed the melting point has diffused out of the infiltrant. The WO 02/094484A1 publication listed above, describe how a kinetic competition, or a sort of race takes place between infiltration on the one hand, and freeze off due to diffusional solidification on the other hand. If freeze off occurs before complete infiltration, then the part will not be fully infiltrated. That document discusses many aspects of the competition, how to insure that infiltration completes before solidification, and the properties of products made according to those techniques with regard to certain material systems.

The techniques described above are generally referred to herein as transient liquid phase infiltration, or TLI, because the liquid phase, during infiltration, is transient. It does not persist, but rather is transformed to a solid phase, as the MPD diffuses from the liquid phase to the solid phase, and the liquid phase gradually solidifies isothermally.

The WO 02/094484A1 publication discusses systems where infiltration completes, followed by diffusional solidification at the infiltration temperature, resulting in a fully solid part at equilibrium. It also discusses some cases where, even after the part has reached its equilibrium condition at the infiltration temperature, some of the infiltrant in the skeleton will remain liquid after diffusional solidification has ceased. Those cases are referred to generally therein as low solubility cases, because the agents that depress the melting point of the infiltrant, relative to the similar composition of the skeleton, have a relatively low solubility in the skeleton. In some such circumstances, the final microstructure that results is not homogeneous, but rather is similar to that typically obtained with a cast part, which also may be a useful result.

For example, an Aluminum (Al) skeleton can be infused with an infiltrant of an Al and silicon (Si) alloy, which has a lower melting point than pure Al. Pure aluminum has a melting point temperature of ~660° C. Silicon is used extensively in die casting alloys to improve fluidity of the melt. An Al alloy with 12% Si has a melting point of 577° C., resulting in depression of its melting point by about 83° C. from that of pure Al. An aluminum alloy commonly used in die casting of automotive pistons (336.0) contains 12% Si, 2.5% Ni, % 1 Mg, and 1% Cu, and has an even lower melting range with a solidus of 540° C. and a liquidus of 565° C.

There is a window between the temperature at which the infiltrant is liquid (565° C.), and that at which a pure aluminum skeleton will begin to melt (660° C.), since the melting point depression of the infiltrant may be less than 100° C. But, the relatively low operating temperature permits manageable manipulation of the part and the melt within this window.

The diffusivity of silicon in aluminum is $\sim 10^{-12}$ m$^2$/s at 600° C. The maximum solubility of silicon in aluminum is about 1.6% wt, which is relatively low (as compared, for instance, to that of Carbon (C) in iron (Fe)). The low solubility of Si, as an MPD, can lead to some infiltrant remaining liquid, such that the liquid flow in the aluminum skeleton never chokes off from solidification. This is because, if the final (target) bulk composition has an MPD (eg. Si) concentration that is greater than the concentration of the MPD in the solidus (equilibrium solid) composition, the part will only undergo partial diffusional solidification at the infiltration temperature. Solidification is only partial, because it takes relatively little silicon to saturate the aluminum into which it might otherwise diffuse. Thus, there is no excess solubility in the aluminum for more than a small amount of silicon to diffuse into the aluminum skeleton. Therefore, there may result an end product that has higher concentrations of silicon in the regions that had been liquid than the regions that had been solid which may, in some circumstances, be undesireable. Furthermore, it will be impossible to infiltrate a reasonably dense skeleton (e.g. >50% packing fraction) and to achieve a body having a bulk composition with Si concentration >7% for reasons explained below in a discussion regarding solubility. But, most commonly used aluminum and silicon alloys have between about 7 and 15% Si concentration in the bulk composition.

Researchers have understood the usefulness of steel parts, and have attempted to use Carbon as a melting point depressant into iron or pure iron with a few typical steel additives. However, the diffusivity of C in Fe and other steel alloys at a reasonable infiltration temperature (1277° C.) is relatively very high ($\sim 2.4 \times 10^{-6}$ cm$^2$/s) and past pressureless infiltration attempts have met with failure due to freeze-off before infiltration can complete. Infiltration loses the kinetic competition. Some researchers have used pressurized systems to infiltrate a primarily iron skeleton with an iron infiltrant with added carbon to depress the melting point of the infiltrant.

There is a great need for a system that can take advantage of a skeleton made using powder metallurgy techniques, infiltrate that with a suitable infiltrant, and arrive at a finished fully dense part that has a composition that is essentially that of a commercial steel. Further, there is need for such a process that can be driven primarily by capillary forces alone, meaning approximately pressureless conditions. There is great need for such a system with respect to a wide range of commercial steels, including, but not limited to, those tool steels known as D2, M2, T8, O6, H13, A3, and S6, and stainless steels known as 410, 440C, CF-10SMnN, and CN-7MS, HF, and Austenitic Manganese alloys (ASTM A128, grade C), and other steels in the families that include those listed. These designations are as used by ASTM-International, of West Conshohocken, Pa., USA.

The following ASTM International standards set forth the chemical specifications of the alloy types listed: A681 Tool steel alloy—family types H, D A, O and S; A600 High speed tool steel—family types M and T; A781/A784 steel and alloy casting alloys—including types CN-7MS and CF-10SMnN and HF; A276 Austenitic and Martensitic stainless steels including type 410 and 440C; A128 Austenitic Manganese alloys. In addition, ASTM International standard A597 contains cast versions of the following tool steels: A2, D2, D5, S5, M2, S7, H12, H13 and O1. The cast chemistries are similar to the wrought ones, with allowances made for minor impurity elements.

In general, the families have the following characteristics. The designations used herein have the specification as set by the ASTM International.

The D family are high carbon, high chromium, cold work tool steels. The M family are molybdenum, high speed steels. The T family are tungsten, high speed steels. The H family are chromium hot work, heat resistant steels. The A family are air hardening, medium alloy, cold work steels. The O family are oil hardening, cold work steels. The S family are shock resisting steels. The 4XX family are martensitic/ferritic stainless steels. The C-type castings are corrosion resistant steels. H-type steel castings are heat resistant stainless steels.

It would also be beneficial to have analytical tools for determining which formulations of commercial, or custom steels would be suitable for fabrication using powder metallurgy techniques and infiltration of a skeleton with an infiltrant having a similar composition but with a lower melting point than the skeleton. It would also be beneficial if the resultant bulk composition is relatively homogeneous, when considering together the regions that originally were skeleton, and those that originally were open pores, filled with infiltrant.

SUMMARY

Inventions disclosed herein satisfy these needs. A general invention disclosed herein is a fully densified substantially homogeneous steel part made by infiltrating a skeleton made from steel powder with an infiltrant of a similar composition. The compositions of the powder and the infiltrant differ primarily only in that the infiltrant has a higher concentration of a melting point depressant agent "MPD" than does the skeleton, and this higher concentration results in the infiltrant having a melting point that is significantly lower than that of the skeleton composition. Thus, the melting point depressant agent acts as a melting point depressant. For instance, Carbon (C) can act as a melting point depressant agent for steel compositions. In this context, it should be noted that it is possible that both the skeleton and the infiltrant contain some of the melting point depressant agent, e.g., C, but just that the concentration of the melting point depressant agent in the infiltrant is greater than it is in the skeleton. Thus, the melting point depressant agent need not be totally absent from the skeleton.

The present inventors have discovered an unexpected combination of conditions that can provide a relatively homogeneous, fully metal, fully dense steel part. In general, certain formulations of steel can be used as a target composition. At least one of the elements that makes up the normal, target formulation, typically carbon or silicon is an element that can act as a melting point depressant for the composition of the remaining elements, or, in some cases, a composition of most, but not all of the remaining elements.

A skeleton is made that has all of the elemental components of the target steel formulation, in concentration that are near to those of the target, but with two differences. First, there is a lower concentration of the melting point depressant. Second, the presence of some or all of the other elements are in slightly different concentration, because there is less MPD. For instance, the concentration of Fe is higher in the skeleton than it is in the infiltrant. In some cases, concentrations of other elements, such as carbide formers, such as chromium (Cr), also differ between the skeleton and target.

An infiltrant is provided that has all of the elemental components of the target steel formulation, in concentrations that are near to those of the target, but with two similar differences. First, there is a higher concentration of the melting point depressant. Second, the presence of at least one of the other elements are in slightly different concentrations because there is more MPD. For instance, the concentration of Fe is lower in the infiltrant than it is in the skeleton. Similar to skeleton formulations, elements other than iron can also vary in concentration between target and infiltrant.

There are cases for certain target compositions where the compositions of the infiltrant, and the skeleton can be chosen such that a skeleton will remain solid at a temperature at which the infiltrant can be melted and fully infiltrated into the skeleton primarily by capillarity. The liquid phase has a higher concentration of the melting point depressant than does the skeleton. Some, but not all of the melting point depressant will diffuse from the liquid phase to the solid phase. Freeze off does not occur because the liquid phase persists, keeping the flow channels open. The system is designed so that the persistent liquid phase is large enough (greater than at least 7% vol, and more typically between 20 and 40 vol % of the infiltrated body) so that flow can be maintained. The solid and the liquid phases remaining after any diffusional solidification have different compositions. But, typically the degree of difference is slight, and the full part is substantially homogeneous. Conventional heat treating techniques, such as austenitizing, quenching, or slow cooling and tempering can be applied to infiltrated bodies to affect homogeneity and mechanical properties as explained below.

Important disclosures herein are methods of infiltrating a steel skeleton with an infiltrant of similar composition, but where a melting point depressant is provided. The melting point depressant can be carbon alone, despite the high diffusivity of carbon in iron. It can also be silicon alone, again despite the relatively high diffusivity of Si in iron. And, it can be carbon and silicon together. Additional elements are not required, for instance to achieve greater melting point depression without risking choking off of infiltration by freezing. In fact, certain additional melting point depressing elements may be detrimental, if their diffusivity is so low that they prevent a reasonable degree of homogenization during a reasonable time, or, if their solubility is so low that they prevent a reasonable degree of homogenization at all.

Thus, inventions disclosed herein include: parts made according to such methods; the methods of making such parts; actual formulations themselves for use as skeletons, infiltrant, and skeleton and infiltrant pairs relative to a specified target; and methods of determining the compositions of such formulations.

DETAILED DISCUSSION

There are various ways to determine the relative proportions of MPD and other elements in the formulations.

The foregoing is illustrated with the following very simplified example and FIGS. 1A-1C. Assume a commercial steel with the target formulation as set forth in Table A below in the row entitled target, namely 70% wt Fe, 2% wt C and 10% wt for each of Cr and Mn. Assume also the idealized situation, where the initial skeleton 122 is 50% volume solid, and 50% volume void pore space. (This is not likely a practical arrangement, but it is not too far from a typical, for three dimensional printing, solid volume of 60%, and greatly simplifies calculations for this initial example.) The carbon concentration in the target composition is 2% wt. Assume that there must be a concentration lower than 1% wt of carbon to have a skeleton that is solid at a desired infiltration temperature, and that an infiltrant 124, with at least 3% wt C will be liquid at the same temperature. Then, the proportions of the other components is as set forth in the table, at the rows marked skeleton, and infiltrant, respectively. This example assumes that the skeleton can be fully infiltrated as before any freeze off.

TABLE A

|  | C | Cr | Mn | Fe |
|---|---|---|---|---|
| Target | 2 | 10 | 10 | 78 |
| Infiltrant 50% vol | 3 | 10 | 10 | 77 |
| Skeleton 50% vol | 1 | 10 | 10 | 79 |

The target, infiltrant and skeleton all have the same concentrations of the non-MPD elements, Cr and Mn, other than Fe. The difference in concentration due to the variation in MPD (C) amount is offset by corresponding differences in iron Fe concentration.

The foregoing example is idealized in certain ways, and examples below are more realistic. First the 50/50 solid/void volume packing fraction values for the skeleton would more typically be between about 20% and about 40% vol void, and correspondingly, between about 80% and about 60% vol solid. Second, the target Mn and Cr are both 10% wt. In a multi-component system, such as the steels under discussion here, it is very typical for all of the non-Fe components to be present in significantly unequal concentrations. Third, the concentration of each of the non-Fe components other than the carbon is the same in the target, the infiltrant, and in the skeleton. Such a method is identified herein as a basic method, and it is very useful. There are also more complex ways to compose the infiltrant and skeleton relative to the target, where the relative proportions of the elements in the infiltrant differ from the relative proportions of the elements in the target and in the skeleton. The appropriate proportions are found using phase diagrams and related constructs and analytic tools, as discussed below. Another idealization is that this example makes no mention of the fact that at equilibrium, the infiltrated body will constitute a two-phase entity, with a liquid phase of some volume fraction, whose composition may differ from that of the infiltrant, and a solid phase of some volume fraction whose composition may differ from that of the skeleton. Further, the volume fraction of the skeleton may differ from the packing fraction, and thus, the volume fraction of the liquid may differ from the void fraction. This is discussed in more detail below.

One must also keep in mind that the elemental composition concentrations are weight percentages (indicated herein as x % wt), and the packing fractions are volume percentages (indicated herein as y % vol). Another important point is that one step in a method disclosed herein requires analyzing a two phase system, that is part liquid and part solid at equilibrium. Those parts are also quantified by volume percentages. Further, the mass fraction of a phase, for instance the solid, is not the same as the volume fraction of the same phase, because the density of a solid may differ from density of liquid of the same composition.

Turning now to a more detailed discussion of designing a more realistic system of target, skeleton and infiltrant, the following example is helpful.

Figure 2:
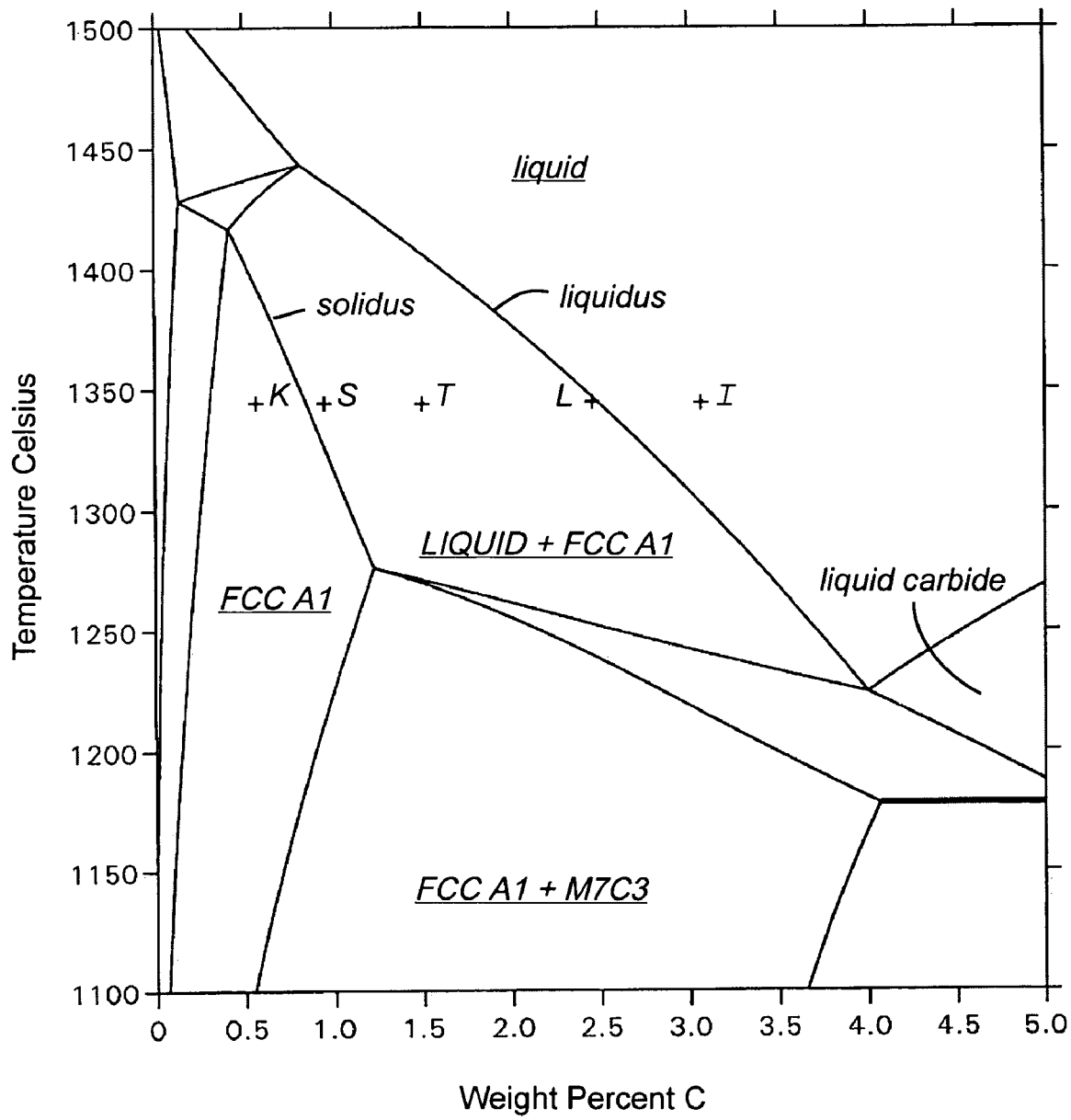
FIG. 2 is a Phase Diagram showing a system of Fe—12% Cr showing temperature ° C. v. wt % carbon.

FIG. 2 shows a phase diagram applicable to a simple martensitic stainless steel with 12% Cr, relating temperature to weight percent carbon. The point K is a composition of stainless steel with 0.57% wt C, which is a composition used as a skeleton. The point T is the target bulk composition of an infiltrated product, which is in a two-phase field (liquid+austenite) having 1.5% wt C. The point I is the composition of an infiltrant, which has 3.07% wt C. The points K, T and I are all with 12% wt Cr, and are at 1353° C. (1626 K). If a skeleton having 60% vol solid and 40% vol void of composition K (0.57% wt C) is infiltrated with an infiltrant having a composition I, the final bulk composition of the infiltrated target will be T.

The equilibrium composition will be composed of 60% vol solid, having about 0.97% wt C, and 40% vol liquid, having about 2.37% wt C. These are the concentrations at the infiltration temperature of 1353° C. for the intersections of the solidus and liquidus respectively. The skeleton and infiltrant compositions, skeleton packing fraction and infiltration temperature were chosen so that the final bulk composition would be equilibrium at T, with a 60% vol. solid phase and a 40% vol. liquid phase. It is somewhat artificial that the solid phase of 60% vol. is the same as the packing fraction of 60%. There are some restrictions on the relationship of these two parameters, but, they need not be equal. What is required, is that the equilibrium liquid phase percent be large enough to ensure flow of infiltrant at equilibrium. The minimum theoretical volume is between about 7% vol and 20% vol, depending on whether a hipping model or a percolation model is used. The designer must choose the most appropriate value given the system. There must be interconnection in three orthogonal dimensions. A typical preferred range is between about 20% and about 40% vol., putting the solid phase at between about 60% and about 80%. What is further required, is that the volume % of the equilibrium solid phase should not be less than that of the skeleton packing fraction. If it were, then some part of the skeleton would need to have been dissolved during equilibration. That is not desireable.

For example, if a skeleton starts with 40% of the volume open porosity, there will initially be 40% by volume interconnected liquid. However, some solidification of the infiltrant onto the skeleton may be desirable to make sure that the skeleton is not accidentally dissolved and to strengthen the skeleton.

This equilibrium condition can be shown using standard techniques, and analytical tools, such as phase diagrams, the lever rule, etc, as set forth generally in *Physical Metallurgy*, Robert W. Cahn, Peter Haasen, New York, N.Y. (1996). Ideally, because of the level of detail needed in most cases, a software program can be used, such as Thermo-Calc software, available from Thermo-Calc Software, of Stockholm, Sweden; or Pandat, available from Computherm, of Madison, Wis.; or MTDATA, available from National Physical Laboratory, of the U.K.; or Factsage, available from Ecole Polytechnique de Montreal, Canada.

The following table shows the compositions of the target, skeleton (K 60%) and infiltrant (I 40%) in a similar manner as the example above is shown. It also shows the equilibrium liquid and solid compositions. The packing fraction is 60% solid, and, at equilibrium, the infiltrated body is 60% vol solid. The Cr is the same in the target, skeleton and infiltrant. The amounts of carbon vary between the target, skeleton and infiltrant, and the amounts of iron also differ between the target, skeleton and infiltrant, because the amount of iron is simply the balance of the remaining material in each.

TABLE B

|  | C | Cr | Fe |
|---|---|---|---|
| Target | 1.5 | 12 | 86.5 |
| K 60% | .3 | 12 | 87.7 |
| I 40% | 3.5 | 12 | 84.5 |
| $V_S = 60\%$ | .8 | 12 | 87.2 |
| $V_L = 40\%$ | 2.6 | 12 | 85.4 |

By designing a system having a target composition in a field of two or more phases that has some liquid (at least 7% vol, and preferably 20-40% vol) persistently present at equilibrium at the infiltration temperature, freeze off is prevented and full infiltration is achieved.

The volume percent of skeleton at the infiltration temperature is determined by the packing fraction of the starting powder, plus any shrinkage e.g., that comes from sintering, that occurs during heat-up. The composition of the infiltrant is then determined, for instance, (in a manner described below) from phase diagrams and other analytical tools, to make the infiltrated bulk composition as close to the target bulk composition as possible. Analysis of phase diagrams using software as identified above, has been particularly useful in obtaining the compositions in multi-component systems.

The foregoing method uses the same concentration of the non-MPD element, in this case, Cr, in the infiltrant and the skeleton as is in the target composition, in this case, 12% wt. Such a method, in general, is referred to herein as a basic style method. Other styles of methods (referred to as near tie-line, off tie-line and reverse slope styles) are also explored below. In each of the other methods, some or all of the non-MPD elements are also varied between skeleton and infiltrant to achieve a target composition. In all of the styles, the amount of the base material, iron, is also varied, although not explicitly mentioned, by the fact that iron makes up the balance of each composition.

Infiltration of a Skeleton to Achieve a D2 Type Bulk Composition Target

D2 is a conventional, hardenable tool steel, often used in dies for use below 300° C. (for instance in plastic molding). It has a composition specified as follows. In the above simplified examples the target C, Cr and Fe concentrations fall within the specification for D2.

TABLE C

| D2 specification (weight %) | | | | | | | | |
|---|---|---|---|---|---|---|---|---|
| Alloy | C | Cr | Mn | Mo | Ni | Si | V | Fe |
| D2 | 1.4–1.6 | 11–13 | 0.6 max | 0.7–1.2 | 0.3 max | 0.6 max | 1.1 max | Bal. |

D2 Compositions have been studied, for two reasons, among others. The first is to study an alloy that is chemically identical to a conventional tool material. The second is to understand and minimize erosion during infiltration, which can occur and has been observed using the basic style method.

A primary reason that erosion occurs, is that even if the phase fractions of skeleton and infiltrant are the same as the equilibrium solid and liquid phase fractions at the infiltration temperature, if their compositions are not at equilibrium with each other, then dissolution and repreciptation reactions can occur.

With flow of material, the skeleton near the in-gate is dissolved and carried into the remaining skeleton, resulting in erosion.

Figure 3:
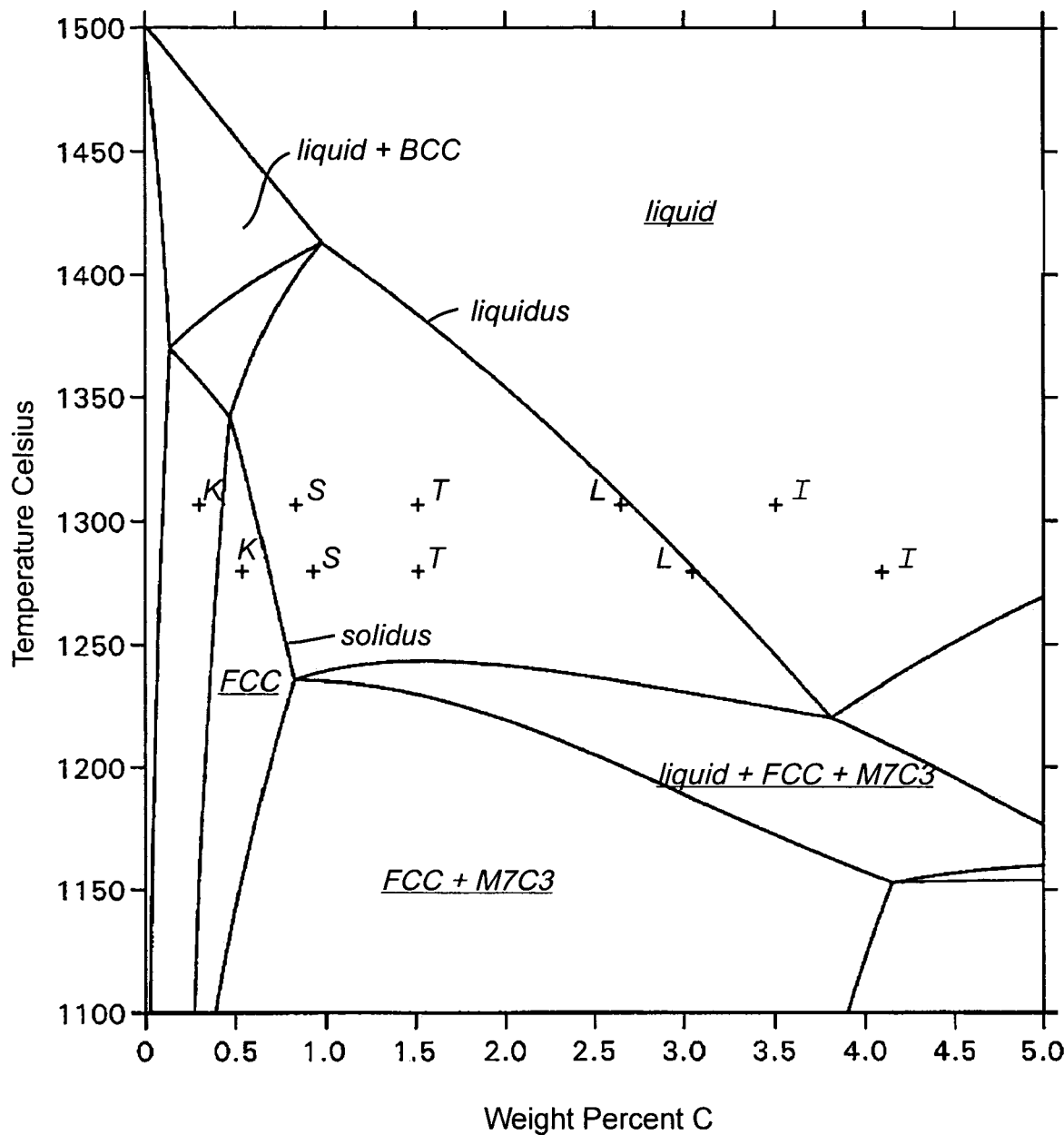
FIG. 3 is a Phase Diagram for D2 steel showing temperature ° C. v. wt % carbon.

For instance, FIG. 3 is a phase diagram for a D2 system, having bulk composition of 12% wt Cr, 1% wt Mo and 1% wt V, as set forth in the Table D, below, at the row designated target. A composite having the bulk composition of D2 will be 60% solid and 40% liquid at 1306° C. The equilibrium composition of the solid will be at point S, at 1306° C., as in the row $V_S=60\%$ and will have about 0.82% wt C and 9.76% wt Cr. The liquid will be at point L at 1306° C., composed as in the row VL=40% and will have about 2.63% wt C and 15.73% Cr. This can be determined using phase diagrams or software such as Thermo Calc. The Cr values are not shown in FIG. 3, but are shown on FIG. 4, discussed below.

TABLE D

| 12% wt Cr D2 | | | | | | | |
|---|---|---|---|---|---|---|---|
| Alloy | $T_{40liq}$ | $T_{KS}$ | wt % C @ $T_{KS}$ | Mol % liq | Mol % sol | wt % liq | wt % sol |
| D2 | 1579 K | 1630 | 0.3 | 38.94 | 61.06 | 37.49 | 62.51 |

| | C | Cr | Mn | Mo | Ni | Si | V | Fe actual |
|---|---|---|---|---|---|---|---|---|
| Target Range | 1.4–1.6 | 11–13 | 0.6 max | 0.7–1.0 | 0.3 max | 0.6 max | 1.1 max | balance |
| Target | 1.50 | 12.00 | 0.40 | 1.00 | 0.20 | 0.40 | 1.00 | 83.50 |
| $V_L = 40\%$ | 2.63 | 15.73 | 0.5 | 1.72 | 0.19 | 0.328 | 1.88 | 77.02 |
| $V_S = 60\%$ | 0.823 | 9.76 | 0.34 | 0.567 | 0.259 | 0.443 | 0.475 | 87.33 |
| IA infiltrant | 3.5 | 12 | 0.4 | 1 | 0.2 | 0.4 | 1 | 81.50 |
| KA skeleton | 0.3 | 12 | 0.4 | 1 | 0.2 | 0.4 | 1 | 84.70 |
| IB Infiltrant | 3.5 | 15.73 | 0.4 | 1.72 | 0.2 | 0.4 | 1.88 | 76.17 |

TABLE D-continued

| | | | 12% wt Cr D2 | | | | | |
|---|---|---|---|---|---|---|---|---|
| KB Skeleton | .3 | 9.76 | 0.4 | 0.57 | 0.2 | 0.4 | 0.45 | 87.90 |
| IC Infiltrant | 3.5 | 14.11 | 0.4 | 1.36 | 0.2 | 0.4 | 1.43 | 78.84 |
| KC Skeleton | .3 | 10.73 | 0.4 | 0.78 | 0.2 | 0.4 | 0.74 | 86.3 |
| ID infiltrant | 3.79 | 10.45 | 0.4 | 0.7 | 0.2 | 0.4 | 0.63 | 83.43 |
| KD Skeleton | 0.13 | 12.93 | 0.4 | 1.18 | 0.2 | 0.4 | 1.22 | 83.54 |

Basic

To illustrate the basic style method in the D2 system, if a skeleton having a packing fraction of 60%, with a composition as shown in the row named KA Skeleton, having about 0.3% wt C, and with Cr, Mo and V in the target listed as above, with the balance Fe, is infiltrated by an infiltrant having a composition as shown in the row named IA infiltrant, having about 3.5% wt C, and with Cr, Mo and V as in the target listed above, and the balance Fe, the result at equilibrium at 1306° C. (1579 K) would be 60% vol solid and 40% vol liquid, with equilibrium compositions set forth above. This equilibrium temperature is referred to as $T_{PF}$ because the equilibrium solid amount is equal to the packing fraction. For the reason just mentioned, this can result in erosion because the equilibrium liquid is richer in chromium than is the infiltrant. The required Cr must come from erosion of the skeleton. This is directly analogous to the above simplified basic style example, where the composition of the infiltrant and skeleton are the same as that of the target, except for the wt % C (with more C in the infiltrant) and compensating wt % Fe (with less Fe in the infiltrant).

Erosion can be minimized mechanically by noting that most erosion occurs near to the in-gate. Thus, providing a sacrificial region, such as stilts, as discussed in U.S. Pat. No. 5,775,402, issued on Jul. 7, 1998, adjacent the in-gate, can reduce erosion damage to the principal part being made. It is also possible to reduce erosion by adjusting the composition of the skeleton and the infiltrant so that they are closer to being at equilibrium at the infiltration temperature with each other.

Near Tie-Line

Figure 4:
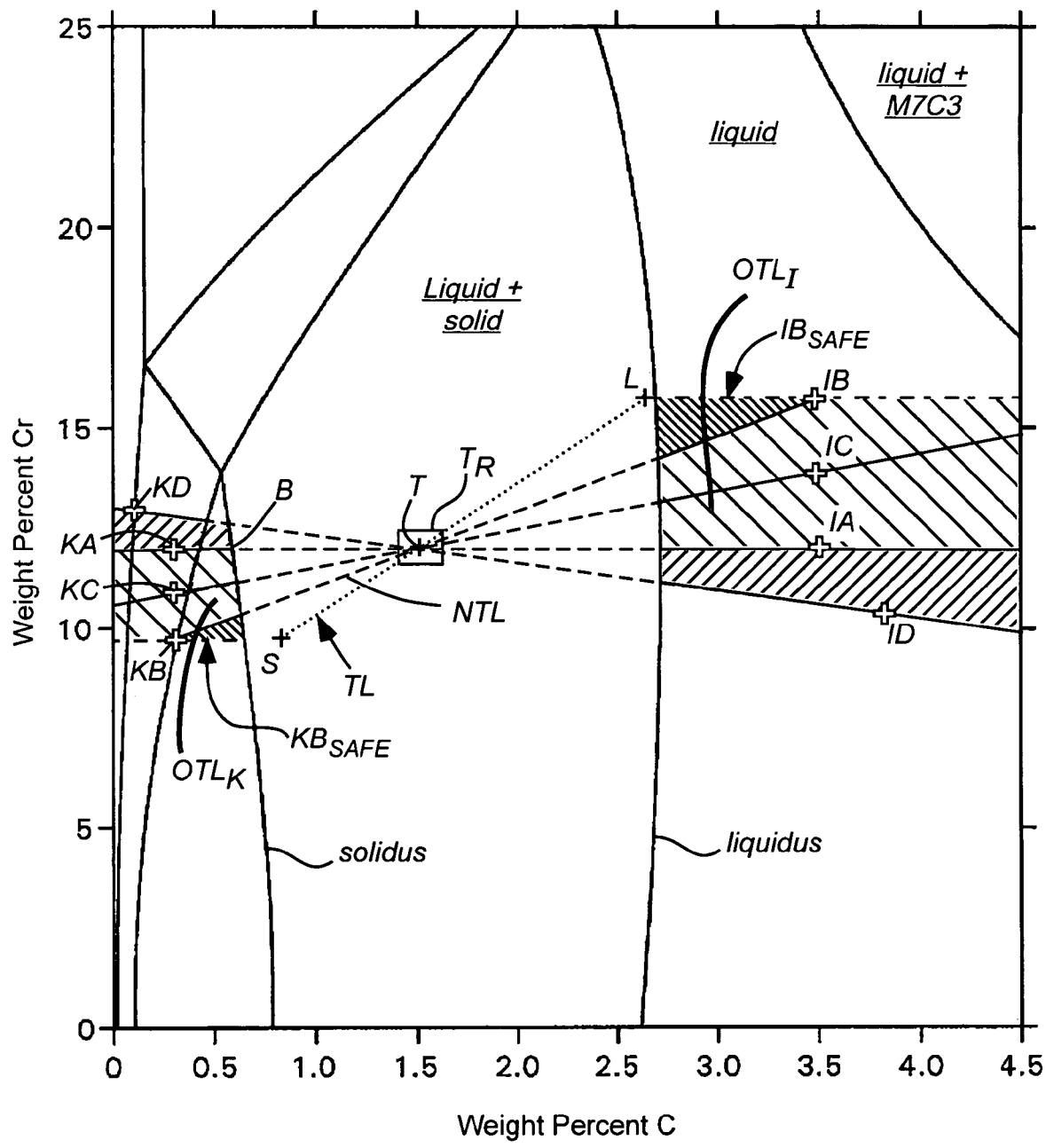
FIG. 4 is an isothermal phase diagram for D2 steel showing equilibrium compositions at 1306° C., 60% vol solid, showing wt % Cr vs. wt % C, for skeleton and infiltrant complementary pairs for basic, near tie-line, off tie-line, and reverse slope modes.

To eliminate erosion by adjusting compositions, it is necessary to adjust both the MPD (e.g. C) and non-MPD (e.g. Cr, Mo, V), concentrations of both the skeleton and the infiltrant, so that the solid and liquid are at chemical equilibrium with each other upon infiltration. FIG. 4 is an isothermal phase diagram for the Fe—Cr—C—Mo—V system (generated using software such as described above), applicable to D2 tool steel, and helps illustrate the procedure. It is a two-dimensional slice of a many-dimensional construct. The relevant temperature is again 1306° C. (1579 K). Molybdenum (Mo) and Vanadium (V) are both present at 1% wt. Carbon concentrations vary, and are shown on the horizontal axis. Cr concentrations also vary, and are shown on the vertical axis. The balance is Fe. In the phase diagram, the concentrations of Mo and V, or the other elements, are not varied, because their target concentrations are rather low in comparison to Cr. The discrepancies between the phase diagram with all the elements varied and that of FIG. 4 is noticeable, but small and not crucial to the description herein.

FIG. 4 illustrates four different, but related ways to choose the compositions of a skeleton and an infiltrant to achieve a given target. These four ways delineate rough boundaries around a spectrum of workable compositions.

The point T represents a target composition of D2 in the two-phase (liquid+austenite) field with 12% wt Cr, and 1.5% wt C.

The points KA and IA are skeleton and infiltrant compositions, respectively, as would be chosen as discussed above according to the basic method. The Table D sets forth all the compositions and others to be mentioned below.

The compositions KA and IA represent the basic method and may experience erosion at the in-gate, as discussed above.

The points S and L are the respective equilibrium solid and liquid compositions at this temperature (1579 K; 1306° C.), for a bulk composition T (D2), with $V_S$=60% volume solid and $V_L$=40% volume liquid. They have the compositions set in the rows $V_S$=60% and $V_L$=40%, respectively. The points S and L are on a line called a tie-line, which is a line (shown as dotted) that joins the equilibrium solid and equilibrium liquid compositions. Any composition on the line between the two points S and L will be composed of a solid having composition S and a liquid having composition L in amounts that may be found by the lever rule. The S and L points do not appear to be precisely on the nearby liquidus and solidus curves (so labeled), as shown, because of the presence of Mo and V in the system. The diagram is drawn at constant Mo and V (1% wt each), but the equilibrium concentrations of Mo and V are lower in the solid and higher in the liquid. (The apparent discrepancy is due to viewing a two dimensional slice of a multi-dimensional system. The liquidus and solidus lines are actually surfaces, of which the locations S and L are intersections of the surfaces and the plane at 1% wt Mo and V. The true tie-line is out of plane of the diagram by a small amount. A similar comment could be made regarding most of the other multi-component phase diagrams included herein.)

The liquidus and solidus compositions would be at chemical equilibrium with each other at the infiltration temperatures and thus, no erosion would occur if they were used for the infiltrant and skeleton compositions, respectively.

However, having the composition of the skeleton exactly at S on the solidus raises problems, in practice and thus, the carbon concentration at that composition is the maximum carbon concentration in the skeleton. Any temperature overshoot during heating above the designated infiltration temperature will cause the skeleton to partially melt. Similarly, with an infiltrant composition exactly on the liquidus at L, if the infiltration temperature is slightly below the designated infiltration temperature there could be some solid material in the infiltrant alloy that could clog the gate and retard infiltration and thus, the carbon concentration at that composition is the minimum carbon concentration in the infiltrant.

Therefore it is better to provide a skeletal carbon concentration slightly less than the S concentration, to insure that it does not melt, and to provide higher carbon concentration than L in the infiltrant to ensure that the gate does note clog.

This difference in carbon concentration between the skeleton and the equilibrium solid results in the solidus temperature of the skeleton being higher by some amount than the temperature $T_{PF}$. The temperature difference amount is referred to herein as $T_{SAFE}$. In general, $T_{SAFE}$ can be any amount, depending on the accuracy of process controls, or even zero. However, typically $50 < T_{SAFE}$ and 100.

The pair of compositions KB and IB in FIG. 4 are similar in Cr content to the compositions S and L respectively, but differ in C content, to give these greater difference in melting points. Thus, the C concentration for KB is 0.3%, which is less than that for S, which is 0.82%. The C concentration for IB is 3.5%, which is more than that for L, which is 2.6%. The Cr concentration in the infiltrant is 15.73% wt, and in the skeleton is 9.76% wt.

The concentrations of other major alloying elements, Mo and V are also adjusted along the tie line between the points S and L, similar to the adjustment of the Cr composition. Thus the skeleton contains 0.57 wt % Mo and 0.48 wt % V and the infiltrant contains 1.72 wt % Mo and 1.88 wt % V.

The concentrations of minor alloying elements (such as Mn, Ni, and Si), and those elements that may be present as known impurities, are not normally varied between the skeleton and infiltrant.

This then is a second style method to select the composition of the infiltrant and skeleton, the basic style method being the first. This second style is referred to herein as a near tie-line method, because it uses compositions that lie on a line KB-T-IB (from KB to IB), near to the line that ties the equilibrium compositions L and S to the target composition T, in this case for D2. They are not on the tie-line STL, because the carbon amounts are adjusted, as discussed above, to prevent slumping and clogging.

Thus, the general properties of the near tie-line style pair of compositions are that: they lie on a line that passes through the target composition T; they have non-MPD (in this case, Cr, Mo, V) concentration equal to that of the equilibrium solid and liquid compositions, they have MPD (in this case, C) concentrations equal to that of a basic case, and using the lever rule, they would result in a bulk composition of T, present in a liquid and a solid phase in the ratio specified, in this case 60% vol sol. Most of these are general guidelines, only, and can be refined more specifically, as discussed below.

A potential draw back to this near tie-line style method is that it may result in fairly large differences in non-MPD element concentration, e.g. Cr, in the infiltrated body, comparing the regions that had been skeleton with those that had been infiltrated voids. Heat treatment may not homogenize the material, since the skeletal region and solidified infiltrant region are already nearly at chemical equilibrium with each other at the homogenization or austenitization temperature. (The chemical potentials of Cr in the skeleton and in the infiltrant are nearly the same even though the concentrations are not.) Because Cr readily forms carbides, this will result in a microstructure that has regions of relatively higher carbide particle density (regions of solidified infiltrant, which originally had a higher Cr concentration), and regions of relatively lower carbide particle density (regions of original skeleton which originally had a lower Cr concentration). The mechanical properties may suffer because of this inhomogeneity. For instance, regions with relatively lower carbide density may be softer than desired, while regions with high carbide density may be extremely hard and brittle.

Off Tie-Line

A third method style is to use a pair of compositions with Cr concentration part way between the two extremes of the basic (IA and KA) and the near tie-line (IB and KB) concentrations. This is an off-tie-line style method, given by IC and KC in the FIG. 4. Here the Cr concentration in the skeleton and infiltrant is about halfway (the average) between that of the other two cases. The skeleton material will be less susceptible to erosion than with the basic style method, and there will typically not be as noticeable differences in microstructure between the originally skeletal and solidified infiltrant regions that a typical near tie-line style method would produce.

In practice, any alloy combinations that lie in between those discussed in connection with a basic style method and a near tie-line style method—for instance along lines in the shaded regions $OTL_K$ and $OTL_I$ shown in FIG. 4, between the line from KB to IB and the line from KA to IA, will provide an off tie-line style of infiltration. They will present gradually varying erosion and inhomogeneity risks. The off tie-line style can be thought of as a mixture of the basic and near tie-line styles, and can be described mathematically using a parameter $R_n$, where $0 \leq R_n \leq 1$. The skeleton composition for each non-MPD element, n, can be found using the relationship:

$$M_{n,K} = M_{n,T} + R_n*(M_{n,S} - M_{n,T}) \qquad \text{(Eq. 1)}$$

Thus, in the skeleton, concentration of each non-MPD element in the off tie-line style can vary continuously and independent of the other non-MPD elements within the range between $M_{n,T}$ (when $R_n=0$) and $M_{n,S}$ (when $R_n=1$). When for each non-MPD element $R_n=0$, then the skeleton composition is identical to the basic method, and the infiltrant composition will also be the same as the basic method infiltrant. When for each non MPD element, $R_n=1$, then the skeleton composition is identical to the near tie-line method, and the infiltrant composition will also be the same as the near tie-line infiltrant.

Figure 11:
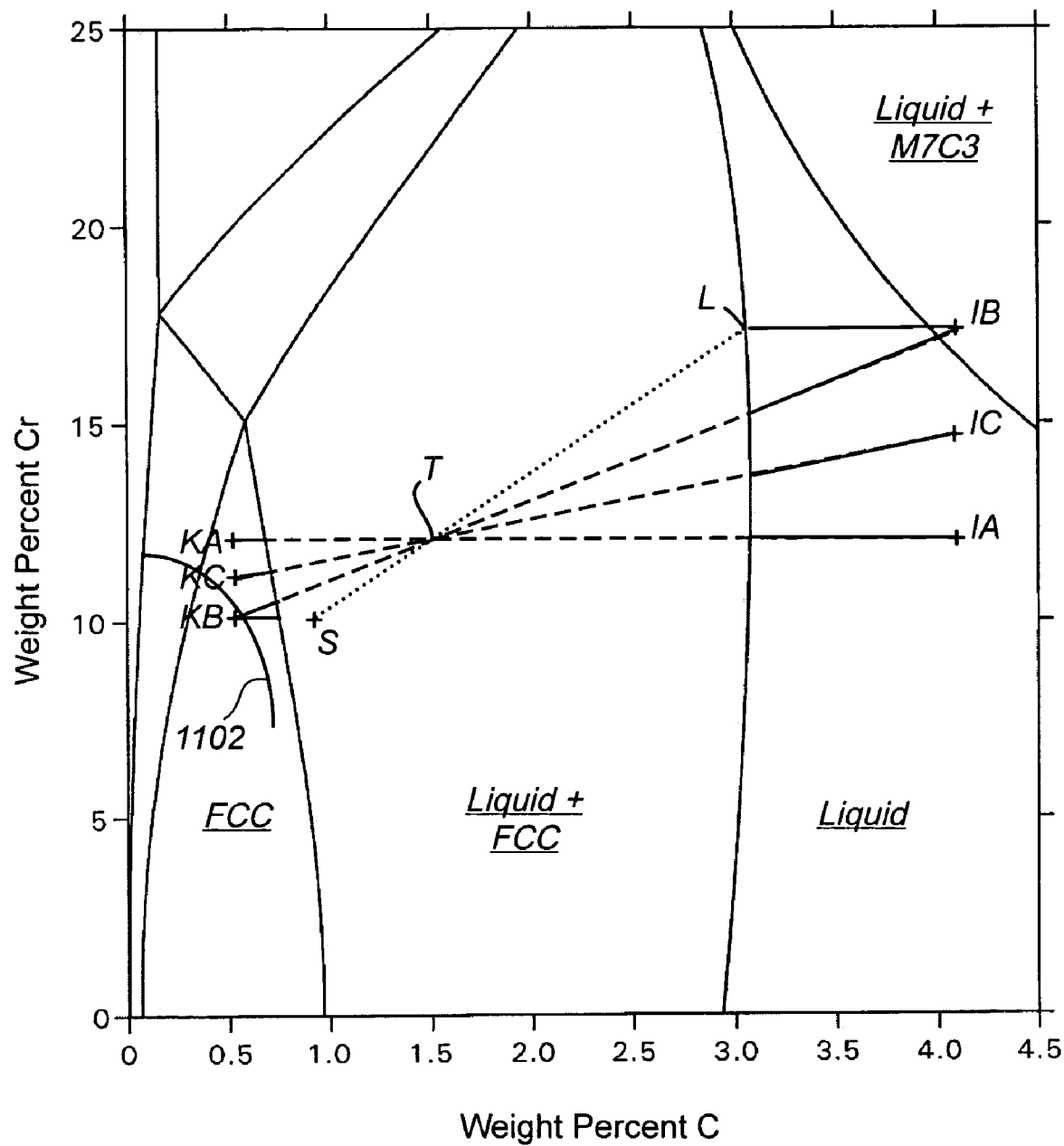
FIG. 11 is an isothermal phase diagram at 1279° C. for D2 steels showing equilibrium compositions, 70% solid.

For illustrative purposes, $R_n=0.5$ is often used herein, however, all values $0 \leq R_n \leq 1$ are contemplated as within inventions disclosed and described herein. The region $OTL_K$, in which skeleton compositions reside, is further roughly bound by the solidus, with consideration for $T_{SAFE}$, as discussed below. The low wt % C boundary for $OTL_K$ is either 0% C or that amount of C which requires a high amount of carbon that produces carbide stability in a complementary infiltrant. A low carbon boundary is shown in FIG. 11, at curve 1102. Note that infiltrant composition IB is in a liquid+M7C3 (carbide) field. The skeleton composition point KB is complementary to the composition IB. Thus, it is outside of the boundary 1102, above which carbon concentrations are high enough to avoid this problem. For systems with 2 or more non-MPD elements, this region $OTL_K$ is a multidimensional truncated cone-like space, whose base and top are described by the lower and upper bounds of the carbon contents respectively, and whose perimeter is bound by $R_n=0$ and $R_n=1$, for each value of n (for each non-MPD element).

The region $OTL_I$, in which infiltrant compositions reside, is similar in description to the region $OTL_K$. A similar expression can be used to find the region of liquid compositions:

$$M_{n,I} = M_{n,T} + R_n*(M_{n,L} - M_{n,T}) \qquad \text{(Eq. 2)}$$

Where $R_n$ is the same $R_n$ as used to find the skeleton composition. The region $OTL_I$ is further roughly bound on the low MPD side, by the liquidus. The boundary for $OTL_I$ on the high MPD side is defined by keeping the infiltrant composition in a one phase liquid field.

A fourth method style is a reverse slope method, for example pair KD, ID in FIG. 4. In the reverse slope style, the concentration of the non MPD elements in the skeleton is between that of the target value and the equilbrium liquid value at L. Likewise, the concentration of the non-MPD element in the infiltrant is between the target value and the equilbrium solid value at S. This reverse slope approach has at least one potential advantage. The homogeneity of the body will be no better than the basic case, however the morphology, or distribution, of the carbides may be different than any other case. Because there is more Cr in the skeleton than in the infiltrant, there is a large driving force to move carbon from the infiltrant to the skeleton. This will have a tendency to dissolve some of the large carbides that form during solidification of the infiltrant and move the carbon into the interior of the skeleton powder. This might provide a tougher material because carbon is removed from the cast grain boundaries and new carbides will uniformly form interior to the austenite grains.

A consequence of this reverse slope style of method is that the amount of carbon in the skeleton must be severely reduced (0.13 w %), and correspondingly increased in the liquid (3.79%) in order to maintain a temperature margin ($T_{SAFE}$) between the infiltration temperature and the temperature at which the skeleton begins to soften. The biggest draw back to this style is that erosion may be difficult to control, since the skeleton and liquid are far from their equilibrium values. However, if large particle sizes are used, satisfactory results might be possible. In general there is little added concern that carbides will form in the infiltrant at the infiltration temperature because strong carbide forming elements have been removed from the liquid.

In practice, the reverse slope style is the easiest to perform. Given a low wt % C starting powder (also used for the skeleton), one may simply add an appropriate amount of carbon to obtain an infiltrant of just slight reverse slope style. This occurs because the amounts of all other elements are diluted with the carbon addition.

Such a system is illustrated with references to Table E below, which is modified from table A above, for a system having a packing fraction of 50%. Note that the concentration of Cr in the skeleton is slightly higher than in the infiltrant, resulting in a reverse slope.

TABLE E

|  | C | Cr | Mn | Fe |
|---|---|---|---|---|
| Target | 1.95 | 9.9 | 9.9 | 78.25 |
| Infiltrant 50% vol | 2.90 | 9.8 | 9.8 | 77.5 |
| Skeleton 50% vol | 1 | 10 | 10 | 79 |

Similar to the off tie-line style, one may describe the non-MPD elements of the skeleton composition in the reverse slope style mathematically using the expression 1, repeated here:

$$M_{n,K}=M_{n,T}+R_n^*(M_{n,S}-M_{n,T}).$$ (Eq. 1)

However, for the reverse slope case, $-1 \leq R_n \leq 0$. The MPD element in the skeleton is bound on the high side by the solidus, with regards to $T_{SAFE}$, and on the low side either by 0 or that amount of MPD which moves the complementary infiltrant liquid into a two-phase field.

The non MPD elements in the infiltrant composition of the reverse slope style can then be found by the expression 2, repeated here:

$$M_{n,I}=M_{n,T}+R_n^*(M_{n,L}-M_{n,T}),$$ (Eq. 2)

with $-1 \leq R_n \leq 0$. The amount of MPD in the infiltrant is bound on the low side by the liquidus, and on the high side by the limits of the single liquid phase field. A liquid+M7C3 carbide phase boundary is above and to the right as shown in FIG. 4.

By combining the limits of the off tie-line and reverse slope styles, the limits of the parameter $R_n$ are then $-1 \leq R_n \leq 1$.

Figure 5:
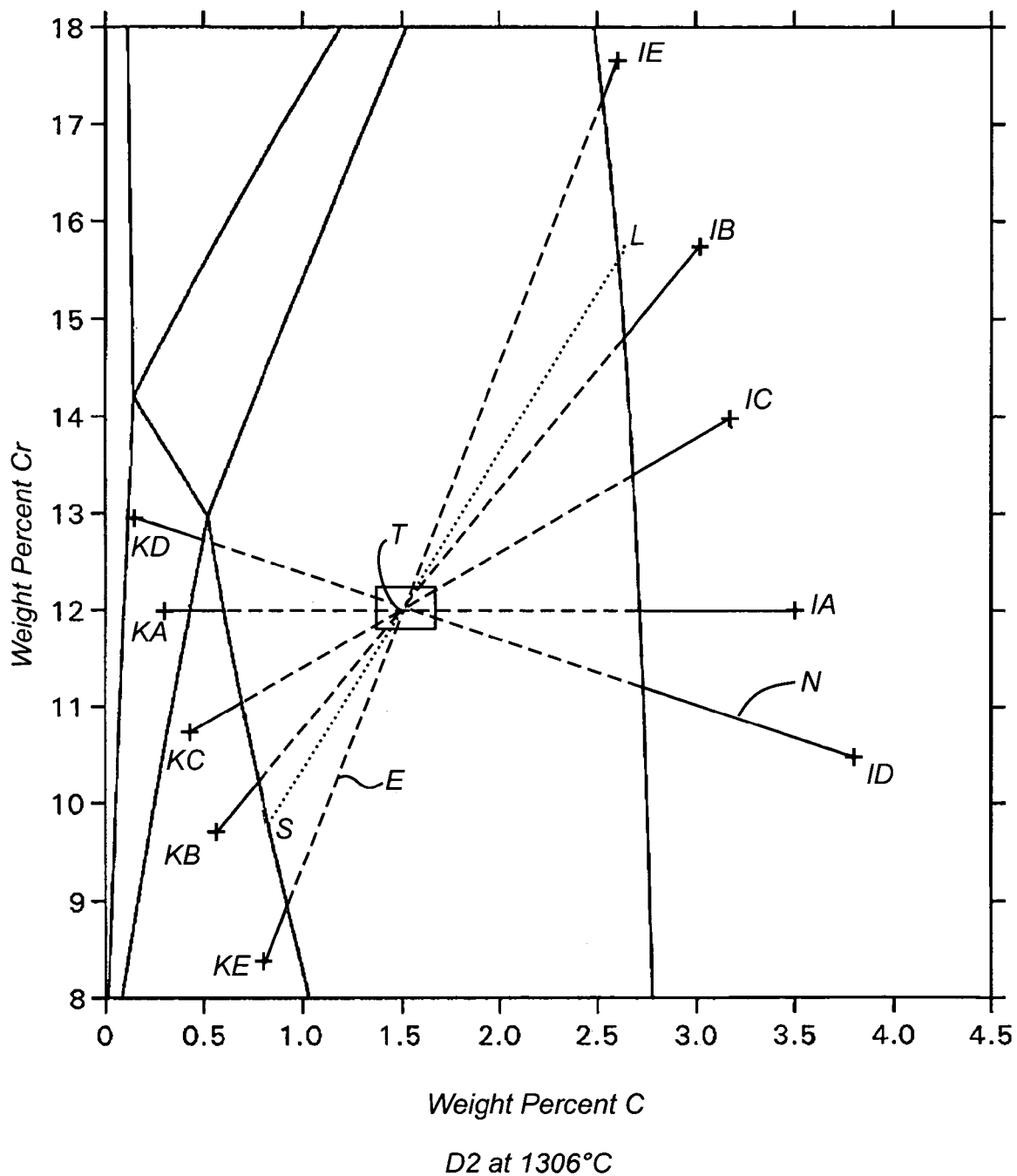
FIG. 5 is an isothermal phase diagram similar to FIG. 4, except that the skeleton and infiltrant complementary pairs were determined using $T_{SAFE}=50°$ C., so that the MPD (C) concentrations differ for each of the modes, also showing pairs KE and IE, which lie on a line having a slope that exceeds that of the tie-line S-T-L.

Finally, although it will be far from optimal, skeleton and infiltrant pairs may also be considered in an extreme slope style, as shown by pair IE, KE in FIG. 5 which would result from using a factor like R, having an absolute value >1. This pair has far from equal amounts of non-MPD elements in the skeleton and liquid. There are at least three reasons to consider this method as not favorable. First, there will be strong erosion and dissolution-reprecipitation reactions that will destabilize the skeleton network. Second, the slow diffusing, non MPD elements might have large gradients within the part after infiltration, leading to very long homogenization times. Third, the likelihood of having carbide stability in the liquid increases as more strong carbide forming elements (Cr, Mo, V, W) are added to the liquid.

Complementary

The foregoing four general technique styles (basic, near tie line, off tie line and reverse slope) each identify a skeleton and an infiltrant pair of compositions, relative to a target composition that has been labeled T. These four methods describe pairs that are likely to result, to varying degrees, in successful and useful combinations. Using the basic style technique, the infiltrant composition has been labeled IA, the skeleton composition has been labeled KA. As used herein, the skeleton and infiltrant compositions KA and IA are designated as complementary with respect to a target composition T. In specific, they are complementary in a basic mode. Regarding the near tie-line style technique, the skeleton and infiltrant compositions labeled KB and IB are complementary with respect to the target composition T, and, in specific, they are complementary in a near tie-line mode. Further, and similarly, regarding the off tie line style technique, the skeleton and infiltrant compositions labeled KC and IC are complementary with respect to the target composition T, and, in specific, they are complementary in an off tie-line mode. Also similarly, regarding a reverse slope style technique, the skeleton and infiltrant compositions labeled KD and ID are complementary with respect to the target composition T, and, in specific, they are complementary in a reverse slope mode.

Finally, other pairs of skeleton and infiltrant combinations may be mathematically complimentary about a target composition T. These extreme pairs lie outside the range defined by the near tie-line, off tie-line, basic and reverse slope methods, and are not believed to be likely to give rise to successful processing conditions, and therefore these extreme pairs are not useful, as are pairs of the other four methods.

In general, as complementary is used herein, complementary pairs of skeleton and infiltrant compositions KX and IX include any pair that lie an a line in the shaded region of a phase diagram, such as FIG. 4, that passes through the target composition T, and which are set at compositions such that, given a packing fraction $V_{PF}$ of the skeleton, a bulk composition made up of a liquid phase and a solid phase having compositions of IX and KX, respectively, of appropriate masses, would result in a bulk composition of T, according to known application of metallurgical analytical techniques, including the lever rule (rule of mixtures). See *Physical Metallurgy*, Cahn, et al. above, for a general discussion of analyzing bulk compositions and the compositions of liquid and solid phases that make up such a bulk composition, which references are incorporated fully herein by reference.

Any complementary pair as defined herein will result in the bulk composition of the target. What will vary, is the degree to which a final infiltrated body is homogeneous with respect to non-MPD elements, and, the degree to which the skeleton is susceptible to erosion. Generally, complementary pairs that result in a more homogeneous end product are more susceptible to skeleton erosion.

If a complementary pair can be described by an expression such as Eqs. 1 and 2, with −1<R<1, then such a pair is complementary in a mode that is between a near tie-line mode and a reverse slope mode. If the pair can be defined by such expressions with 0<R<1, then the mode is complementary in a mode that is between a basic mode and a near tie-line mode.

As shown in the Table C, for D2 above, and example tables E1-E16 below for other steels, the specifications for steels have ranges of concentrations of elements. Thus, for instance in the two-dimensional space of Cr v. C, shown in FIG. 4, it is also reasonable and accurate to represent the target composition as a rectangle, $T_R$, which includes the point T, and a region surrounding it. Thus, complementary skeleton and infiltrant pairs of all modes, actually include all those pairs that lie on a line that passes through the region $T_R$, which given a packing fraction $V_{PF}$, would result in a composition lying within the region $TR_R$, based on the application of the lever rule and other applicable techniques. The region is multi-dimensional, depending on how many elements are part of the target composition.

Examples Similar to D2

Three alloy pairs were custom fabricated to test the expectation of decreasing erosion, and to measure mechanical properties (hardness) of the infiltrated materials based on: (A) the basic; (B) near tie-line and (C) off-tie-line style alloy pairs. These alloys were based on a system very similar to the 12% wt Cr D2 system discussed above, but with 12.6% wt Cr in the target. The actual value differs from 12% due to normal variation in powder manufacturing process. The other concentrations and parameters are set forth in Table F, below, where the concentrations of Mn(α), Si(β) and Ni(γ) are small, and do not vary from composition to composition.

TABLE F

| | C | Cr | Mo | V | Mn | Si | Ni | Fe |
|---|---|---|---|---|---|---|---|---|
| | | | D2 12.6% wt Cr systems | | | | | |
| Target Range | 1.4–1.6 | 11–13 | 0.6 max | 0.7–1.0 | 0.3 max | 0.6 max | 1.1 max | balance |
| Target | 1.50 | 12.00 | 0.40 | 1.00 | 0.20 | 0.40 | 1.00 | 83.50 |
| Eq. Liq. 40% | 2.6 | 16.2 | 1 | 1 | α | β | γ | Bal |
| Eq. Sol. 60% | .9 | 10 | 1 | 1 | α | β | γ | Bal |
| IA Infiltrant | 3.25 | 12.6 | 1 | 1 | α | β | γ | Bal |
| KA Skeleton | .35 | 12.6 | 1 | 1 | α | β | γ | Bal |
| IB Infiltrant | 3.25 | 17.2 | 1 | 1 | α | β | γ | Bal |
| KB Skeleton | .35 | 9.7 | 1 | 1 | α | β | γ | Bal |
| IC Infiltrant | 3.25 | 14.8 | 1 | 1 | α | β | γ | Bal |
| KC Skeleton | .35 | 11.2 | 1 | 1 | α | β | γ | Bal |

A first alloy pair has only carbon varied between skeleton KA and infiltrant IA, which is the basic style infiltration method (0.35% wt C in skeleton and 3.25% wt C in infiltrant, 12.6% wt Cr in both skeleton and infiltrant) similar to what is represented by KA and IA in FIG. 4. (There is no figure that shows the values set forth in Table F, but FIG. 4 is very close.) A second alloy pair is near the tie-line, with maximum chromium variation between skeleton (KB=9.7% wt Cr) and infiltrant (IB=17.2% wt Cr). A third alloy pair is off the tie-line and has an intermediate variation (KC = 11.2% wt Cr and IC=14.8% wt Cr). The carbon level of all three skeleton alloys is about 0.35% wt C, and the three infiltrants are at 3.25% wt C. Comparison of the three alloys to each other and to conventional wrought D2 were made.

Ingots of the three alloys described in Table F were fabricated. To study the infiltration, controlled porous geometries were created using wire-EDM. Basically, a rectangular block, 27×13.5×12.5 mm was EDM machined to leave parallel, upstanding square cross-section columns. The spacing of the columns and wire kerf is such that 60% of the material remains while 40% is removed, similar to the packing fraction of powder in powder beds. The column spacings are about 1.2 mm on centers. Each is a square with a side of 0.92 mm.

These samples have enabled study of microstructural features (homogeneity, carbide distribution and size) and microhardness of skeletal and infiltrant regions after infiltrant, austenitizing and tempering.

The samples fully infiltrated and achieved full density (nearly 100% of D2). Some porosity, probably caused by solidification shrinkage, was seen in the sections. Little erosion was evident, a very small amount of rounding of the exposed columns was seen. Large carbide grains were present in the infiltrated regions, but growth of some carbide clusters was seen in cross sections of the interior of the skeleton regions after austenitizing at 1090° C. for 1 hr, indicating partial homogenization of carbon. In addition, portions in the originally infiltrant regions surrounding the skeleton columns were found that were relatively poor in Cr, ~8 wt % by electron microprobe, which is in agreement with solidification theory. This region could also be observed by differential etching of the polished section. The Vickers microhardness of the martensite after the austenitizing treat and water quench was measured in three locations, the skeleton, the Cr-poor region immediately around the skeleton, and the area of eutectic martensite+carbide in the infiltrated regions. The hardness values converted to Rockwell C hardness of the samples after infiltrating were 57, 50 and 54 respectively and after austenitizing and quenching treatment 66, 63, and 62 respectively. So the skeleton region has the hardest martensite, while the eutectic martensite is softest, but still quite hard.

Figure 19:
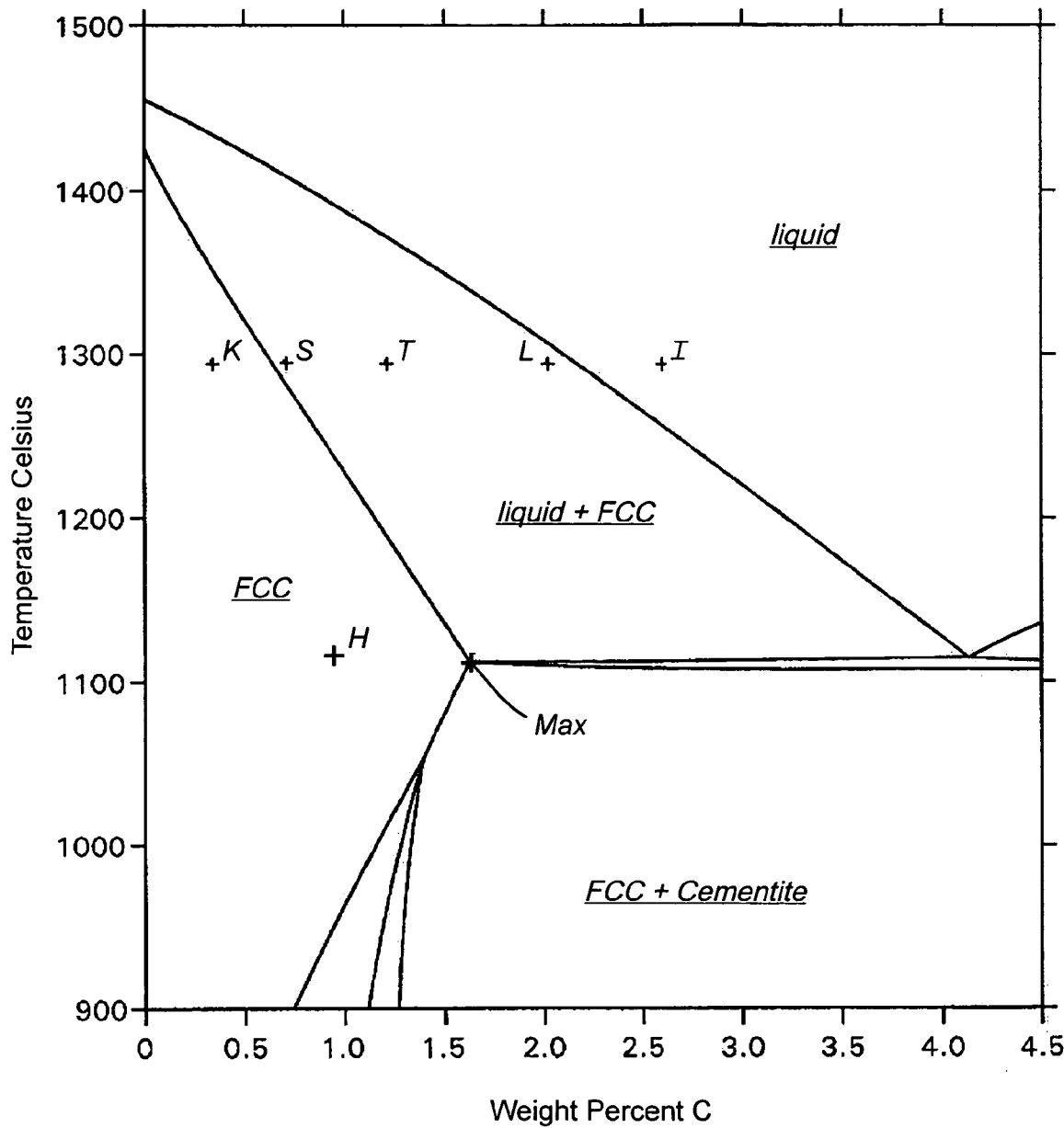
FIG. 19 is a phase diagram for Austenitic Manganese steel grade C relating temperature ° C. to wt % C.

In the near tie-line style method example, significant differences in Cr content existed between the originally skeletal and infiltrant regions, which started at about 10% wt Cr and 17% wt Cr respectively. The samples were fully infiltrated, and had a density approaching 100% of wrought D2. No evidence of erosion was present, and in fact the edges of the part were quite sharp, with little evidence of any rounding of the column tops or the corner columns, which was different from the basic samples. Some porosity due to solidification shrinkage was present in sections. Large carbide grains were again evident in the infiltrated body, and in some cases there appeared to be some cracks in the infiltrated regions close to the skeleton boundaries. No evidence of carbide growth in the skeleton was seen, and there was no evidence of Cr diffusion into the skeleton, as shown by electron microprobe. A Cr-poor region of solidified infiltrant, similar to that in the basic samples, was observed. The hardness values converted to Rockwell C of the skeleton, Cr-poor and eutectic regions after infiltrating, were 47, 39 and 33 respectively and after austenitizing and quenching, were 60, 56.5 and 58.5. In all cases, the hardness is lower than in the basic style of infiltration. For other alloys, the near tie-line style may be more acceptable for alloys that are in a single phase field during heat treatments. For instance, as shown in FIG. 19, cooling austenitic Manganese steel grade C of composition T to point H at about 1075° C. results in a single phase material. This and other aspects of heat treating are discussed in more detail below.

The intermediate, or off tie line sample exhibited very little erosion and was less homogeneous than the basic method sample. Again, samples were fully infiltrated with a density approaching 100% of wrought D2. The erosion evidence was intermediate between the basic and near tie line cases, no visible rounding of columns, but they lacked a sharp edge. No cracks were seen in the sections, nor was carbide growth in the skeleton observed. Again, a Cr poor region of solidified infiltrant surrounding the skeleton was observed. The hardness values, converted to Rockwell C, of the skeleton, Cr-poor and eutectic regions after infiltrating were 56, 54 and 38 respectively and after austenitizing and quenching were 68, 63.5 and 67.5 respectively. The infiltrated samples were quite non-uniform in hardness between different regions, but the austenitized and quenched samples were quite uniform, and were, in fact, harder than the basic case in all instances.

From the exterior, it was possible in all cases to discern the original columns, however in all cases, the surface was quite flat, with only slight dimpling between columns, as would be expected by the capillary tension. For a powder sample, the surface would also be expected to be smooth with capillary films of liquid between the skeletal powders.

Trends

The designer can make use of the trends discussed above in choosing the mode of complementarity to use. If erosion can easily be handled by using sacrificial elements near the in-gate or multiple in-gates, then the basic mode can be used with little problem. Further, although the D2 type examples used demonstrate noticeable inhomogeneity in composition and properties for the near tie-line case, the importance of homogeneity will not be as significant for other steel families and non-steel compositions. Further, for some applications, less homogeneity can be tolerated.

For instance, a major reason for inhomogeneity in the D2 type example is the difference in the concentration of Cr between the infiltrant and the skeleton. Cr is a strong carbide former. D2 has about 12% wt Cr in the target composition, with about 9.76% in the skeleton, and 15.73% in the infiltrant, for the above described near tie-line example. There are other steels, discussed below, such as A3, which do not have as high a concentration of carbide formers (5.15% wt Cr in the target) such that the difference between the skeleton (4.45%) and infiltrant (6.29%) regions would not be as significant for the near tie line case.

Another important concept to be drawn from these trends is that in some cases, a selected process can tolerate fairly significant deviation from skeleton and infiltrant specifications, and the consequences of specific deviations will be understood by the skilled person in the art.

Solubility and Diffusivity

The foregoing discussion has focussed on how to select a skeleton and infiltrant combination that will infiltrate to achieve an infiltrated body that has a bulk composition that is approximately equal to a target composition. One important requirement is that the bulk composition lie in a field having a liquid phase and at least one solid phase. It is also generally, although not always, important that the system be one that can achieve a relatively high degree of homogeneity in a final product. Thus, the solubility and diffusivity of the melting point depressant agent in the skeleton is important.

Figure 6:
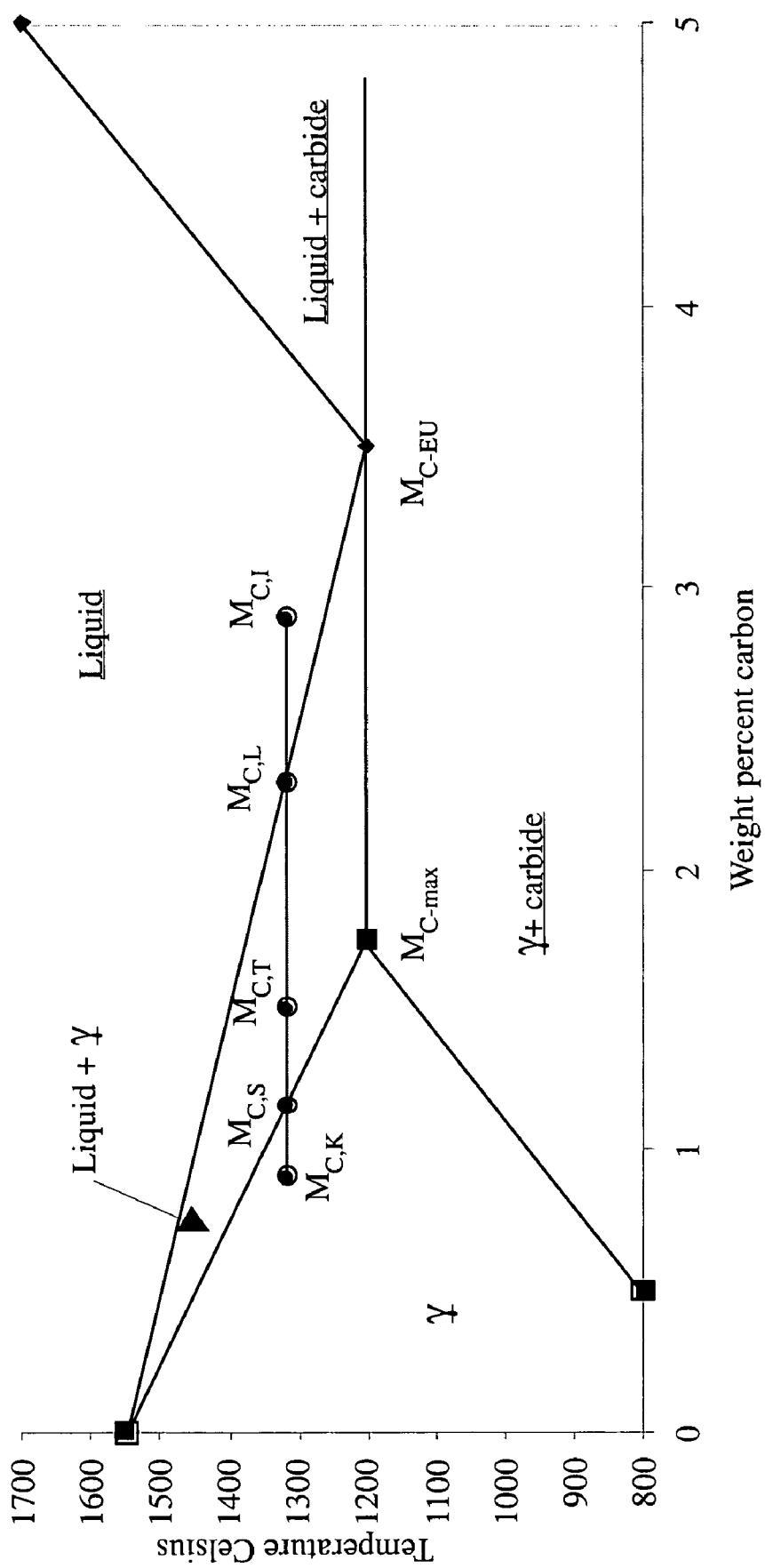
FIG. 6 is a schematic phase diagram relating temperature ° C. to wt % C, showing a case that can achieve complete solubility of the MPD (C) in an iron skeleton, which can be fully homogenized.

A certain solubility of the MPD element into the main skeletal metal (e.g. Fe) is required for at least some homogenization of the material after infiltration. Shown in FIG. 6 is a hypothetical phase diagram showing temperature vs % wt Carbon for a generic iron based alloy. The target composition of the material after infiltration is 1.5% wt C, as shown by point $M_{C,T}$. $M_{C-max}$ is the maximum solubility of carbon in the metal at the eutectic temperature, as shown about 1.75%. The infiltration temperature is chosen as 1335° C. (1608 K), which is, in this case, the temperature where 60% vol of the material is solid. At the infiltration temperature, the solidus and liquidus compositions are $M_{C,S}$ (1.075% wt C) and $M_{C,L}$ (2.15% wt C) respectively. The primary solubility requirement for complete homogenization is that the MPD (carbon) concentration of point $M_{C,T}$ be less than $M_{C-max}$. If this is true, then the material can be completely homogenized in the single phase field γ. In this case $M_{C,T}$=1.5 wt % and $M_{C-max}$=1.75 wt %, so the alloy is completely homogenizable.

If the target alloy contains a slight excess of carbon, so that the concentration of the carbon in the target is greater than the maximum solubility, but still less than a somewhat arbitrary multiple Z of the maximum solubility, $$M_{C-max} < M_{C,T} < Z^* M_{C-max},\quad\text{(Eq. 3)}$$

then the alloy is still partially homogenizable, so long as the carbon concentration in the skeleton is also less than the maximum carbon solubility, $$M_{C,K} < M_{C-max}.\quad\text{(Eq. 4)}$$

Figure 7:
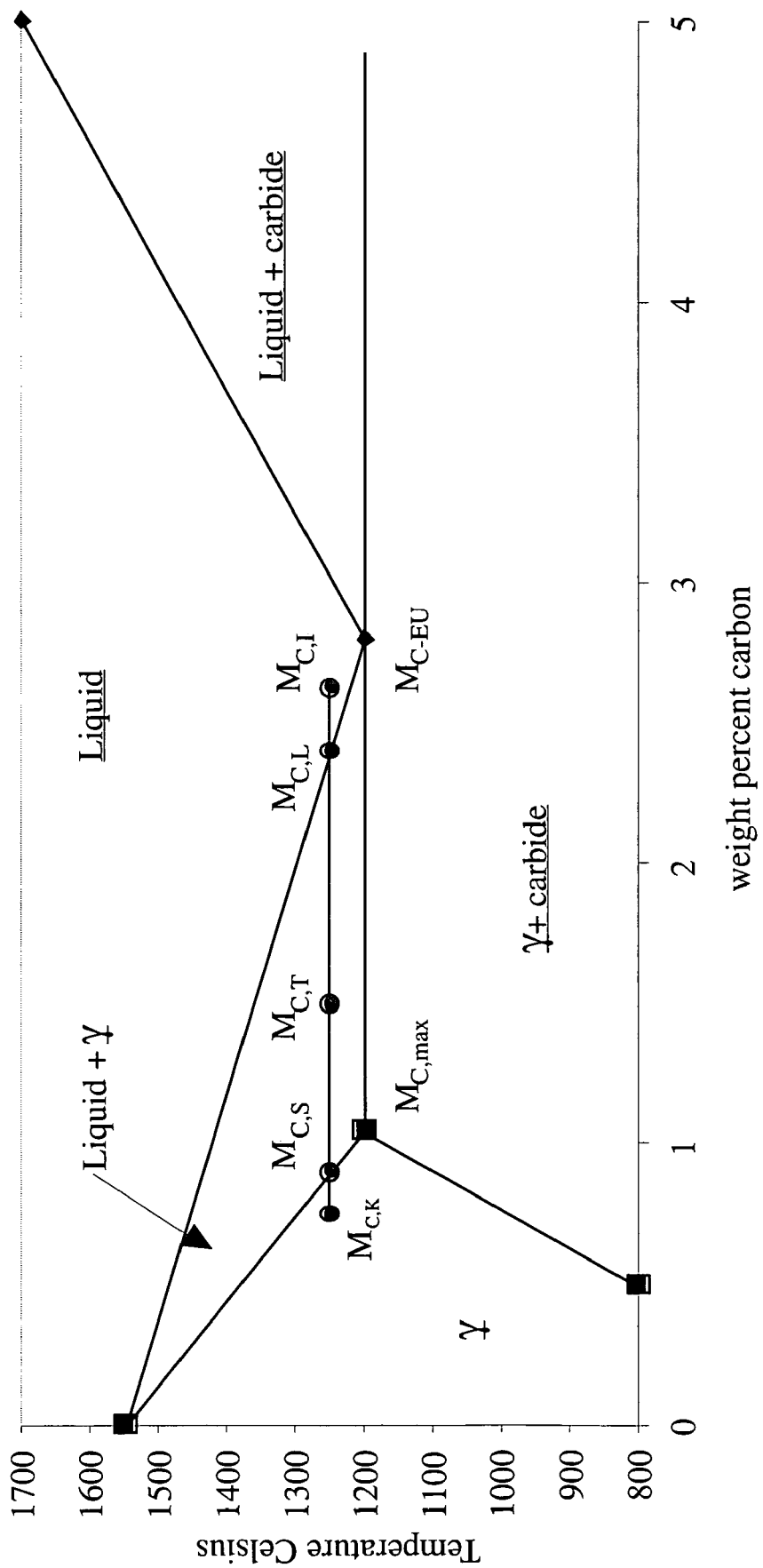
FIG. 7 is a schematic phase diagram relating temperature ° C. to wt % C, showing a case that can achieve partial solubility of the MPD (C) in an iron skeleton, which can be partially homogenized.

The degree of partial homogenizability is continuously varying, with there being less homogeneity for larger multiples Z. in general, for Z=2, a typically useful degree of homogeneity can be obtained. Such a case is shown in FIG. 7 for a 60% vol equilbrium solid at 1250° C. (1523 K) with 1.5% wt C in the target material and a solidus and liquidus composition of 0.9 and 2.4% wt C respectively, and $M_{C\text{-}max}=1.05\%$ wt C.

The foregoing considerations have been expressed using examples with C as the MPD. However, they are fully generalizable to systems using an MPD other than carbon such as silicon.

Figure 8:
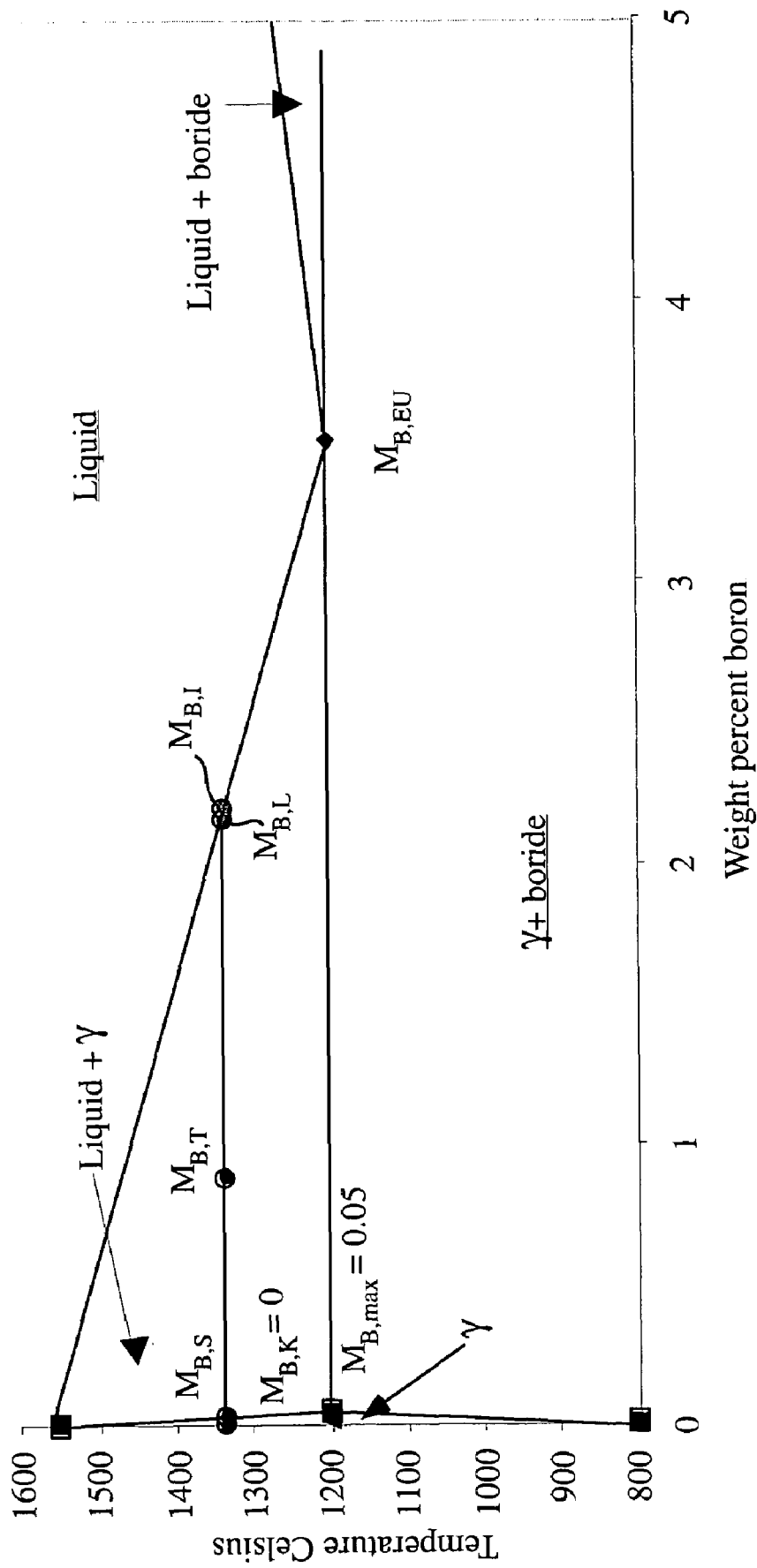
FIG. 8 is a schematic phase diagram relating temperature ° C. to wt % B, showing a case that can achieve virtually no solubility of the MPD (B) in an iron skeleton, which can be only slightly homogenized.

To illustrate an example that is not homogenizable, FIG. 8 shows using boron instead of carbon as the MPD. Then $M_{B\text{-}max} \ll M_{B,T}$. A schematic phase diagram is shown, with a 60% vol equilibrium solid, $M_{B,K}=0$; $M_{B,T}=0.88\%$ wt; $M_{B\text{-}max}=0.05\%$ wt; $M_{B,S}=0.03\%$ wt; $M_{B,L}=2.15\%$ wt; and $M_{B,I}=2.19\%$ wt. To have an alloy with B as a MPD at 60% solid, even be partially homogenizable, it must be that $M_{B\text{-}max}<2*M_{B,T}$. To achieve this condition, the temperature must be increased to 1525° C. (1798 K), which is only 25° C. less than the melting point with no B. This would be an unacceptably high infiltration temperature.

The maximum MPD concentration in a target alloy for a given system can be found by using the lever rule, the eutectic temperature and concentration of MPD at the eutectic ($M_{MPD\text{-}eu}$), the maximum solubility of the MPD in the base metal ($M_{MPD\text{-}max}$), and the minimum mass % of solid ($M_{S\text{-}min}$) that can be allowed in the solid-liquid two-phase product that affords sufficient strength, typically 50%. The maximum target MPD concentration $M_{MPD\text{-}max,T}$ will be at the eutectic temperature and is then:

$$M_{MPD\text{-}max,T}=M_{MPD\text{-}eu}-(M_{S\text{-}min}/100)*(M_{MPD\text{-}eu}-M_{MPD\text{-}max}). \quad \text{(Eq. 5)}$$

Targets having MPD concentrations less than $M_{MPD\text{-}eu,T}$ can be made at higher temperatures, while targets having greater MPD concentrations than $M_{MPD\text{-}eu,T}$ can not be made at that amount of equilibrium solid. At higher temperatures, replace $M_{MPD\text{-}eu}$ with $M_{MPD,L}$ (the mass % of MPD in the liquidus composition) and replace $M_{MPD\text{-}max}$ with $M_{MPD,S}$ (the mass % of MPD in the solidus composition) in the Eq. 5 above, to obtain the target composition ($M_{MpD\text{-}max,T}$) having the maximum MPD concentration at that higher temperature:

$$M_{MPD\text{-}max,T}=M_{MPD,L}-(M_{S\text{-}min}/100)*(M_{MPD,L}-M_{MPD,S}). \quad \text{(Eq. 6)}$$

Figure 20:
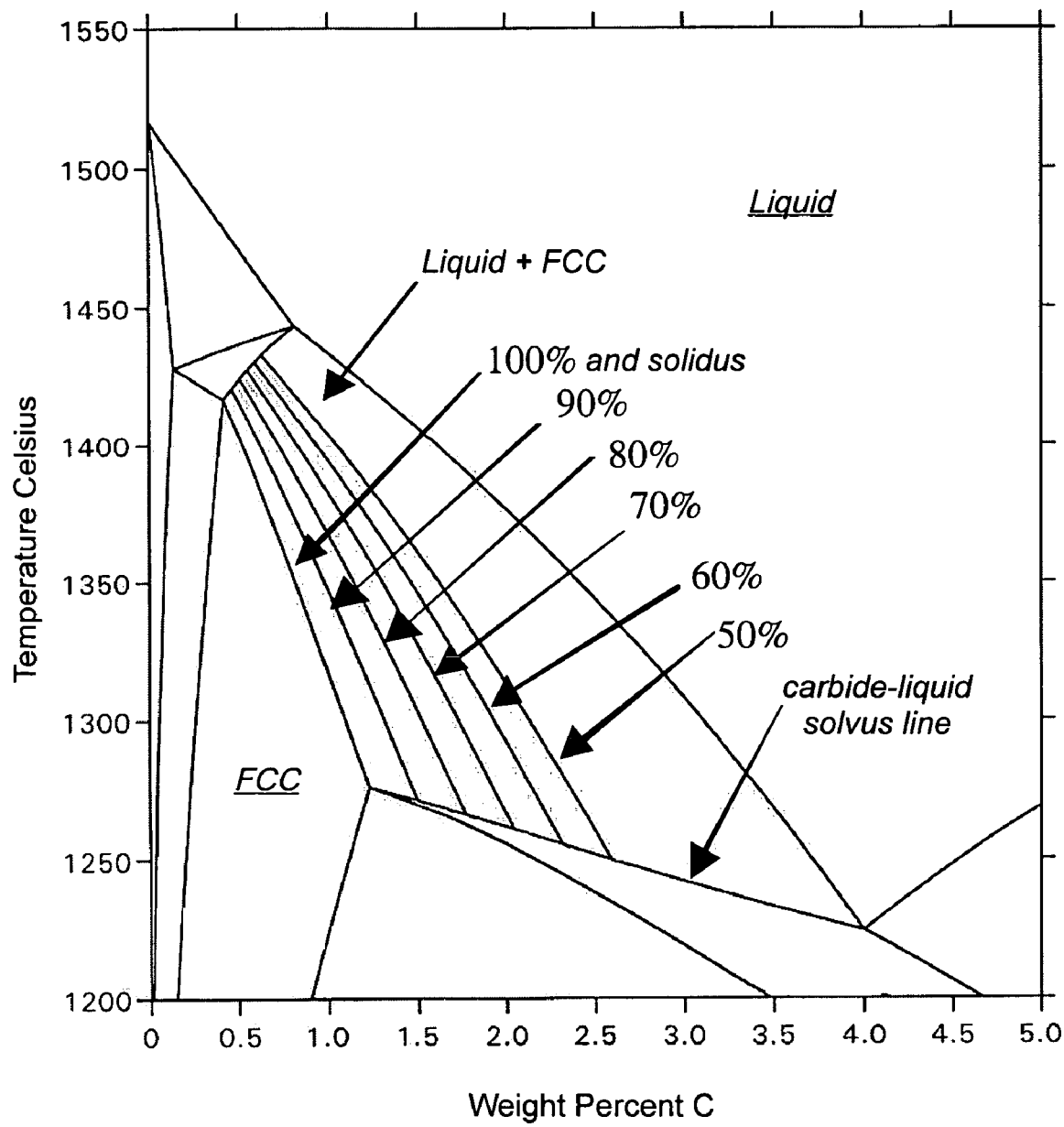
FIG. 20 is a schematic diagram relating temperature ° C. to wt % C, showing lines of different vol % solid at equilibrium for Fe with 12% Cr.

This may be represented graphically on a phase diagram. FIG. 20 shows a phase diagram with lines of equal mole % solid in the Fe—12 wt % Cr—C system for 90, 80, 70, 60 and 50 mole % solid over the entire two phase (liquid+FCC) region. (For this discussion, it can be assumed that vol % is nearly equal to mole %.) This says nothing about the starting composition of the skeleton and infiltrant, only what finished compositions are possible. For infiltration in the two-phase Liquid+FCC field, then the lowest temperature for infiltration is defined by the carbide-liquid solvus line, noted in the figure. The intersection of this line and any of the constant mole % lines, defines the maximum carbon content present in the target composition. Thus, for the ternary Fe—12Cr-C system shown, if a 50% solid is the minimum at equilibrium, then the maximum carbon content is about 2.6 wt %. If 60% solid is the minimum at equilibrium, the maximum carbon is 2.3 wt %.

A similar examination of the Al—Si system mentioned above will show that 7.1 wt % Si is the maximum amount of Si at the eutectic temperature with a minimum packing fraction of 50% (by mass). The eutectic composition is 12.6 wt % Si and the maximum solid solubility at the eutectic temperature is 1.6 wt %. Most commercial Al—Si or Al—Si—Mg alloys, have more than this amount of Si. Only alloys 443 (4.5-6 wt % Si), 356 and 357 (both with 6.5 to 7.5 wt % Si, and therefore borderline cases) have less than or about equal this amount, and thus are candidates for infiltration. Likewise, there are only a few, if any, candidates in the Al—Si—Cu system.

Diffusivity

Prior work infiltrating iron based skeletons with iron based infiltrants using carbon as a melting point depressant have generally found that carbon diffuses in iron so rapidly, that the infiltrant solidifies, and infiltration is choked off. One might therefore attempt to use a melting point depressant with a relatively low diffusivity, to avoid this choking off phenomena. However, the diffusivity cannot be so low that the time required to homogenize the material after the infiltration is complete is prohibitively long. There are a limited number of elements from which to choose possible MPDs for steel. Candidates must be present in sufficient amounts in the desired alloy. The amount that is sufficient depends on the effectiveness of a candidate as an MPD. For example, Chromium is present in many steels in moderate amounts (up to 25%), however, it has very little effect as an MPD and so is not a viable candidate. Molybdenum has more MPD effect than Chromium, but is typically only present in much smaller amounts in steel and so again is not a viable candidate. Four viable candidates are carbon, silicon, manganese (Mn) and nickel (Ni). The respective diffusivities of these 4 elements in iron at 1100° C. are $5.6 \times 10^{-11}$, $2.4 \times 10^{-13}$, $1.8 \times 10^{-15}$, $3.4 \times 10^{-16}$ (all m²/s). Thus, carbon and silicon are distinctly higher in diffusivity than the other two candidates, Ni and Mn. Examining Mn (which is faster diffusing than Ni), a numerical diffusion model has been run with a particle diameter of 50 microns and a packing fraction of 60%. After homogenization for 15 hours at 1100° C. this system would still have a concentration variation between particle center and infiltrant that was 25% of the starting variation. The use of Ni would lead to even more variation for the same homogenization treatment. These times will often make these candidates impractical choices.

A useful metric for choosing candidate MPDs must consider not only the diffusivity of the MPD, but also the diameter of the particles in the skeleton. A useful ratio, where L is the diameter of the particle and D is the diffusivity of the diffusing element is:

$$\text{Metric}=L^2/D. \quad \text{(Eq. 7)}$$

For example for the above descrbed case of Mn and 50 micron particles homogenized at 1100° C., this metric calculates to $1.4 \times 10^6$ seconds. In order to accomplish the homegenization in less than 15 hours, for any system, the Metric for that system must be lower than this benchmark value of $1.4 \times 10^6$ sec.

As has been discussed above, despite the problems with diffusional solidification resulting from high diffusivity of MPD, the present inventors have realized that full infiltration can be achieved even with a high diffusivity MPD, such as carbon or silicon in iron, if the parameters are selected as discussed above, to result in a significant liquid phase at equilibrium. And, further, with such relatively high diffusivity MPD, acceptable homogenization can be achieved. Further, and at least as important, the present inventors have realized that adequate results can be obtained using either carbon or silicon alone, or in combination, as the melting point agent, without any additional melting point depressing elements.

Of course, despite the foregoing, there may be other elements present in both the infiltrant and the skeleton that might have a depressing effect on he melting point of the infiltrant if they are present in the infiltrant and the skeleton in approximately their equilibrium concentrations for the target composition for a liquid and a solid portion respectively. If they are present in those amounts, they do not act significantly as a melting pot depressant. Further, such a potentially depressing element may be present in the infiltrant in an amount that is insignificantly greater than the equilibrium concentration, because for many compositions, manufacturing tolerances and material purities do not permit or require absolute ideal concentrations.

Other elements have a high diffusivity in Fe. For instance, the diffusivity of Al is fairly high—between that of C and Si in Fe. However Al has very little effect on the melting point of Fe below aluminum concentrations of ~20 wt % Al, so it is not an attractive MPD element. While there are some steels that contain small amounts of Al, none contain so much, so Al as a melting point depressant is impractical.

Selecting MPD and Non-MPD Concentrations

Turning now to a more specific discussion of how to select compositions of skeleton and infiltrant, reference may be had to FIG. 9 (in two parts, A and B), an overview flow chart which shows the steps used for a basic style method with one MPD element, as discussed above. Further, the steps used for the near tie-line, off tie-line, and reverse slope style methods, both with one and two MPD elements, are also shown in FIG. 9, and will be discussed below.

First, 900, a general metal system, such as D2, A3, Fe—C, etc. is chosen. This choice also necessitates choosing a final target bulk composition, including the mass % of the constituent elements. The mass % is equal to the weight %, both of which terms may be used interchangeable herein. (Typically, as used herein, all variables of an M with subscripts are mass % of items.) Next, 902 the packing fraction $V_{PF}$ (a volume %) is selected. This selection is principally based on the type of particulate material and the requirements of the manufacturing process being used, such as three-dimensional printing, metal injection molding, selective laser sintering, or die pressing.

Then the operator determines 904 a temperature $T_{PF}$ where the target composition will have the same vol % solid as the packing fraction of the skeleton, and a liquid volume equal to the void fraction of the skeleton. (This is not the same as another temperature discussed below, $T_{KS}$, the skeleton solidus, the temperature above which the original skeleton composition would soften.) Next, the tie-line composition of the solid of each element ($K_{Cr,S}$; $M_{Mo,S}$ etc) and liquid ($M_{Cr,L}$; $M_{Mo,L}$ etc) are determined 906 at $T_{PF}$, as well as the mass % of the entire solid and liquid phases, $M_S$ and $M_L$.

Next the operator selects 908, the style of infiltration, either: basic; near tie-line; off tie-line; or reverse-slope. It would be equally accurate to describe each different style of method as an independent method, rather than as a branch of an all-encompassing method, however since so many steps would be identical, it is more efficient and more instructive to describe them together. A flow chart for any of the styles as independent would be identical to FIG. 9, but without the selection step 908, and with only one of the four variation for assigning a style parameter R. In step 910(A-D) the operator assigns parameter R, which will control the amounts of non-MPD elements that are present in the skeleton. For the off-tie line 910C and reverse slope 910D cases, the operator may chose a different R for each non-MPD element (as discussed below). The effect of assigning different values for parameter R is discussed below.

The operator calculates 912 the mass % of each non-MPD element, e.g. Cr, in the skeleton using a specific instance of Eq. 1 above, the relation:

$$M_{Cr,K} = M_{Cr,T} + R_{Cr} * (M_{Cr,S} - M_{Cr,T}) \quad \text{(Eq. 8)}$$

The operator also calculates 912 the mass % of each non-MPD element, e.g. Cr, in the infiltrant using a specific instance of Eq. 2 above, the relation:

$$M_{Cr,I} = M_{Cr,K} + (M_{Cr,T} - M_{Cr,K})/M_I \quad \text{(Eq. 9)}$$

In the basic case of infiltration, when R=0, then step 912 simplifies to $M_{Cr,S} = M_{Cr,T}$ and $M_{Cr,I} = M_{Cr,K} = M_{Cr,T}$. The mass % of the non-MPD elements in the skeleton and in the infiltrant are the same as the mass % in the target. Note that it would also be reasonable to develop similar relations for the infiltrant compositions using the R factor. However, it is not necessary to do so, because the R factor is implicitly used in the infiltrant relation Eq. 9, because it is based on the skeleton composition $M_{Cr,K}$, which was developed with relation Eq. 8, which does include the R factor.

Next the operator decides 914 if one or two MPD elements are to be used. (Again, either branch could be considered an independent-style method, rather than alternate branches in an overall method.) Turning first to the case of one MPD element, the method proceeds directly to step 920, where a temperature $T_{SAFE}$ is chosen. Typically, 50<$T_{SAFE}$<100 for steels. This is how much temperature difference there will be between $T_{PF}$ and the solidus temperature of the skeleton $T_{KS}$, which is found in step 922 below. Next, the mass % of the MPD (carbon) in the skeleton 924 is calculated at $T_{KS}$ given the amounts of the non-MPD elements found in step 912 above. At this step, the skeleton is completely defined in terms of it's composition and mass % and vol %. The amount of iron in the skeleton may be found by adding up the mass % of all the elements and subtracting from 100%.

The amount of MPD to be in the liquid $M_{C,I}$ is determined 926 by applying the relation:

$$M_{C,I} = M_{C,K} + (M_{C,T} - M_{C,K})/M_I \quad \text{(Eq. 10)}$$

This relation is based on comparing the amount of MPD in the target and the skeleton, and making up the deficit by an excess in the infiltrant.

The operator decides 928 how much $\Delta V$ (if any) isothermal solidification will take place during infiltration.

The maximum possible amount of isothermal solidification is the void fraction $V_{VF}$ of the skeleton. However in practice, to ensure fluid flow through the skeleton will dictate that the maximum amount of isothermal solidification is the $V_{VF}$—approximately 15%. The operator then finds 930 $V_S$, the equilibrium solid volume fraction after infiltration by applying the relation $$V_S = V_K + \Delta V \quad \text{(Eq. 11)}$$

The operator calculates 932 the infiltration temperature $T_{INFIL}$ based on $V_S$ for the target composition, namely, $T_{INFIL}$ is the temperature at which the target composition has a solid volume fraction of $V_S$.

Next the operator 934 determines the liquidus temperature $T_{IL}$ of the infiltrant and checks 936 to be sure that $T_{IL} < T_{Infil}$. This ensures that the infiltrant is truly all liquid. If this is true, then the process of determining parameters is complete 938. Otherwise, the process returns and the operator may elect 940 to change one or more conditions or parameters to try to obtain better infiltration conditions without carbide stability in the liquid.

If two MPD elements are used, such as Si and C, after step 914 the operator proceeds to 916, and assigns, for the second MPD element, a parameter, such as, for Silicon, $P_{Si}$, where $0 < P_{Si} < \frac{1}{3}$. The operator determines the mass % of the second MPD, e.g. Si, in the skeleton, using the relation:

$$M_{Si,K} = P_{Si} * M_{Si,SPF}. \qquad \text{(Eq. 12)}$$

Then the operator calculates 918 the amount of the second MPD element in the liquid, using the relation:

$$M_{Si,I} = M_{Si,K} + (M_{Si,T} - M_{Si,K})/M_I. \qquad \text{(Eq. 13)}$$

The operator then proceeds to step 920 regarding $T_{SAFE}$ and continues as above.

If $T_{IL} > T_{Infil}$, then, to lower $T_{IL}$, the operator might try to lower $T_{SAFE}$, lower $V_{PF}$, or may lower the R parameter to chose a different complementary pair, decrease $\Delta V$ to decrease the tendency of carbides to form, or increase the P parameter to change the relative amounts of the two MPD elements or as a last resort, lower the target value of the MPD element.

Figure 17:
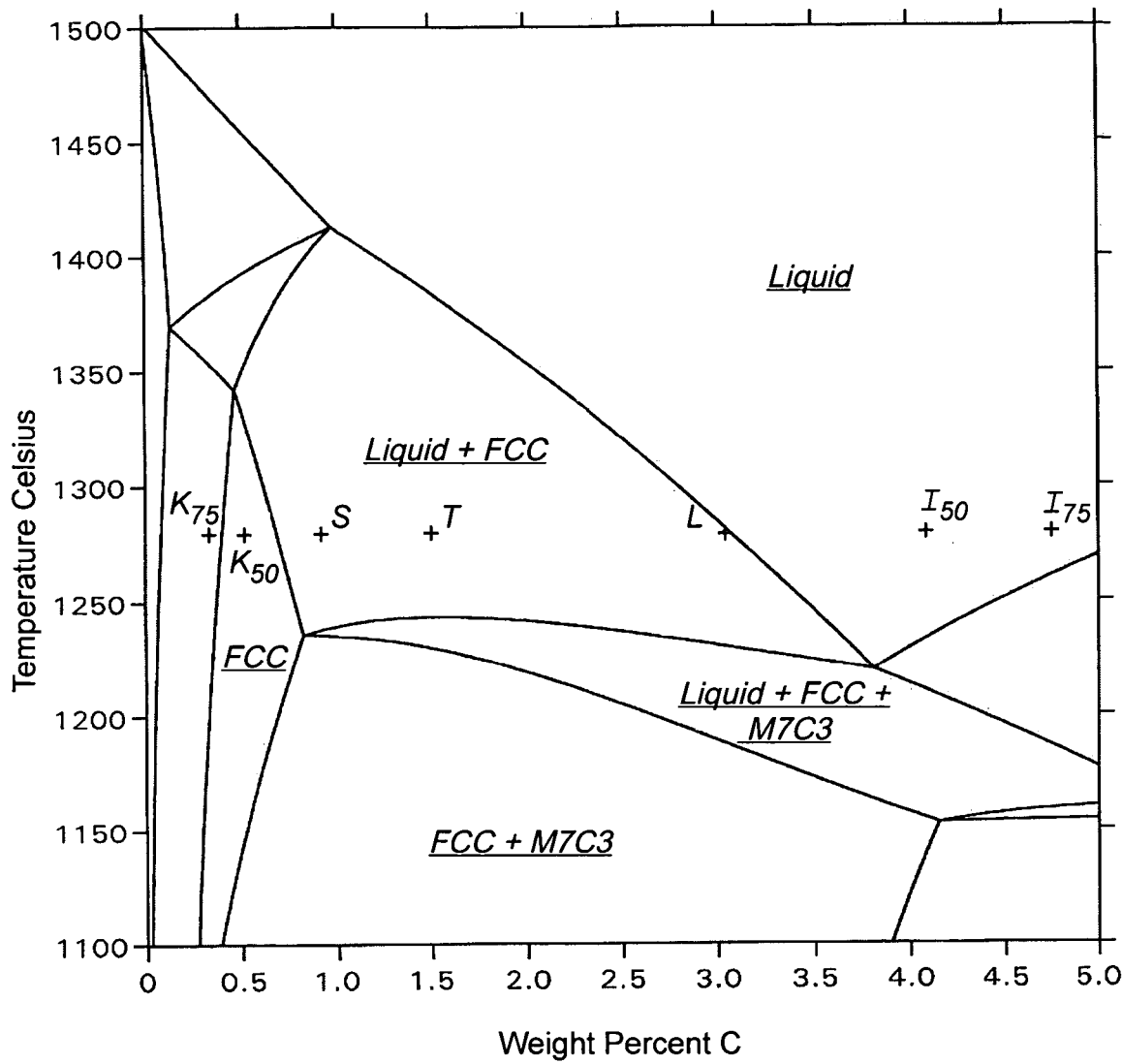
FIG. 17 is a phase diagram for D2 steel, showing the effects of using $T_{SAFE}=75°$ C. as compared to $T_{SAFE}=50°$ C.

FIG. 17 is a phase diagram for D2, showing the effect of varying $T_{SAFE}$ on the composition of skeleton and infiltrant pairs. The infiltration temperature is 1552 K, which results in 70% vol solid and 30% vol liquid. The inner pair of points $K_{50}$, $I_{50}$ result from setting $T_{SAFE}$=50 K. The outer pair of points $K_{75}$, $I_{75}$ result from setting $T_{SAFE}$=75 K. The skeleton can tolerate more carbon, with a smaller $T_{SAFE}$. For $T_{SAFE}$=50 K, $M_{C,K}$=0.52, and $M_{C,I}$=4.08. For $T_{SAFE}$=75 K, $M_{C,K}$=0.337 and $M_{C,I}$=4.74. For example, as shown in FIG. 4, relatively larger $T_{SAFE}$ results in the point KA moving toward lower C concentration, while relatively smaller $T_{SAFE}$ results in the point KA moving toward relatively higher C concentration, limited by the C concentration on the solidus line at the Cr concentration of the target composition.

FIG. 9 shows the steps that are used to determine basic mode complementary infiltrant and skeleton pairs relative to a target bulk composition, for the basic style of a method of the invention. FIG. 9 also shows the steps that are used to determine near tie-line mode complementary pairs if the near tie-line style method is used. The method steps are similar to the basic style method, except that the operator chooses a different value for R in step 910B. For the near tie-line case, R=1. It is important to note that more often in the near tie line case than in other cases, $T_{IL} < T_{Infil}$ in step 936.

In the step 912, of a near tie-line style method, the concentration of the non-MPD elements, such as Cr, Mo, etc., are set to different values than in the basic style method, because the R parameter equals 1, and not 0. For instance the concentration of Cr in the skeleton, $M_{Cr,K}$ is set to equal the concentration of Cr in the equilibrium solid $M_{Cr,S}$. And, the concentration of Cr in the infiltrant $M_{Cr,I}$ is set to equal the concentration of Cr in the equilibrium liquid composition $M_{Cr,L}$. So, the concentration of Cr in the skeleton and in the infiltrant differ from each other, and also, differ from the concentration of Cr in the target, $M_{Cr,T}$. With the basic style method, all these Cr concentrations are equal. The remaining steps for the tie-line style method are the same as the corresponding steps for the basic style method.

Regarding the off tie-line style method, FIG. 9 shows the steps that are used. Again, the only difference is step 910C as discussed here. In general, the steps of both the basic and the near tie line techniques are conducted to determine the amount of non-MPD that the skeleton should have as above for both techniques. Then, the amount of non-MPD in the skeleton for the off-tie-line style is taken to be somewhere in between these two concentrations. Once the skeleton concentration is determined, the infiltrant concentration of MPD and non-MPD elements is determined as complementary in the same manner as was done for the near tie line technique.

There are an infinite number of off tie-line pairs that might be used, as discussed above, depending on how near to the basic style or near tie-line style, the operator chooses to be. As shown in FIG. 9, one way to choose the off tie-line parameters is for each non-MPD element n, such as Cr, Mo, V etc., (in the D2 case) to assign 912C a parameter $R_n$, such as $R_{Cr}$, $R_{Mo}$, etc.

The parameter for the off tie-line case typically meets the condition $0 \leq R_n \leq 1$. Recall that R=0 is the basic case, and R=1 is the near tie-line case. It is also possible that for one, but not all of the elements, $R_n$=1. For instance, it could be that $R_{Mo}$=1, $R_V$=1, and $R_{Cr}$=½. This is an off tie-line case, even though some R parameters equal 1.

Then the $R_n$ parameter is used to calculate 912 the concentration of the non-MPD element in the skeleton and the infiltrant. Using Cr as an example, the concentrations of Cr in the skeleton, $M_{Cr,K}$ (using the same relation (Eq. 8) as discussed above for the other styles) is again given as:

$$M_{Cr,K} = M_{Cr,T} + R_{Cr} * (M_{Cr,S} - M_{Cr,T}). \qquad \text{(Eq. 8)}$$

And the concentration of Cr in the infiltrant, $M_{Cr,I}$ (using the same relation (Eq. 9) as discussed above for the other styles) is again given as:

$$M_{Cr,I} = M_{Cr,K} + (M_{Cr,T} - M_{Cr,K})/M_L. \qquad \text{(Eq. 9)}$$

For the off tie-line style, $R_n$ does not equal 0. However letting $R_n$ approach 0 and $R_n$ approach 1 is illustrative. As $R_n$ approaches 0, the concentration of non-MPD elements in the skeleton and the infiltrant that results from step 912 approach the concentration in the target, which is what happens in the basic style method. As $R_n$ approaches 1, the concentration of non-MPD elements in the skeleton that result from step 912 approaches the concentration in the equilibrium solid and the concentration of non-MPD element in the infiltrant approaches the concentration in the equilibrium liquid, which is what happens in the near tie-line style method. With $R_n$ closer to 0, the outcome will be more similar to the basic style method, and with it closer to 1, the outcome will be more similar to the near tie-line style method.

Regarding the reverse slope style methods, FIG. 9 also shows the steps that are used. Again, the only difference is step 910D as discussed here.

There are an infinite number of reverse slope pairs that might be used, as discussed above, depending on how near to the basic style, the operator chooses to be. As shown in FIG. 9, one way to choose the negative slope parameters is for each non-MPD element n, such as Cr, Mo, V etc., (in the D2 case) assign 912D a parameter $R_n$, such as $R_{Cr}$, $R_{Mo}$, etc.

The parameter for the reverse slope case meets the condition $-1 \leq R_n \leq 0$, where if $R_n$ were to equal 0 for all non-MPD elements it would be the basic style method. If $R_n$=−1 the slope of the line joining the complementary pairs is equally far from the basic case as is the near tie-line case, only in the opposite direction.

Then the $R_n$ parameter is used to calculate 912 the concentration of the non-MPD element in the skeleton and the infiltrant. Using Cr as an example, the concentrations of Cr in the skeleton, $M_{Cr,K}$ is given as (again, using the same relation as above Eq. 8):

$$M_{Cr,K}=M_{Cr,T}+R_{Cr}*(M_{Cr,S}-M_{Cr,T}).\qquad\text{(Eq. 8)}$$

And the concentration of Cr in the infiltrant, $M_{Cr,I}$ is given (again using Eq. 9) as:

$$M_{Cr,I}=M_{Cr,K}+(M_{Cr,T}-M_{Cr,K})/M_I.\qquad\text{(Eq. 9)}$$

Note that if $R_n$ were to approach 0, the concentration of non-MPD elements in the skeleton and the infiltrant that results from step 912 would be the same as the concentration in the target, which is what happens in the basic style method. For $R_n=-1$, the difference in concentration of non-MPD elements in the skeleton from the target value that result from step 912 is the same magnitude as in the near tie-line case where R=1, but of the opposite sign.

Actually, there is no theoretical lower bound for the R parameter for a reverse slope style method. Minus 1 was chosen only because it simplifies explanation, and also because it is not likely that an operator would use an R factor with a significantly larger absolute value. However, setting −1 as the lower bound is arbitrary.

The foregoing description of a system design process first chose a packing fraction, from which a skeleton composition was determined based on the target composition. Then an infiltration temperature is chosen so that the infiltrate body would be in a two-phase field with an acceptably large liquid volume portion. Then, an infiltrant composition was determined so that the final bulk composition would be in the target range. Thus, it may be characterized as a packing fraction driven method.

It would be conceptually equivalent to design such a system by first picking a skeleton composition and then determining a manufacturable packing fraction, such as by three-D printing or other solid free form fabrication processes listed above, or, any other suitable process that results in a porous metal body suitable for infiltration. Next, a complementary infiltration composition can be chosen, and then an infiltration temperature is chosen so that the infiltrate body is in a two-phase field. Such a design system could be considered to be skeleton composition driven.

It would also be possible to first choose an infiltrant composition, and then either a skeleton composition, or a packing fraction. Such a design process would be considered to be infiltrant composition driven. However, because it is much more expensive to make a custom composition powder than it is to make a custom composition infiltrant, it would be impractical to follow an infiltrant composition driven method.

It would also be theoretically possible to pick a liquid composition second in either a packing fraction or skeleton composition driven method. However, for similar reasons, it would be highly impractical to do so.

Changing the order of selection of parameters will change checks that the designer makes.

Returning to a more detailed discussion of a skeleton composition driven process, generally, it may be convenient to pick a skeleton composition first because the availability of custom powders is more limited than that of custom infiltrants, and, setting infiltration temperatures over wide ranges is generally routine.

FIG. 10 outlines steps a designer and operator would follow for a skeleton driven process. The nomenclature used in the skeleton driven flowchart, FIG. 10, is the same as that used for the packing fraction driven flowchart, FIG. 9.

To design a skeleton-infiltrant pair and appropriate infiltration temperature using a skeleton driven methodology, the operator first chooses a target composition in step 1000 by selecting the target weight percentages of the elements in the target alloy, $M_{C,T}$; $M_{Cr,T}$; $M_{Mo,T}$; etc. Next in step 1002, the operator chooses the skeleton composition, $M_{C,K}$; $M_{Cr,K}$; $M_{Mo,K}$; etc. With the exception of the MPD element, these values may be chosen to be equal to the respective target values, which results in a basic style of infiltration. Or, they may be chosen as some other value (for example a pre-made powder that is close to the target composition, but varies slightly in one or more non-MPD elements, and has a lower concentration of the MPD element than the target), which would result, probably, in an off-tie line or reverse slope style method. In step 1004, the operator determines, through calculation or experimentation (for example differential scanning calorimetry) the solidus temperature of the skeleton powder. Next, in step 1006, the operator determines $T_{SAFE}$ for the skeleton, where typically 50° C.<$T_{SAFE}$<100° C.

In step 1008, the operator determines the packing fraction of the skeleton powder that results from whichever manufacturing method is chosen to form the skeleton (for instance, 3D-printing, Selective Laser Sintering, Fused Deposition Modeling, Laminated Object Manufacturing, Metal Injection Molding, or die-pressing). In step 1010, the operator finds $T_{PF}$, the temperature where the target composition has the same volume fraction solid ($V_S$) as the packing fraction of the skeleton ($V_{PF}$), with the remaining target composition being liquid.

The operator tests if $T_{KS}>T_{SAFE}+T_{PF}$ in step 1012. If yes, the process continues to step 1014, otherwise, the process goes to step 1028, where the operator may choose different values of $V_{PF}$ $T_{SAFE}$ or the skeleton composition. If using a pre-existing powder, the operator will likely have limited control over the skeleton composition, perhaps only being able to adjust the carbon concentration by decarburizing it. A person skilled in the art of the manufacturing process (of the skeleton object) may be able to slightly adjust $V_{PF}$ by changing processing parameters of that process. Or $V_{PF}$ may be altered slightly by sieving the powder appropriately before making the skeleton. The process returns to step 1002 if changes are made.

In step 1014, the operator finds the infiltrant composition of each element (MPD and non MPD) by using the expression Eq. 10 as above, which is repeated here:

$$M_{C,I}=M_{C,K}+(M_{C,T}-M_{C,K})/M_I.\qquad\text{(Eq. 10)}$$

In step 1016, the operator determines the liquidus temperature of the infiltrant, $T_{IL}$.

Next in step 1018, the operator decides on how much material will solidify during infiltration, ΔV. Then the volume solid ($V_S$) present after infiltration and partial solidification is determined in step 1020. Then the operator determines the infiltration temperature ($T_{IL}$) where the amount of solid at equilibrium is equal to $V_S$, step 1022.

In step 1024, the operator compares $T_{IL}$ to $T_{INFIL}$. If $T_{IL}<T_{infil}$, then the process is complete, 1026. Otherwise, the process goes to step 1030, where the operator may elect to change ΔV, $V_{PF}$, $T_{SAFE}$, or the skeleton composition.

In the packing fraction driven method, shown in FIG. 9, the operator has more opportunity to affect the solidus temperature of the skeleton than in the skeleton composition driven method, shown in FIG. 10. In the skeleton composition driven method, the act of successfully selecting the skeleton composition, particularly the MPD elements, may initially require iteration until the operator acquires experience with the particular process. The resulting style of infiltration (basic, near tie line, etc.) is not necessarily immediately evident in the skeleton composition driven method, although a designer will develop a feel for how different elements behave in regard to their solid/liquid/ target compositions, and how close the skeleton and infiltrant compositions chosen are to any one of the four method styles. That is an operator may develop an intuitive feel for trends in the thermodynamics of the alloy system without resorting to phase diagrams or software programs. If phase diagrams of the types shown in FIGS. 3 and 4 are available that cover the approximate range of target, skeleton and infiltrant, then these will aid in choosing a skeleton without having a selected packing fraction.

Any designer may opt to use both flow charts. If designing a system from the start, and knowing an approximate $V_{PF}$ that is likely to be obtained by the skeleton manufacturing process, the designer can use the volume fraction driven method, illustrated in FIG. 9, to find a suitable skeleton composition and develop a specification (with it's own range of allowable compositions) to provide to a powder manufacturer. Once the powder is made, the designer can use the skeleton composition driven method, shown in FIG. 10, to account for variations both in the skeleton composition, and in the packing fraction of the powder, to obtain the desired target value by designing an appropriate infiltrant, since the infiltrant is the easiest component to adjust.

T-Safe

The initial discussion above regarding the four modes of complementarity is in some ways simplified, because for each mode, the MPD (e.g. C) concentration in the skeletons are equal to each other, and the MPD concentration in the infiltrants are equal to each other (while being different from the concentration in the skeleton). That method of choosing MPD concentration is useful, and straightforward. However, it is not the same method as is illustrated in the flow chart FIG. 9, for the near tie-line and off tie-line modes, respectively. Using that illustrated method, the MPD concentrations will all differ slightly, as shown in FIG. 5, where the MPD concentrations for the basic, off-lie line and near tie-line cases are KA=0.25, KC=0.5 and KB=0.7 wt %, respectively. The reason is that the MPD concentration for the skeletons shown in FIG. 5 were calculated 924 using an equal $T_{KS}$ for each mode, where as the MPD concentrations shown in FIG. 4, which are equal for each of the modes, were simply determined by using the method shown in the flowchart FIG. 9 for the basic style, and then using the same MPD concentration in the skeleton for each mode of complimentarity.

However, if the method illustrated in flowcharts FIG. 9 step 910B (near tie-line) and step 910D (off tie-line) are used, the MPD concentrations in the skeleton differ, with the lowest concentration being for the basic mode, and the highest concentration being for the near tie-line mode. Using the method illustrated in the flow chart FIG. 9, steps 922 and 924, allows the designer to choose a skeleton having a higher concentration of MPD, while still being sure that the actual solidus of the skeleton composition is at least $T_{SAFE}$ degrees greater than the infiltration temperature. If the designer can tolerate a larger concentration of MPD in the skeleton, then the system requires a lower concentration of MPD in the infiltrant. (This is a consequence of standard application of the lever rule, etc.) This is potentially beneficial in that the liquid and solid phases immediately after infiltration has completed will be more equal in MPD concentration, and thus, the end product will be more homogeneous in MPD. However, due to the high diffusivity of C as an MPD, this is only a minor consideration for carbon. But, for another MPD, such as Si (Silicon) (discussed below), which has a diffusivity that is lower than that of carbon, it may be useful. Further, and perhaps more importantly, it means that if erosion is a problem, then it may be useful to have less C in the skeleton.

Thus, for the near tie line case, variations in $T_{SAFE}$ result in variations in the MPD (C) concentration. Thus, as shown in FIG. 4, the near tie-line MPD skeleton concentration KA could be anywhere along the line $KB_{SAFE}$ to a lower limit as discussed above. Consequently, a complementary near tie-line MPD infiltrant concentration can be along the line $IB_{SAFE}$ at a location that is complementary to the skeleton MPD concentration. Thus, the endpoints KB and IB can lie along the lines $KB_{SAFE}$ and $IB_{SAFE}$ respectively, with the lower extreme of the skeleton concentration and the higher extreme of the infiltrant concentration being governed by conditions already discussed.

ADDITIONAL EXAMPLES

The example systems summarized in Example tables E1 -E16 below) will also provide an infiltrated skeleton such that, at equilibrium, a solid and a sufficiently large, liquid phase persists, thereby allowing full infiltration, and subsequent partial homogenization by diffusion. The degree of homogenization is addressed in a section below. In each primary example, a system having 60% volume solid, 40% volume liquid at equilibrium is used. The equilibrium and infiltration temperature in degrees K is $T_{40liq}$, which is the same as $T_{60sol}$, as used above. This is the temperature at which a target having the bulk composition as desired will be 60% vol solid and 40% vol. In a selected few examples, (for steels D2 and A3), an additional case is also shown, with 70% vol solid and 30% vol liquid at equilibrium. In that case, the relevant infiltration temperature is $T_{70sol}$.

All of these examples show all four styles of methods, basic, near tie-line, off tie-line and reverse slope. (It is worth pointing out that for all of these, except as noted above and in the tables below at equilibrium, the solid/liquid volume ratio is 60/40. Other ratios are also important for different calculations, and they are not the same as the volume ratios, nor are they the same as each other. The mole percent liquid and solid values are given, as are the weight percent liquid and solid values. The packing fraction of the skeleton, except where noted, is 60% vol solid, with a void fraction of 40% vol void. The temperature $T_{KS}$ is the skeleton solidus temperature in degrees K, which should be between 50 and 100 degrees K higher than the infiltration temperature $T_{40liq}$. The wt % C at the skeleton solidus temperature is also given separately in the row designated with the alloy name, under the column wt % C@$T_{KS}$. For instance, for the alloy D2, it is 0.3.

The target composition is given in the row entitled Target. This is the bulk composition of the final, infiltrated product. If the product could achieve complete homogenization, this would be its composition throughout.

Basic Style

The composition of the skeleton according to the basic style method discussed above, is given in the row entitled Skeleton A. The composition of the infiltrant is given in the row entitled Infiltrant A. Note that in all cases, the concentration of C, the MPD, is higher in the infiltrant than it is in the target, in which the concentration is higher than it is in the skeleton. (There are a few examples (S6, H13, CN-7MS and CF-10SMnN) that use silicon (Si) as an MPD, either alone, or in combination with C. These are discussed below.)

The concentration of elements in the solid portion at equilibrium is given in the row entitled 60% solid. The concentration of elements in the liquid portion is given in the row entitled 40% Liquid. These are equilibrium values.

The concentration of the non-MPD elements other than Fe (e.g. Cr, Mn, Mo, etc.), for both the skeleton and infiltrant, are equal to their concentration in the target. These relationships are clearly seen in FIG. 4.

Near Tie-Line Style

For the near tie-line style, the composition of the skeleton is given in the row entitled Skeleton B. The composition of the infiltrant is given in the row entitled Infiltrant B. The concentration of C (MPD) in the skeleton B equals the concentration of MPD in the skeleton in the basic style skeleton A. Similarly, the carbon concentration in the infiltrant B equals that in the basic style, Infiltrant A. The concentrations of the major non-MPD element, Cr, follow a different pattern. In the Skeleton B, the Cr concentration equals the Cr concentration in the 60% Solid, equilibrium composition. Similarly, the Cr concentration in the Infiltrant B is the same as the concentration of Cr in the 40% Liquid equilibrium composition. These relationships are also evident from FIG. 4, where it can be seen that for the basic style, each of the Skeleton SA, target T, and Infiltrant IA, and have equal C concentrations. Further, the skeleton for the basic and near tie line styles have equal C concentrations, but different Cr concentrations, which is also the case for the two infiltrant compositions IA and IB.

Off Tie-Line Style

For the off tie-line style, the composition of the skeleton is given in the row Skeleton C, and the infiltrant is given in the row Infiltrant C. In general, for most off tie-line cases, $R=\frac{1}{2}$ was used. Quick review reveals that the C (MPD) concentrations in the Skeleton is equal to the C concentration in the skeletons for both the basic and near tie-line styles, while the Cr (non-MPD) concentration is between the Cr concentrations for the same two skeletons. Similarly, the complementary Infiltrant C concentration is equal to the C concentrations for the other two styles, while the Cr composition is in between them.

In all three styles the other non-MPD elements (Mn, Mo, Ni, Si, V) can have equal concentrations in all components, because the effects of their presence is very small, if any, on erosion and homogeneity.

In general, for the skeletons, specified in the following example tables, a custom powder is required, and for the infiltrants, a custom metal is required.

EXAMPLE TABLE E1

D2 Alloy

| Alloy | $T_{40liq}$ | $T_{KS}$ | wt % C @ $T_{KS}$ | mol % liq | mol % sol | wt % liq | wt % sol |
|---|---|---|---|---|---|---|---|
| D2 | 1579 | 1630 | 0.3 | 38.94 | 61.06 | 37.49 | 62.51 |

| | C | Cr | Mn | Mo | Ni | Si | V | Fe actual |
|---|---|---|---|---|---|---|---|---|
| Target Range | 1.4–1.6 | 11–13 | 0.6 max | 0.7–1.0 | 0.3 max | 0.6 max | 1.1 max | balance |
| Target | 1.50 | 12.00 | 0.40 | 1.00 | 0.20 | 0.40 | 1.00 | 83.50 |
| $V_L$ = 40% | 2.63 | 15.73 | 0.50 | 1.72 | 0.19 | 0.33 | 1.88 | 77.02 |
| $V_S$ = 60% | 0.82 | 9.76 | 0.34 | 0.57 | 0.21 | 0.44 | 0.48 | 87.38 |
| basic: | | | | | | | | |
| Infiltrant - A | 3.50 | 12.00 | 0.40 | 1.00 | 0.20 | 0.40 | 1.00 | 81.50 |
| Skeleton - A | 0.30 | 12.00 | 0.40 | 1.00 | 0.20 | 0.40 | 1.00 | 84.70 |
| near tie-line: | | | | | | | | |
| Infiltrant - B | 3.50 | 15.73 | 0.40 | 1.72 | 0.20 | 0.40 | 1.88 | 76.17 |
| Skeleton - B | 0.30 | 9.76 | 0.40 | 0.57 | 0.20 | 0.40 | 0.48 | 87.90 |
| off tie-line: R = 0.5 | | | | | | | | |
| Infiltrant - C | 3.50 | 13.87 | 0.40 | 1.36 | 0.20 | 0.40 | 1.43 | 78.84 |
| Skeleton - C | 0.30 | 10.88 | 0.40 | 0.78 | 0.20 | 0.40 | 0.74 | 86.30 |
| reverse slope: R = −0.42 | | | | | | | | |
| Infiltrant - D | 3.79 | 10.45 | 0.40 | 0.70 | 0.20 | 0.40 | 0.63 | 83.42 |
| Skeleton - D | 0.13 | 12.93 | 0.40 | 1.18 | 0.20 | 0.40 | 1.22 | 83.54 |

EXAMPLE TABLE E2

M2 Alloy

| Alloy | $T_{40liq}$ | $T_{KS}$ | wt % C @ $T_{KS}$ | mol % liq | mol % sol | wt % liq | wt % sol |
|---|---|---|---|---|---|---|---|
| M2 | 1574 | 1624 | 0.09 | 39.39 | 60.61 | 39.29 | 60.71 |

| | C | Cr | Mn | Mo | Ni | Si | V | W | Fe actual |
|---|---|---|---|---|---|---|---|---|---|

EXAMPLE TABLE E2-continued

M2 Alloy

|  | | | | | | | | | |
|---|---|---|---|---|---|---|---|---|---|
| Target Range | 0.95–1.05 | 3.75–4.25 | 0.15–0.40 | 4.5–5.5 | 0.3 max | 0.2–0.45 | 1.75–2.2 | 5.5–6.75 | balance |
| Target | 1.00 | 4.15 | 0.28 | 5.00 | 0.20 | 0.32 | 2.00 | 6.13 | 80.92 |
| $V_L$ = 40% | 1.82 | 4.96 | 0.31 | 7.64 | 0.17 | 0.24 | 3.26 | 8.98 | 72.63 |
| $V_S$ = 60% | 0.47 | 3.63 | 0.26 | 3.29 | 0.22 | 0.37 | 1.18 | 4.29 | 86.28 |
| basic: | | | | | | | | | |
| Infiltrant - A | 2.41 | 4.15 | 0.28 | 5.00 | 0.20 | 0.32 | 2.00 | 6.13 | 79.51 |
| Skeleton - A | 0.09 | 4.15 | 0.28 | 5.00 | 0.20 | 0.32 | 2.00 | 6.13 | 81.83 |
| near tie-line: | | | | | | | | | |
| Infiltrant - B | 2.41 | 4.96 | 0.28 | 7.64 | 0.20 | 0.32 | 3.26 | 8.98 | 71.95 |
| Skeleton - B | 0.09 | 3.63 | 0.28 | 3.29 | 0.20 | 0.32 | 1.18 | 4.29 | 86.72 |
| off tie-line: R = 0.5 | | | | | | | | | |
| Infiltrant - C | 2.41 | 4.55 | 0.28 | 6.32 | 0.20 | 0.32 | 2.63 | 7.55 | 75.73 |
| Skeleton - C | 0.09 | 3.89 | 0.28 | 4.15 | 0.20 | 0.32 | 1.59 | 5.21 | 84.28 |
| reverse slope R = −0.5 | | | | | | | | | |
| Infiltrant - D | 2.43 | 3.75 | 0.28 | 3.68 | 0.20 | 0.32 | 1.37 | 11.69 | 76.28 |
| Skeleton - D | 0.08 | 4.41 | 0.28 | 5.86 | 0.20 | 0.32 | 2.41 | 2.54 | 83.91 |

EXAMPLE TABLE E3

440C Alloy

| Alloy | $T_{40liq}$ | $T_{KS}$ | wt % C @ $T_{KS}$ | mol % liq | mol % sol | wt % liq | wt % sol |
|---|---|---|---|---|---|---|---|
| 440C | 1597 | 1647 | 0.13 | 38.94 | 61.06 | 37.81 | 62.19 |

|  | C | Cr | Mn | Mo | Si | Fe actual |
|---|---|---|---|---|---|---|
| Target Range | 0.95–1.20 | 16–18 | 1 max | 0.75 max | 1 max | balance |
| Target | 1.07 | 17.00 | 0.80 | 0.70 | 0.80 | 79.63 |
| $V_L$ = 40% | 1.85 | 21.30 | 0.97 | 1.15 | 0.83 | 73.90 |
| $V_S$ = 60% | 0.60 | 14.40 | 0.70 | 0.43 | 0.78 | 83.10 |
| basic: | | | | | | |
| Infiltrant - A | 2.62 | 17.00 | 0.80 | 0.70 | 0.80 | 78.08 |
| Skeleton - A | 0.13 | 17.00 | 0.80 | 0.70 | 0.80 | 80.57 |
| near tie-line: | | | | | | |
| Infiltrant - B | 2.62 | 21.30 | 0.80 | 0.70 | 0.80 | 73.78 |
| Skeleton - B | 0.13 | 14.40 | 0.80 | 0.70 | 0.80 | 83.17 |
| off tie-line: R = 0.5 | | | | | | |
| Infiltrant - C | 2.62 | 19.14 | 0.80 | 0.70 | 0.80 | 75.95 |
| Skeleton - C | 0.13 | 15.70 | 0.80 | 0.70 | 0.80 | 81.87 |
| reverse slope R = −0.5 | | | | | | |
| Infiltrant - D | 2.62 | 14.85 | 0.80 | 0.70 | 0.80 | 80.23 |
| Skeleton - D | 0.13 | 18.30 | 0.80 | 0.70 | 0.80 | 79.27 |

EXAMPLE TABLE E4

Austenitic Manganese Grade C Alloy

| Alloy | $T_{40liq}$ | $T_{KS}$ | wt % C @ $T_{KS}$ | mol % liq | mol % sol | wt % liq | wt % sol |
|---|---|---|---|---|---|---|---|
| Aust Mn 'C' | 1568 | 1628 | 0.33 | 39.59 | 60.41 | 38.47 | 61.53 |

|  | C | Cr | Mn | Si | Fe actual |
|---|---|---|---|---|---|
| Target Range | 1.05–1.35 | 1.5–2.5 | 11.5–14 | 1 max | balance |
| Target | 1.20 | 2.00 | 12.75 | 0.80 | 83.25 |
| $V_L$ = 40% | 2.00 | 2.43 | 15.15 | 0.87 | 79.56 |
| $V_S$ = 60% | 0.70 | 1.73 | 11.25 | 0.76 | 85.57 |
| basic: | | | | | |
| Infiltrant - A | 2.59 | 2.00 | 12.75 | 0.80 | 81.86 |
| Skeleton - A | 0.33 | 2.00 | 12.75 | 0.80 | 84.12 |
| near tie-line: | | | | | |
| Infiltrant - B | 2.59 | 2.43 | 15.15 | 0.80 | 79.03 |
| Skeleton - B | 0.33 | 1.73 | 11.25 | 0.80 | 85.89 |
| off tie-line: R = 0.5 | | | | | |
| Infiltrant - C | 2.59 | 2.22 | 13.95 | 0.80 | 80.44 |
| Skeleton - C | 0.33 | 1.87 | 12.00 | 0.80 | 85.01 |

EXAMPLE TABLE E4-continued

| Austenitic Manganese Grade C Alloy | | | | | |
|---|---|---|---|---|---|
| reverse slope R = −0.5 | | | | | |
| Infiltrant - D | 2.64 | 1.79 | 17.44 | 0.80 | 77.34 |
| Skeleton - D | 0.30 | 2.14 | 9.82 | 0.80 | 86.94 |

EXAMPLE TABLE E5

| H13 alloy | | | | | | | | |
|---|---|---|---|---|---|---|---|---|
| Alloy | $T_{40liq}$ | $T_{KS}$ | wt % C @ $T_{KS}$ | wt % Si @ $T_{KS}$ | mol % liq | mol % sol | wt % liq | wt % sol |
| H13 | 1694 | 1744 | 0.05 | 0.37 | 39.29 | 60.71 | 38.66 | 61.34 |
| | | C | Cr | Mn | Mo | Ni | Si | V | Fe actual |
|---|---|---|---|---|---|---|---|---|---|
| Target Range | | 0.32–0.45 | 4.75–5.5 | 0.2–0.5 | 1.1–1.75 | 0.3 max | 0.8–1.0 | 0.8–1.0 | balance |
| Target | | 0.37 | 5.15 | 0.33 | 1.42 | 0.20 | 1.00 | 1.00 | 90.53 |
| $V_L$ = 40% | | 0.80 | 5.73 | 0.42 | 1.80 | 0.22 | 1.16 | 1.31 | 88.57 |
| $V_S$ = 60% | | 0.10 | 4.78 | 0.28 | 1.18 | 0.19 | 0.90 | 0.81 | 91.77 |
| basic: | | | | | | | | | |
| Infiltrant - A | | 0.88 | 5.15 | 0.33 | 1.42 | 0.20 | 2.00 | 1.00 | 89.02 |
| Skeleton - A | | 0.05 | 5.15 | 0.33 | 1.42 | 0.20 | 0.37 | 1.00 | 91.48 |
| near tie line: | | | | | | | | | |
| Infiltrant - B | | 0.88 | 5.73 | 0.33 | 1.80 | 0.20 | 2.00 | 1.31 | 87.75 |
| Skeleton - B | | 0.05 | 4.78 | 0.33 | 1.18 | 0.20 | 0.37 | 0.81 | 92.28 |
| off tie-line: R = 0.5 | | | | | | | | | |
| Infiltrant - C | | 0.88 | 5.44 | 0.33 | 1.61 | 0.20 | 2.00 | 1.15 | 88.39 |
| Skeleton - C | | 0.05 | 4.97 | 0.33 | 1.30 | 0.20 | 0.37 | 0.90 | 91.88 |
| reverse slope R = −0.5 | | | | | | | | | |
| Infiltrant - D | | 0.88 | 4.86 | 0.33 | 1.23 | 0.20 | 2.09 | 0.85 | 89.56 |
| Skeleton - D | | 0.05 | 5.34 | 0.33 | 1.54 | 0.20 | 0.31 | 1.10 | 91.14 |

EXAMPLE TABLE E6

| S6 Alloy | | | | | | | | |
|---|---|---|---|---|---|---|---|---|
| Alloy | $T_{40liq}$ | $T_{KS}$ | wt % C @ $T_{KS}$ | wt % Si @ $T_{KS}$ | mol % liq | mol % sol | wt % liq | wt % sol |
| S6 | 1678 | 1728 | 0.10 | 0.96 | 39.52 | 60.48 | 38.87 | 61.13 |
| | C | Cr | Mn | Mo | Si | V | Fe actual |
|---|---|---|---|---|---|---|---|
| Target Range | 0.40–0.50 | 1.2–1.5 | 1.2–1.5 | 0.3–0.5 | 2.0–2.5 | 0.2–0.4 | balance |
| Target | 0.45 | 1.35 | 1.35 | 0.40 | 2.25 | 0.25 | 93.95 |
| $V_L$ = 40% | 0.80 | 1.49 | 1.67 | 0.55 | 2.74 | 0.35 | 92.41 |
| $V_S$ = 60% | 0.23 | 1.26 | 1.15 | 0.31 | 1.94 | 0.19 | 94.93 |
| basic: | | | | | | | |
| Infiltrant - A | 1.00 | 1.35 | 1.35 | 0.40 | 4.29 | 0.25 | 91.36 |
| Skeleton - A | 0.10 | 1.35 | 1.35 | 0.40 | 0.96 | 0.25 | 95.59 |
| near tie-line: | | | | | | | |
| Infiltrant - B | 1.00 | 1.49 | 1.67 | 0.40 | 4.29 | 0.25 | 90.90 |
| Skeleton - B | 0.10 | 1.26 | 1.15 | 0.40 | 0.96 | 0.25 | 95.88 |
| off tie-line: R = 0.5 | | | | | | | |
| Infiltrant - C | 1.00 | 1.42 | 1.51 | 0.40 | 4.29 | 0.25 | 91.14 |
| Skeleton - C | 0.10 | 1.31 | 1.25 | 0.40 | 0.96 | 0.25 | 95.74 |
| reverse slope R = −0.5 | | | | | | | |
| Infiltrant - D | 1.00 | 1.28 | 1.97 | 0.40 | 4.30 | 0.25 | 90.80 |
| Skeleton - D | 0.10 | 1.40 | 0.96 | 0.40 | 0.95 | 0.25 | 95.95 |

EXAMPLE TABLE E7

A3 Alloy

| Alloy | $T_{40liq}$ | $T_{KS}$ | wt % C @ $T_{KS}$ | mol % liq | mol % sol | wt % liq | wt % sol |
|---|---|---|---|---|---|---|---|
| A3 | 1624 | 1674 | 0.37 | 39.33 | 60.67 | 38.24 | 61.76 |

| | C | Cr | Mn | Mo | Ni | Si | V | Fe actual |
|---|---|---|---|---|---|---|---|---|
| Target Range | 1.2–1.3 | 4.75–5.5 | 0.4–0.6 | 0.9–1.4 | 0.3 max | 0.5 max | 0.8–1.4 | balance |
| Target | 1.25 | 5.15 | 0.50 | 1.15 | 0.20 | 0.25 | 1.10 | 90.40 |
| $V_L$ = 40% | 2.10 | 6.29 | 0.63 | 1.88 | 0.20 | 0.27 | 1.89 | 86.75 |
| $V_S$ = 60% | 0.72 | 4.45 | 0.42 | 0.70 | 0.20 | 0.24 | 0.61 | 92.66 |
| basic: | | | | | | | | |
| Infiltrant - A | 2.67 | 5.15 | 0.50 | 1.15 | 0.20 | 0.25 | 1.10 | 88.98 |
| Skeleton - A | 0.37 | 5.15 | 0.50 | 1.15 | 0.20 | 0.25 | 1.10 | 91.28 |
| Near tie-line: | | | | | | | | |
| Infiltrant - B | 2.67 | 6.29 | 0.50 | 1.88 | 0.20 | 0.25 | 1.89 | 86.32 |
| Skeleton - B | 0.37 | 4.45 | 0.50 | 0.70 | 0.20 | 0.25 | 0.61 | 92.92 |
| off tie line: R = 0.5 | | | | | | | | |
| Infiltrant - C | 2.67 | 5.72 | 0.50 | 1.51 | 0.20 | 0.25 | 1.49 | 87.66 |
| Skeleton - C | 0.37 | 4.80 | 0.50 | 0.93 | 0.20 | 0.25 | 0.86 | 92.10 |
| reverse slope R = −0.5 | | | | | | | | |
| Infiltrant - D | 2.70 | 4.58 | 0.50 | 0.79 | 0.20 | 0.25 | 0.71 | 90.28 |
| Skeleton - D | 0.35 | 5.50 | 0.50 | 1.38 | 0.20 | 0.25 | 1.34 | 90.48 |

EXAMPLE TABLE E8

O6 Alloy

| Alloy | $T_{40liq}$ | $T_{KS}$ | wt % C @ $T_{KS}$ | mol % liq | mol % sol | wt % liq | wt % sol |
|---|---|---|---|---|---|---|---|
| O6 | 1597 | 1647 | 0.56 | 39.98 | 60.02 | 38.10 | 61.90 |

| | C | Cr | Mn | Mo | Ni | Si | Fe actual |
|---|---|---|---|---|---|---|---|
| Target Range | 1.25–1.55 | 0.3 max | 0.3–1.1 | 0.2–0.3 | 0.3 max | 0.55–1.5 | balance |
| Target | 1.40 | 0.20 | 0.70 | 0.25 | 0.20 | 1.03 | 96.23 |
| $V_L$ = 40% | 2.22 | 0.23 | 0.89 | 0.41 | 0.20 | 1.22 | 94.83 |
| $V_S$ = 60% | 0.88 | 0.18 | 0.58 | 0.15 | 0.20 | 0.90 | 97.12 |
| basic: | | | | | | | |
| Infiltrant - A | 2.76 | 0.20 | 0.70 | 0.25 | 0.20 | 1.03 | 94.87 |
| Skeleton - A | 0.56 | 0.20 | 0.70 | 0.25 | 0.20 | 1.03 | 97.06 |
| near tie-line: | | | | | | | |
| Infiltrant - B | 2.76 | 0.23 | 0.89 | 0.41 | 0.20 | 1.22 | 94.29 |
| Skeleton - B | 0.56 | 0.18 | 0.58 | 0.15 | 0.20 | 0.90 | 97.43 |
| off tie-line: R = 0.5 | | | | | | | |
| Infiltrant - C | 2.76 | 0.22 | 0.80 | 0.33 | 0.20 | 1.13 | 94.57 |
| Skeleton - C | 0.56 | 0.19 | 0.64 | 0.20 | 0.20 | 0.96 | 97.25 |
| reverse slope R = −0.5 | | | | | | | |
| Infiltrant - D | 2.80 | 0.18 | 0.61 | 0.17 | 0.20 | 0.93 | 95.12 |
| Skeleton - D | 0.54 | 0.21 | 0.76 | 0.30 | 0.20 | 1.09 | 96.90 |

EXAMPLE TABLE E9

CN-7MS

| Alloy | $T_{40liq}$ | $T_{KS}$ | wt % Si @ $T_{KS}$ | mol % liq | mol % sol | wt % liq | wt % sol |
|---|---|---|---|---|---|---|---|
| CN-7MS | 1534 | 1584 | 0.75 | 37.78 | 62.22 | 36.93 | 63.07 |

| | C | Cr | Mn | Mo | Ni | Si | Cu | Fe actual |
|---|---|---|---|---|---|---|---|---|
| Target Range | 0.07 max | 18.0–20.0 | 1.5 max | 2.5–3.0 | 22.0–25.0 | 1.5 max | 1.5–2.0 | balance |
| Target | 0.05 | 19.00 | 1.00 | 2.75 | 23.50 | 3.00 | 1.75 | 48.95 |
| $V_L$ = 40% | 0.11 | 21.51 | 1.05 | 3.04 | 17.52 | 4.78 | 1.68 | 50.31 |
| $V_S$ = 60% | 0.02 | 17.53 | 0.97 | 2.58 | 27.00 | 1.96 | 1.79 | 48.15 |
| basic: | | | | | | | | |
| Infiltrant - A | 0.05 | 19.00 | 1.00 | 2.75 | 23.50 | 6.84 | 1.75 | 45.11 |
| Skeleton - A | 0.05 | 19.00 | 1.00 | 2.75 | 23.50 | 0.75 | 1.75 | 51.20 |
| Near tie-line: | | | | | | | | |
| Infiltrant - B | 0.11 | 21.51 | 1.00 | 3.04 | 17.52 | 6.84 | 1.68 | 48.30 |
| Skeleton - B | 0.02 | 17.53 | 1.00 | 2.58 | 27.00 | 0.75 | 1.79 | 49.33 |
| off tie-line: R = 0.5 | | | | | | | | |
| Infiltrant - C | 0.08 | 20.26 | 1.00 | 2.90 | 20.51 | 6.84 | 1.72 | 46.71 |
| Skeleton - C | 0.03 | 18.27 | 1.00 | 2.67 | 25.25 | 0.75 | 1.77 | 50.26 |
| reverse slope R = −0.5 | | | | | | | | |
| Infiltrant - D | 0.05 | 17.75 | 1.00 | 2.61 | 26.49 | 6.92 | 1.79 | 43.41 |
| Skeleton - D | 0.05 | 19.74 | 1.00 | 2.84 | 21.75 | 0.71 | 1.73 | 52.19 |

EXAMPLE TABLE E10

410 + C alloy

| Alloy | $T_{40liq}$ | $T_{KS}$ | wt % C @ $T_{KS}$ | mol % liq | mol % sol | wt % liq | wt % sol |
|---|---|---|---|---|---|---|---|
| 410 + C | 1625 | 1675 | 0.11 | 39.26 | 60.74 | 38.28 | 61.72 |

| | C | Cr | Mn | Si | Fe actual |
|---|---|---|---|---|---|
| Target Range | 0.9–1.1 | 11.5–13.5 | 1 max | 1 max | balance |
| Target | 1.00 | 12.00 | 1.00 | 1.00 | 85.00 |
| $V_L$ = 40% | 1.64 | 14.58 | 1.24 | 1.16 | 81.38 |
| $V_S$ = 60% | 0.60 | 10.40 | 0.81 | 0.90 | 87.29 |
| basic: | | | | | |
| Infiltrant - A | 2.43 | 12.00 | 1.00 | 1.00 | 83.57 |
| Skeleton - A | 0.11 | 12.00 | 1.00 | 1.00 | 85.89 |
| near tie-line: | | | | | |
| Infiltrant - B | 2.43 | 14.58 | 1.00 | 1.00 | 80.99 |
| Skeleton - B | 0.11 | 10.40 | 1.00 | 1.00 | 87.49 |
| off tie-line: R = 0.5 | | | | | |
| Infiltrant - C | 2.43 | 13.29 | 1.00 | 1.00 | 82.28 |
| Skeleton - C | 0.11 | 11.20 | 1.00 | 1.00 | 86.69 |
| reverse slope R = −0.5 | | | | | |
| Infiltrant - D | 2.44 | 10.71 | 1.00 | 1.00 | 84.85 |
| Skeleton - D | 0.11 | 12.80 | 1.00 | 1.00 | 85.09 |

EXAMPLE TABLE E11

Fe-1.5C-12Cr alloy

| Alloy | $T_{40liq}$ | $T_{KS}$ | wt % C @ $T_{KS}$ | mol % liq | mol % sol | wt % liq | wt % sol |
|---|---|---|---|---|---|---|---|
| Fe-1.5C-12Cr | 1626 | 1676 | 0.51 | 38.53 | 61.47 | 37.22 | 62.78 |

| | C | Cr | Fe actual |
|---|---|---|---|
| Target Range | 1.4–1.6 | 11–13 | balance |
| Target | 1.50 | 12.00 | 86.50 |
| $V_L$ = 40% | 2.37 | 15.45 | 82.18 |
| $V_S$ = 60% | 0.97 | 9.95 | 89.08 |
| basic: | | | |
| Infiltrant - A | 3.17 | 12.00 | 84.83 |
| Skeleton - A | 0.51 | 12.00 | 87.49 |
| target (check) | 1.50 | 12.00 | 86.50 |
| near tie-line: | | | |
| Infiltrant - B | 3.17 | 15.45 | 81.38 |
| Skeleton - B | 0.51 | 9.95 | 89.54 |
| target (check) | 1.50 | 12.00 | 86.50 |
| off tie-line: | | | |
| Infiltrant - C | 3.17 | 13.73 | 83.10 |
| Skeleton - C | 0.51 | 10.98 | 88.51 |
| target (check) | 1.50 | 12.00 | 86.50 |
| reverse slope: | −0.50 | | |
| Infiltrant - D | 3.24 | 10.28 | 86.49 |
| Skeleton - D | 0.47 | 13.03 | 86.51 |
| target (check) | 1.50 | 12.00 | 86.50 |

EXAMPLE TABLE E12

T8 alloy

| Alloy | $T_{40liq}$ | $T_{KS}$ | wt % C @ $T_{KS}$ | mol % liq | mol % sol | wt % liq | wt % sol |
|---|---|---|---|---|---|---|---|
| T8 | 1585 | 1635 | 0.06 | 38.80 | 61.20 | 39.26 | 60.74 |

| | C | Cr | Mn | Mo | Ni | Si | V | W | Co | Fe actual |
|---|---|---|---|---|---|---|---|---|---|---|
| Target Range | 0.75–0.85 | 3.75–4.5 | 0.2–0.4 | 0.4–1.0 | 0.3 max | 0.2–0.4 | 1.8–2.4 | 13.25–14.75 | 4.75–5.75 | balance |
| Target | 0.80 | 4.13 | 0.30 | 0.70 | 0.20 | 0.30 | 2.10 | 14.00 | 5.25 | 77.48 |
| $V_L = 40\%$ | 1.49 | 5.00 | 0.33 | 0.99 | 0.17 | 0.24 | 3.28 | 19.29 | 4.69 | 69.22 |
| $V_S = 60\%$ | 0.35 | 3.56 | 0.28 | 0.51 | 0.22 | 0.26 | 1.34 | 10.58 | 5.62 | 82.90 |
| basic | | | | | | | | | | |
| infiltrant - A | 1.95 | 4.13 | 0.30 | 0.70 | 0.20 | 0.30 | 2.10 | 14.00 | 5.25 | 76.32 |
| skeleton - A | 0.06 | 4.13 | 0.30 | 0.70 | 0.20 | 0.30 | 2.10 | 14.00 | 5.25 | 78.22 |
| near tie-line: | | | | | | | | | | |
| Infiltrant - B | 1.95 | 5.00 | 0.30 | 0.99 | 0.20 | 0.30 | 3.28 | 19.29 | 4.69 | 68.69 |
| Skeleton - B | 0.06 | 3.56 | 0.30 | 0.51 | 0.20 | 0.30 | 1.34 | 10.58 | 5.62 | 83.16 |
| off tie-line: R = 0.5 | | | | | | | | | | |
| Infiltrant - C | 1.95 | 4.56 | 0.30 | 0.85 | 0.18 | 0.30 | 2.69 | 16.64 | 4.97 | 72.52 |
| Skeleton - C | 0.06 | 3.84 | 0.30 | 0.61 | 0.21 | 0.30 | 1.72 | 12.29 | 5.43 | 80.68 |
| reverse slope R = −0.5 | | | | | | | | | | |
| Infiltrant - D | 1.96 | 3.69 | 0.30 | 0.55 | 0.20 | 0.30 | 1.51 | 11.36 | 5.53 | 80.13 |
| Skeleton - D | 0.05 | 4.41 | 0.30 | 0.79 | 0.20 | 0.30 | 2.48 | 15.71 | 5.07 | 75.76 |

EXAMPLE TABLE E13

CF-10SMnN alloy

| Alloy | $T_{40liq}$ | $T_{KS}$ | wt % Si @ $T_{KS}$ | mol % liq | mol % sol | wt % liq | wt % sol |
|---|---|---|---|---|---|---|---|
| CF-10SMnN | 1541 | 1591 | 1.46 | 39.46 | 60.54 | 39.01 | 60.99 |

| | C | Cr | Mn | Ni | Si | N | Fe actual |
|---|---|---|---|---|---|---|---|
| Target range | 0.10 max | 16.0–18.0 | 7.0–9.0 | 8.0–9.0 | 3.5–4.5 | .08–0.18 | balance |
| Target | 0.05 | 17.00 | 8.00 | 8.50 | 4.00 | 0.13 | 62.32 |
| $V_L = 40\%$ | 0.10 | 18.65 | 8.80 | 7.99 | 4.77 | 0.17 | 59.53 |
| $V_S = 60\%$ | 0.02 | 15.94 | 7.49 | 8.82 | 3.51 | 0.11 | 64.11 |
| basic | | | | | | | |
| infiltrant - A | 0.05 | 17.00 | 8.00 | 8.50 | 7.97 | 0.13 | 58.35 |
| skeleton - A | 0.05 | 17.00 | 8.00 | 8.50 | 1.46 | 0.13 | 64.86 |
| near tie-line: | | | | | | | |
| Infiltrant - B | 0.05 | 18.65 | 8.80 | 7.99 | 7.97 | 0.13 | 56.41 |
| Skeleton - B | 0.05 | 15.94 | 7.49 | 8.82 | 1.46 | 0.13 | 66.11 |
| off tie-line: R = 0.5 | | | | | | | |
| Infiltrant - C | 0.05 | 17.83 | 8.40 | 8.25 | 7.97 | 0.13 | 57.37 |
| Skeleton - C | 0.05 | 16.47 | 7.74 | 8.66 | 1.46 | 0.13 | 65.48 |
| reverse slope R = −0.5 | | | | | | | |
| Infiltrant - D | 0.05 | 16.18 | 7.60 | 8.76 | 8.10 | 0.13 | 59.19 |
| Skeleton - D | 0.05 | 17.53 | 8.26 | 8.34 | 1.38 | 0.13 | 64.32 |

EXAMPLE TABLE E14

| | | | | ACI HF alloy | | | | |
|---|---|---|---|---|---|---|---|---|
| Alloy | $T_{40liq}$ | $T_{KS}$ | wt % Si @ $T_{KS}$ | mol % liq | mol % sol | wt % liq | wt % sol | |
| ACI-HF | 1607 | 1657 | 0.16 | 39.18 | 60.82 | 38.54 | 61.46 | |
| | | | C | Cr | Ni | Si | Fe actual | |
| Target Range | | | 0.2–0.5 | 19–23 | 9–12 | 2 max | balance | |
| Target | | | 0.30 | 21.00 | 10.50 | 1.75 | 66.45 | |
| $V_L$ = 40% | | | 0.58 | 24.03 | 9.65 | 2.21 | 63.54 | |
| $V_S$ = 60% | | | 0.12 | 19.10 | 11.03 | 1.46 | 68.28 | |

EXAMPLE TABLE E14-continued

| | ACI HF alloy | | | | |
|---|---|---|---|---|---|
| basic | | | | | |
| infiltrant - A | 0.62 | 21.00 | 10.50 | 4.28 | 63.60 |
| skeleton - A | 0.10 | 21.00 | 10.50 | 0.16 | 68.24 |
| near tie-line: | | | | | |
| Infiltrant - B | 0.62 | 24.03 | 9.65 | 4.28 | 61.42 |
| Skeleton - B | 0.10 | 19.10 | 11.03 | 0.16 | 69.61 |
| off tie-line: R = 0.5 | | | | | |
| Infiltrant - C | 0.62 | 22.52 | 10.08 | 4.28 | 62.51 |
| Skeleton - C | 0.10 | 20.05 | 10.77 | 0.16 | 68.92 |
| reverse slope R = −0.5 | | | | | |
| Infiltrant - D | 0.66 | 26.92 | 8.84 | 4.29 | 59.30 |
| Skeleton - D | 0.08 | 17.29 | 11.54 | 0.16 | 70.94 |

EXAMPLE TABLE E15

| | | | | D2 70% solid at equilibrium | | | | |
|---|---|---|---|---|---|---|---|---|
| Alloy | $T_{30liq}$ | $T_{KS}$ | wt % C @ $T_{KS}$ | mol % liq | mol % sol | wt % liq | wt % sol | |
| D2 | 1552 | 1602 | 0.52 | 29.00 | 71.00 | 27.56 | 72.44 | |
| | C | Cr | Mn | Mo | Ni | Si | V | Fe actual |
| Target Range | 1.4–1.6 | 11–13 | 0.6 max | 0.7–1.0 | 0.3 max | 0.6 max | 1.1 max | balance |
| Target | 1.50 | 12.00 | 0.40 | 1.00 | 0.20 | 0.40 | 1.00 | 83.50 |
| $V_L$ = 30% | 3.03 | 17.20 | 0.52 | 2.00 | 0.18 | 0.25 | 2.30 | 74.52 |
| $V_S$ = 70% | 0.92 | 10.00 | 0.36 | 0.62 | 0.21 | 0.46 | 0.50 | 86.95 |
| basic: | | | | | | | | |
| Infiltrant - A | 4.08 | 12.00 | 0.40 | 1.00 | 0.20 | 0.40 | 1.00 | 80.92 |
| Skeleton - A | 0.52 | 12.00 | 0.40 | 1.00 | 0.20 | 0.40 | 1.00 | 84.48 |
| near tie-line: | | | | | | | | |
| Infiltrant - B | 4.08 | 17.20 | 0.40 | 2.00 | 0.20 | 0.40 | 2.30 | 73.42 |
| Skeleton - B | 0.52 | 10.02 | 0.40 | 0.62 | 0.20 | 0.40 | 0.50 | 87.34 |
| off tie-line: R = 0.5 | | | | | | | | |
| Infiltrant - C | 4.08 | 14.60 | 0.40 | 1.50 | 0.20 | 0.40 | 1.65 | 77.17 |
| Skeleton - C | 0.52 | 11.01 | 0.40 | 0.81 | 0.20 | 0.40 | 0.75 | 85.91 |
| reverse slope R = −0.42 | | | | | | | | |
| Infiltrant - D | 4.52 | 9.84 | 0.40 | 0.58 | 0.20 | 0.40 | 0.46 | 83.59 |
| Skeleton - D | 0.35 | 12.82 | 0.40 | 1.16 | 0.20 | 0.40 | 1.21 | 83.46 |

EXAMPLE E16

| | | A3 70% Solid at Equilibrium | | | | | |
|---|---|---|---|---|---|---|---|
| Alloy | $T_{30liq}$ | $T_{KS}$ | wt % C @ $T_{KS}$ | mol % liq | mol % sol | wt % liq | wt % sol |
| A3 | 1603 | 1653 | 0.47 | 29.43 | 70.57 | 28.38 | 71.62 |

| | C | Cr | Mn | Mo | Ni | Si | V | Fe actual |
|---|---|---|---|---|---|---|---|---|
| Target Range | 1.2–1.3 | 4.75–5.5 | 0.4–0.6 | 0.9–1.4 | 0.3 max | 0.5 max | 0.8–1.4 | balance |
| Target | 1.25 | 5.15 | 0.50 | 1.15 | 0.20 | 0.25 | 1.10 | 90.40 |
| $V_L = 30\%$ | 2.36 | 6.68 | 0.65 | 2.14 | 0.20 | 0.24 | 2.21 | 85.52 |
| $V_S = 70\%$ | 0.81 | 4.54 | 0.44 | 0.76 | 0.20 | 0.25 | 0.66 | 92.34 |
| basic: | | | | | | | | |
| Infiltrant - A | 3.23 | 5.15 | 0.50 | 1.15 | 0.20 | 0.25 | 1.10 | 88.42 |
| Skeleton - A | 0.47 | 5.15 | 0.50 | 1.15 | 0.20 | 0.25 | 1.10 | 91.18 |
| near tie-line: | | | | | | | | |
| Infiltrant - B | 3.23 | 6.68 | 0.50 | 2.14 | 0.20 | 0.25 | 2.21 | 84.79 |
| Skeleton - B | 0.47 | 4.54 | 0.50 | 0.76 | 0.20 | 0.25 | 0.66 | 92.63 |
| off tie-line: R = 0.5 | | | | | | | | |
| Infiltrant - C | 3.23 | 5.92 | 0.50 | 1.65 | 0.20 | 0.25 | 1.66 | 86.61 |
| Skeleton - C | 0.47 | 4.85 | 0.50 | 0.95 | 0.20 | 0.25 | 0.88 | 91.91 |
| reverse slope R = −0.5 | | | | | | | | |
| Infiltrant - D | 3.34 | 4.39 | 0.50 | 0.66 | 0.20 | 0.25 | 0.55 | 90.12 |
| Skeleton - D | 0.42 | 5.46 | 0.50 | 1.35 | 0.20 | 0.25 | 1.32 | 90.51 |

In the appended claims, on several occasions, it is specified that the target composition includes N basic elements in addition to iron, $E_1, E_2, \ldots E_N$, where $N \geq 1$. It is noted here that although the individual elements of the set are noted by their subscripts as being number 1 of the set, number 2 of the set, etc., up to number N of the set, where $N \geq 1$, N may be equal to exactly 1, and need not equal 2, or 3, even though the elements $E_2, \ldots E_N$ are indicated as elements of the set. This convention is merely used to indicate a set with a number N of elements. The only requirement is that $N \geq 1$, as specified. The same is also intended with respect to the skeleton and infiltrant compositions.

Variations

The foregoing examples show an exemplary member of a broad family, with possible variations along several different dimensions. First, the foregoing examples are all based on 40% volume liquid at equilibrium except as noted in Example E15 D2 and E16 A3. However, as is explained above, systems with as little as 7% volume liquid remaining at equilibrium can be made to fully infiltrate. The less liquid remaining, the more precise process controls must be. However, theoretically, as little as 7% volume liquid can be tolerated. So, the volume percentage of liquid at equilibrium can vary. This would change the relative amounts of the other elements in the target composition, and thus, the skeleton and infiltrant. A typical range is between about 20% volume liquid and about 40% by volume liquid.

For the D2 steel, an additional Example table E15 has been provided that shows the parameters involved in infiltrating a skeleton that is 70% vol solid initially, to achieve an equilibrium solid that is 70% vol solid and 30% vol liquid. The temperature $T_{30liq}$ at which a D2 composition is 30% vol liquid at equilibrium is 1552° K (1279° C.) (as compared to higher 1579° K for 40% vol liquid. The composition of the target is identical for all components as for D2 with a 40% vol liquid at equilibrium. The compositions for the Skeleton, Target, Infiltrant, and Equilibrium Liquid and Solid entities for both the 40% liquid at equilibrium and the 30% liquid at equilibrium are shown in FIG. 3, with those for the 40% liquid being shown as points at 1306° C. and those for the 30% liquid case being shown as points at 1279° C.

The 70% solid composition point S at 1279° C. has a higher concentration of C (0.915% wt) than does the 60% solid composition point S at 1306° C. (0.823% wt) and the corresponding 30% liquid composition point L at 1279° C. has a higher concentration of C (3.03% wt) than does the 40% liquid composition point L at 1306° C. (2.63% wt). This is because both the solidus and the liquidus lines are sloped such that their intersections with a line of lower temperature are shifted toward higher concentrations of C.

Applying the basic style method discussed above, for choosing a skeleton composition yields a skeleton Carbon concentration of 0.52% wt and an infiltrant C concentration of 4.08% wt, as listed in rows skeleton A and Infiltrant A respectively, and as shown on FIG. 3 at the points K and I at 1279° C., respectively. The concentration of the non-MPD element Cr is the same in the basic style infiltrant and skeleton as it is in the target.

The Example E15 Table D2 also shows the MPD (carbon) and Chromium concentrations for a complementary skeleton and infiltrant pair for a near tie-line style method, and for an off tie line style method, as computed by assuming that the C content would be the same for each, as it is in the basic style method, and the Cr concentration would vary. In other words, the methods shown in FIG. 9, steps 920 and 922 strictly applying an equal $T_{SAFE}$ for each style, method was not used to generate the values in Example E15 Table D2.

Complementary pairs of infiltrant and skeleton compositions are shown for the three modes of basic, near tie line and off tie line in FIG. 11, which relates wt % Cr to wt % C, at 1552° K (1279° C.). Inspection shows that using the near tie line method, the infiltrant composition IB at about 4.08% wt C lies within a two phase field of liquid and M7C3 carbide. This would probably not successfully infiltrate, due to the high potential for clogging at the in gate, It illustrates the need to conduct the step 9 36, shown in FIG. 9, to check the infiltrant liquidus temperature, and make sure that it is less than the infiltration temperature.

Steel Family Member

A second mode of variation is within the family itself. For instance, D2 steel is in the so called "D" family (as established by ASTM International). The D family is a high Carbon, high Chromium, cold work, tool steel. There are other members of the D family that are similar, but with variations in the amount of Mn, Mo, Ni, Si and V. So, a designer might use another member of the D family as a target in a similar fashion. Further, even for a specified member of the family, such as D2, the specification specifies ranges for elemental concentrations. As set forth in Table C above, the C concentration in D2 may range from 1.4% wt to 1.6% wt, and Cr may range from 11% wt to 13% wt.

Packing/Void Fractions

An additional dimension along which variation around the basic model described above can be had, is in the skeleton packing fraction. A packing fraction of 60% volume has been used (which is coincidentally the same as the typical equilibrium solid fraction used in the examples, but, need not be). The packing fraction can also be different, depending on the particle shape, particle size, distribution, and method of forming the powder compact. In general, spherical particles will randomly pack to about 60% vol density. Angular or irregularly shaped particles will pack to lower densities. A lower limit of about 50% vol is practical for this application. Packing fractions higher than 60% can be obtained, if the powder is very smooth or well lubricated, if the powder has a bi-modal size distribution, or, if the compact is pressed and some deformation of the original particles occurs. Packing fractions of up to about 75% with bi-modal powders may be obtainable, even without pressing, and up to about 85% may be obtainable with pressing.

For the steel D2, Example E15 shows what the concentrations would be for an infiltrated skeleton that has a packing fraction of 70%, and an equilibrium product that is 70% vol solid and 30% vol liquid. To achieve this, it must be infiltrated at 1552 K (1279° C.), which is less than the infiltration temperature of 1579 K (1306° C.), shown in Example El, for infiltrating a 60% packing fraction skeleton to achieve an end product of 60% vol solid.

Figure 12:
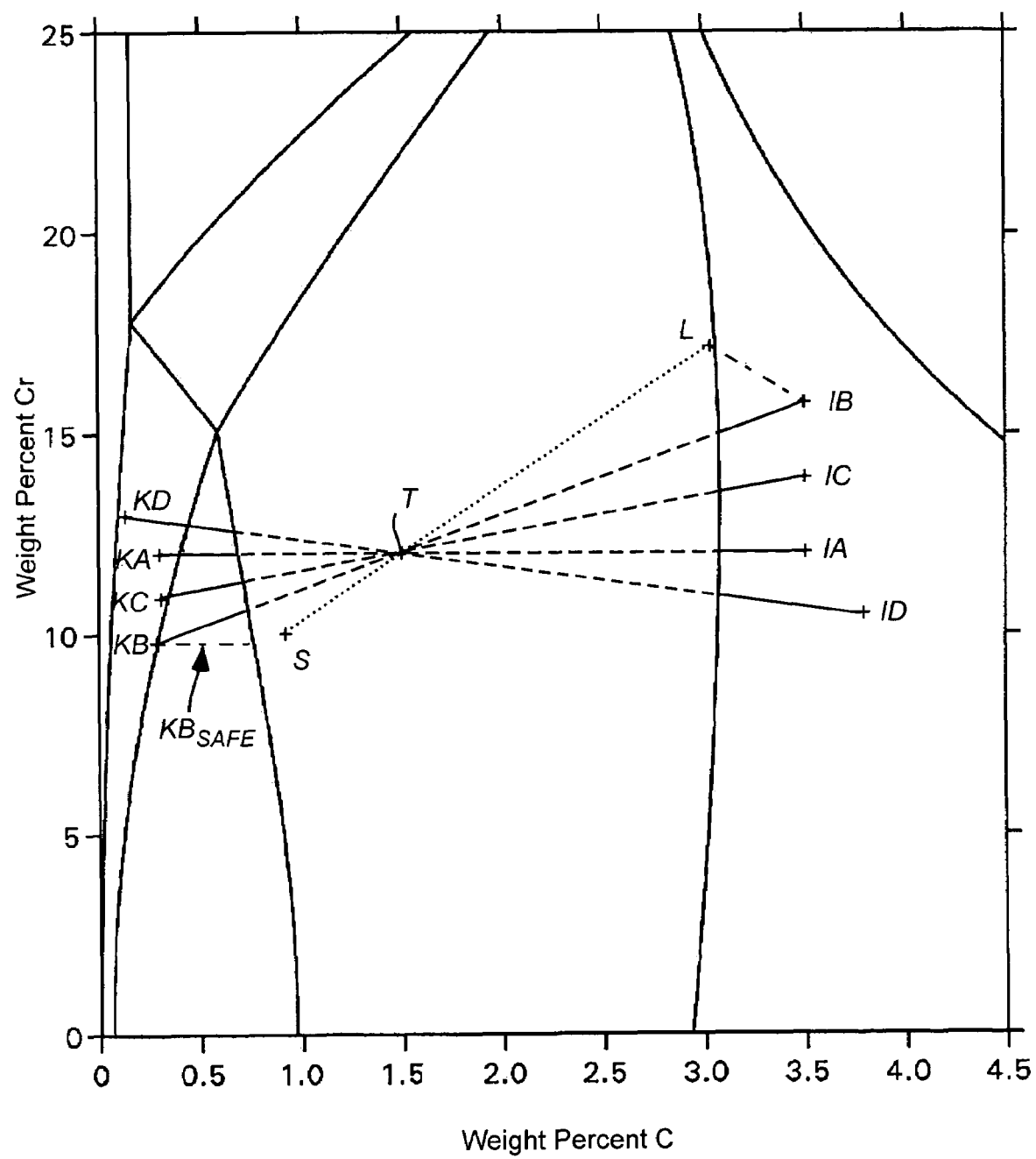
FIG. 12 is an isothermal phase diagram at 1279° C. for D2 steel, showing equilibrium compositions of 70% vol solid, for infiltrating a skeleton of 60% vol solid.

FIG. 12 shows, for D2 steel, skeleton and infiltrant compositions for starting with a 60% vol packing fraction skeleton, and infiltrating at a temperature that results in a 70% vol solid at equilibrium. The basic pair is KA-IA, near tie-line pair is KB-IB and an off tie-line pair is KC-IC. The equilibrium solid is at S and liquid is at L. Infiltrating these pairs at 1579 K (1306° C.) would result in 60% vol solid, 40% vol liquid at equilibrium. Infiltration of these pairs slightly lower at 1552 K (1279° C.) results in 10% solidification, to a product at 1552 K of 70% sol as in steps 928-32. The phase boundaries shown are at 1552 K, the temperature that results in a 70% vol solid product. Compare this with FIG. 4, showing pairs for infiltrating a 60% packing fraction skeleton at 1579 K (1306° C.) to arrive at a 60% vol solid, and to FIG. 11, showing infiltrating a 70% vol skeleton at 1552 K (1279° C.) to arrive at a 70% vol solid product. The skeleton compositions shown in FIG. 12 involving solidification, are further from the solidus curve than in either of the other diagrams, which indicates that the skeleton is very resistant to erosion. In fact, because of the 10% material solidifying, the skeleton strength increases during infiltration. Also, as shown in FIG. 12, infiltrant IB is in a single phase region, whereas the 70/30 equilibrium infiltrant IB shown in FIG. 11 is in a two phase (L+carbide) field. This illustrates a second utility in addition to erosion control of allowing some solidification. That is, because there is more infiltrant present initially, there needs to be a lower concentration of C present in the infiltrant, so the two phase field is avoided.

Product General Properties

Among the different example steels above, there will be different general properties of an end product. The D2, M2, T8 and 440C steels, other things being equal, would likely produce end products that are less homogeneous throughout their volume than the other steels. This is because they all have the potential for forming a relatively large amount of carbides, which are not easily removed in heat treatment after infiltration. D2 and 440C have relatively high chromium contents. Chromium readily forms carbides. M2 has less chromium, but more Mo, V and W. V and W form the most heat resistant carbides in tool steels. T8 contains approximately the same Cr as M2, but has much more W and slightly less Mo and V. T8 steel contains enough W such that carbides are stable even at the infiltration temperature. The Austenitic Manganese Grade C, O6 and S6 steels have the potential to become highly homogeneous, because both have very little chromium (<2%) and small amounts or none of the other carbide forming elements. The steels H13 and A3, have modest amounts of chromium, but not enough to significantly prevent homogenization, and thus, would fall between the other two sets of families discussed, in terms of homogenization potential. The cast stainless steels, CF-10SMnN, CN-7MS and HF are also fully homogenizable because of the presence of large amounts of Ni that stabilize the austenite phase (FCC) and because of the low amounts of C, so that there is little or no tendency to form carbides.

Additional Phase Diagrams Austenite-Manganese

Figure 18:
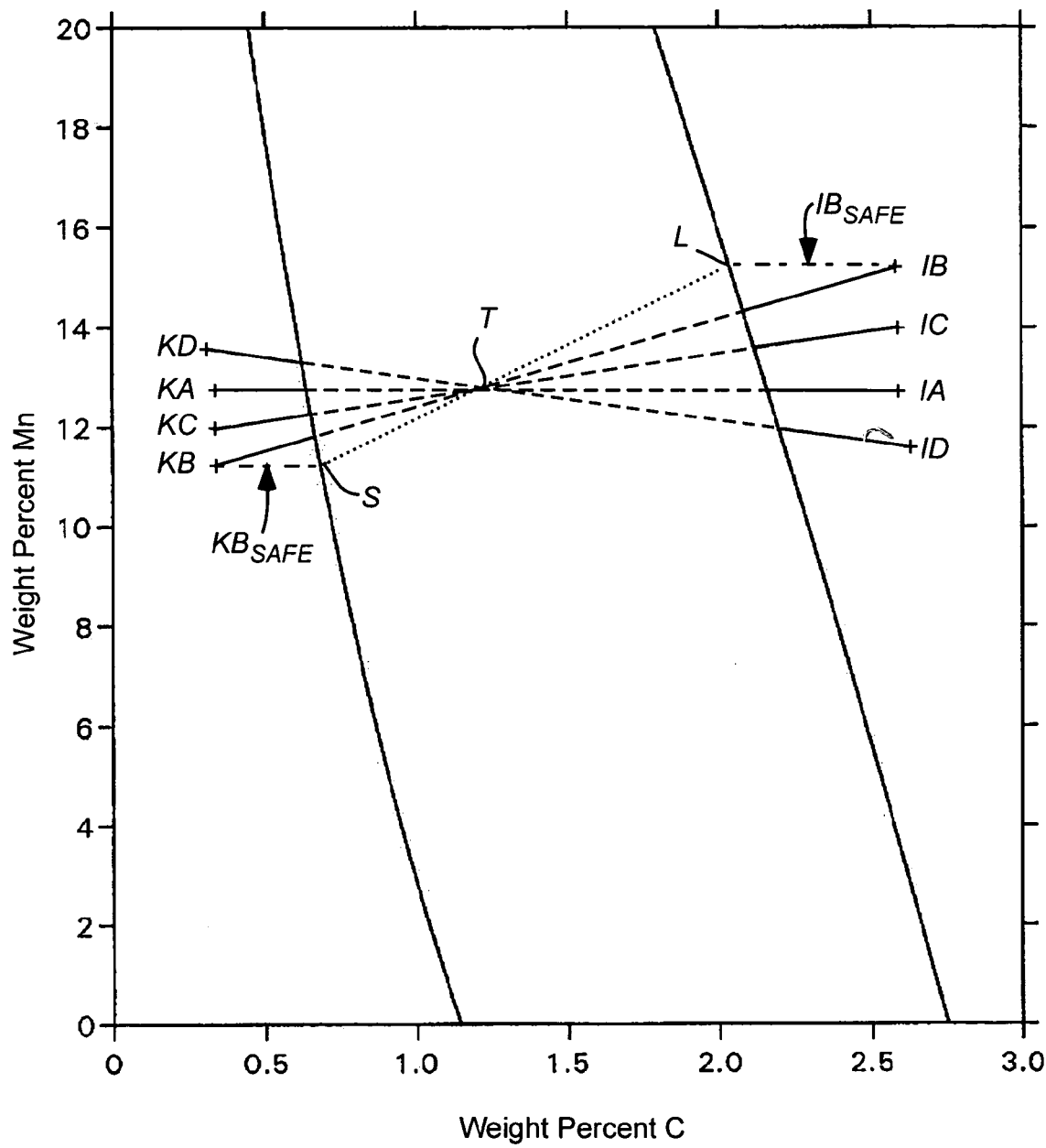
FIG. 18 is an isothermal phase diagram for Austenitic-Manganese steel grade C at 1295° C., relating wt % Mn to wt % C.

FIG. 18 is a phase diagram at 1568 K (1295° C.) for the Austenitic Manganese Grade C system relating weight percent manganese (Mn) to weight percent C. FIG. 19 is a phase diagram showing Austenitic-Mn relating temperature (° C.) to weight percent C. A target composition T is shown, along with complementary skeleton composition K (0.33% wt C) and the infiltration composition I (2.65% wt C).

FIG. 18 shows these same compositions (showing also the concentration of Mn at about 13% wt) for the basic style method skeleton KA and infiltrant IA. It also shows an equilibrium solid composition S of about 0.69% wt C and 11.2% wt Mn and an equilibrium liquid composition L of about 2% wt C and 15.13% wt C. For this figure and all other similar ones that follow, the near tie-line compositions for skeleton and infiltrant would be at KB and IB respectively. Skeleton and infiltrant pairs along these lines are complementary with respect to T in the basic and near tie-line modes, as discussed above, and all complementary pairs lying on lines in the shaded region that pass through the target composition T would be complementary in an off tie-line mode, to differing degrees of difference from the basic and tie-line modes.

This case illustrates complete solubility of the MPD of C in an austenite phase. This is because, as discussed above, the concentration of the MPD in the target composition, is 1.2% wt, which is less than the maximum MPD concentration $M_{C-Max}$ of about 1.7% wt at the eutectic temperature, as shown on FIG. 19. It can be cooled to a homogeneous FCC phase at the eutectic temperature.

A3

Figure 13:
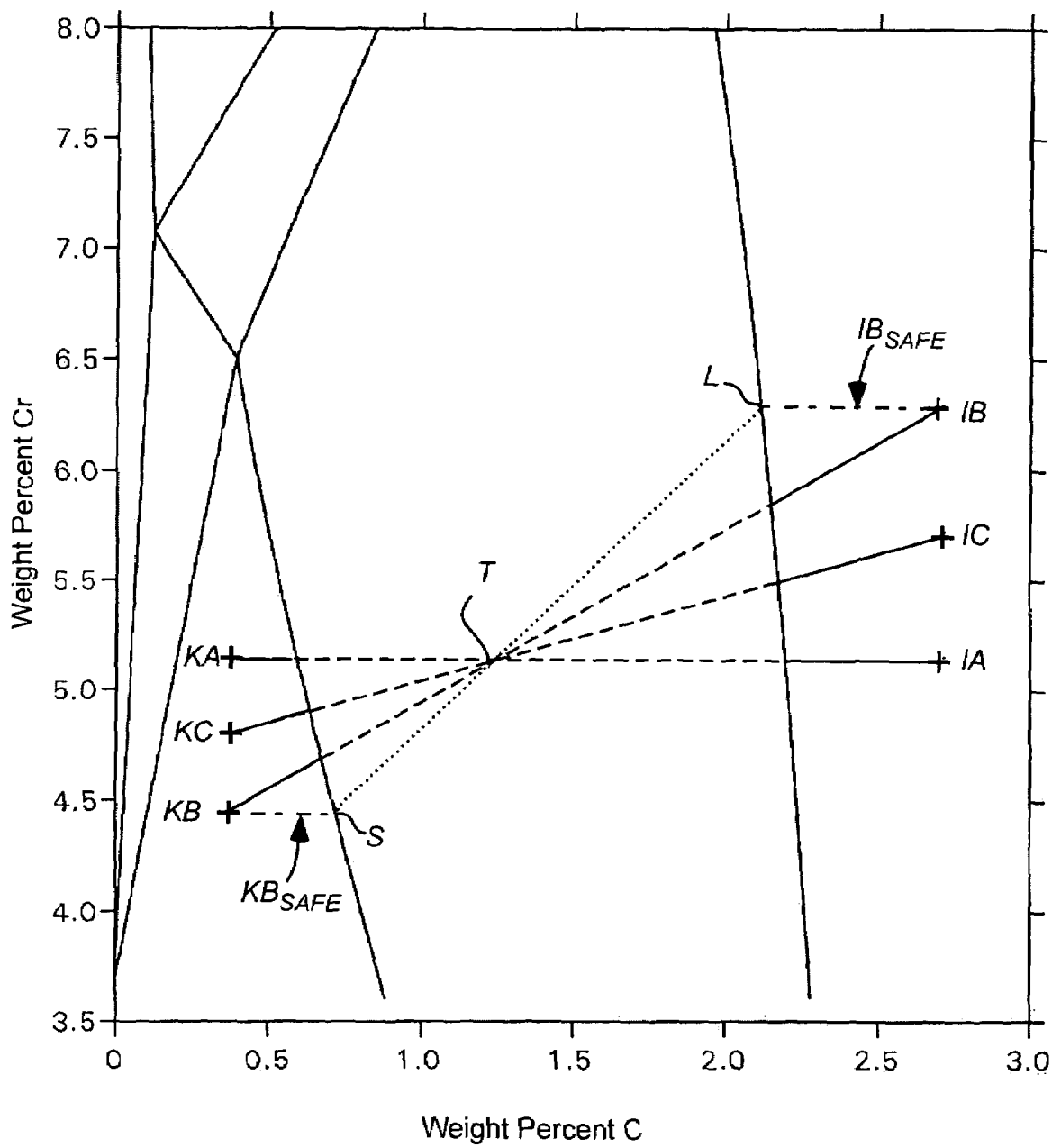
FIG. 13 is an isothermal diagram, for A3 steel, showing equilibrium compositions at 1351° C. for 60% vol skeleton, showing wt % Cr vs. wt % C, for skeleton and infiltrant pairs for basic, near tie-line and off tie-line modes, with concentrations of Mo and V being functions of concentration of Cr.
Figure 14:
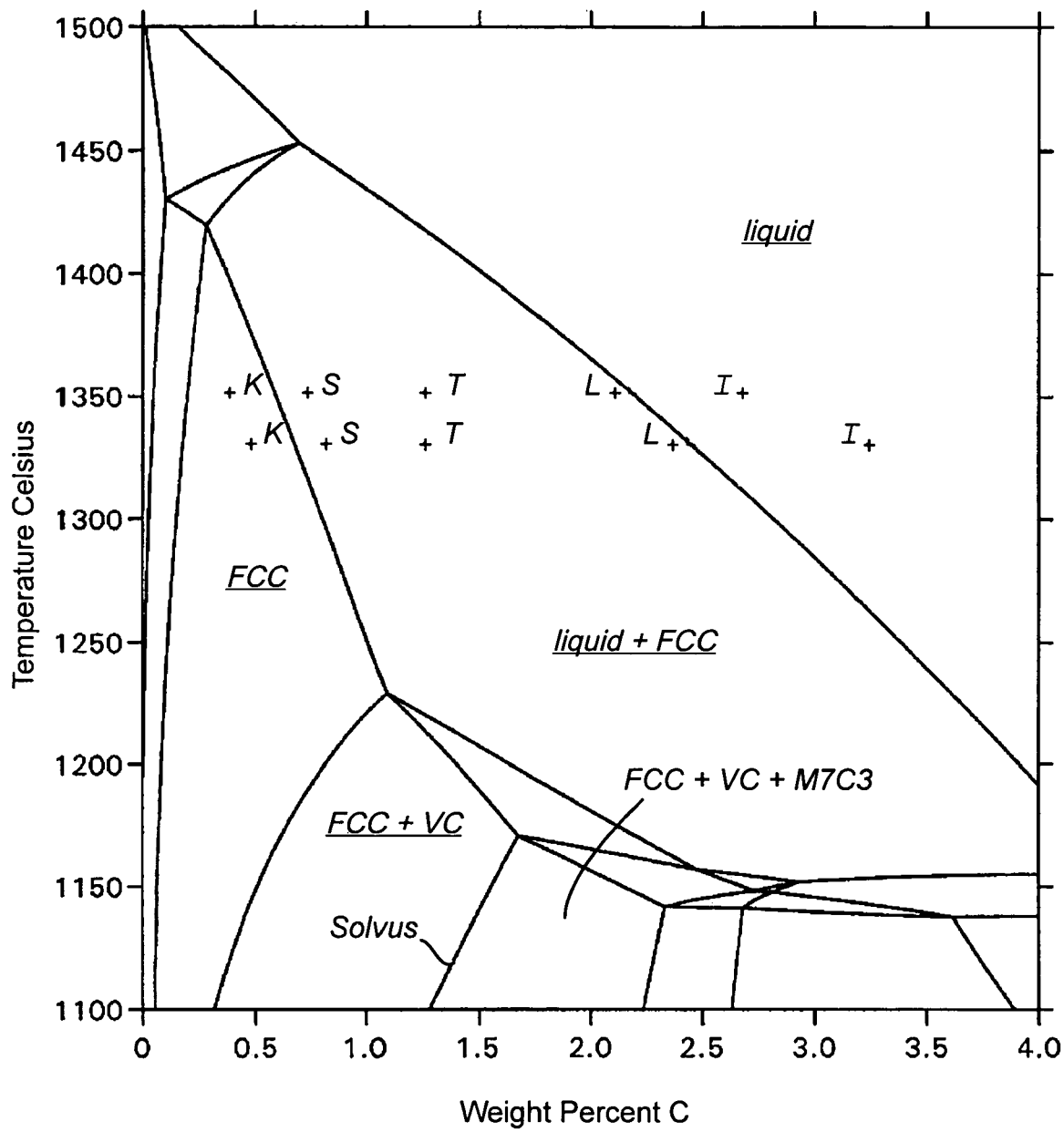
FIG. 14 is a phase diagram for A3 steel, showing equilibrium compositions at 1351° C. for 60% vol solid and 1330° C. for 70% vol solid.

FIG. 13 is phase diagram at 1624° K (1351° C.) for the A3 steel system, relating weight percent chromium (Cr) to weight percent carbon (C). FIG. 14 is a phase diagram showing the A3 system relating temperature (OC) to weight percent C. Showing a case of infiltration at 1351° C. to achieve a 60% solid infiltrated body, and at 1330° C. to achieve a 70% solid infiltrated body. A target composition T is shown, having C concentrations of 1.25% wt and with concentrations of Cr (5.15%, Mo (1.15%) V (1.1%) (all wt %) and for both the 60% solid and 70% solid cases.

Turning first to the 60% solid case, FIG. 14 shows at 1351° C. a skeleton composition K (0.371% wt C) and complementary infiltrant composition I (2.67% wt C). FIG. 13 shows these same compositions labeled KA, IA for the basic style method, showing also the concentration of Cr for both at 5.15% wt. It also shows an equilibrium solid composition S of about 0.72% wt C and 4.45% wt Cr, and an equilibrium composition L of about 2.1% wt C and 6.3% wt Cr.

FIG. 13 was generated by assigning wt % values for the Mo and V contribution as a function of Cr. This is useful, because otherwise, the points to be shown would be far from the plane in which the tie-line along the points S-T-L lies, and thus, the S and L points would appear far from the solidus and liquidus, respectively. The functions used are:

$$Cr-1.559*Mo=3.359 \quad \text{(Eq. 14)}$$

and $$Cr-1.439*V=3.570. \quad \text{(Eq. 15)}$$

This A3 case illustrates complete dissolution of chromium carbides ($M_7C_3$ and $M_{23}C_6$) for reasons discussed above, because the target T Carbon wt % 1.25<$M_7C_3$ solvus line at the austenitizing temperature. The chromium carbides (combined $M_7C_3$ and $M_{23}C_6$) represent 87% by mass of the carbides at 727° C. The vanadium carbide (VC) is not completely soluble, but the amounts are low, that usually its solubility is not considered as important as the chromium carbides. Further, the diffusivity of V in Fe is ~100 times less than that of Cr in Fe, so the vandium carbides are much more resistant to coarsening at the austenitizing temperature.

For the A3 steel, an additional Example table E16 A3 has also been provided that shows the parameters involved in infiltrating a skeleton that is 70% vol solid initially, to achieve an equilibrium solid that is 70% vol solid and 30% vol liquid, showing these parameters in a manner analogous to that discussed above for the D2 steel and a 70% vol solid at equilibrium case. The temperature $T_{L30}$ is 1603° K (1330° C.) (as compared to 1624° K (1352° C.) for 40% vol liquid. The composition of the target is identical for all components as for A3 with a 40% vol liquid at equilibrium. The compositions for the Skeleton, Target, Infiltrant, and Equilibrium Liquid and Solid entities for both the 40% liquid at equilibrium and the 30% liquid at equilibrium are shown in FIG. 14, with those for the 40% liquid being shown as points at 1351° C. and those for the 30% liquid case being shown as points at 1330° C.

The 70% solid composition points all have a higher concentration of C than do the corresponding points for the 60% solid composition for the same reasons as with the D2 case, namely, because both the solidus and the liquidus lines are sloped such that their intersections with a line of lower temperature are shifted toward higher concentrations of C.

Applying the basic style method discussed above, for choosing a skeleton composition yields a skeleton Carbon concentration K of 0.372% wt and an infiltrant C concentration I of 2.67% wt as shown on FIG. 14 at the points K and I at 1330° C., respectively. The concentration of the non-MPD element Cr is the same in the basic style infiltrant and skeleton as it is in the target.

The Example E16 Table A3 also shows the MPD (carbon) and Chromium concentrations for a complementary skeleton and infiltrant pair for a near tie-line style method, and for an off tie line style method, as computed by assuming that the C content would be the same for each, as it is in the basic style method and the Cr concentration would vary. In other words, the methods shown in FIG. 9 steps 920 and 922, strictly applying an equal $T_{SAFE}$ for each style method was not used to generate the values in Example E16 Table A3 70/30.

MPD Other than C Alone

The foregoing discussion has focused on carbon as the melting point depressant and, in some cases, silicon. It has been demonstrated that it is possible to achieve a system as described, by adjusting only, the amount of carbon in the infiltrant and the skeleton, leaving the relative amounts of the other elements identical (except for iron) as in the basic style method, or similar, as in the near and off tie-line styles. But, it is true that some other high solubility, high diffusivity elements may also contribute to depressing the melting point. Thus, an infiltrant that is richer in not only carbon, but also in another element A, will have an even lower melting point than would a similar composition, but with less amounts of the other element A. Thus, a system could be designed where the infiltrant and the skeleton compositions differ not only in the carbon content, but also in the content of the other element A. Carbon diffuses very quickly throughout the skeleton, and thus, significantly homogeneous end results can be obtained, despite the fact that the concentrations differ in the infiltrant portion and the skeleton portion. Other elements do depress the melting point, but, for various reasons, they do not diffuse throughout the skeleton as quickly as C. Thus, the differences in their contributions to the infiltrant and the skeleton will more significantly reduce the homogeneity of the end product. Thus, the foregoing has focused on carbon being a single element MPD. However, the generality of the inventions disclosed herein is not limited to single element MPDs, or to MPD that is only carbon.

Si as MPD

With the foregoing in mind, it will be understood that silicon (Si) can also be an important MPD in steel systems. The diffusivity of Si in Fe at 1300° C. is about $3 \times 10^{-8}$ $cm^2$/sec, which is about 0.01 times the diffusivity of C in Fe ($3 \times 10^{-6}$ $cm^2$/sec), but about 100 times the diffusivity of Ni in Fe ($3 \times 10^{-10}$ $cm^2$/sec)

Figure 15:
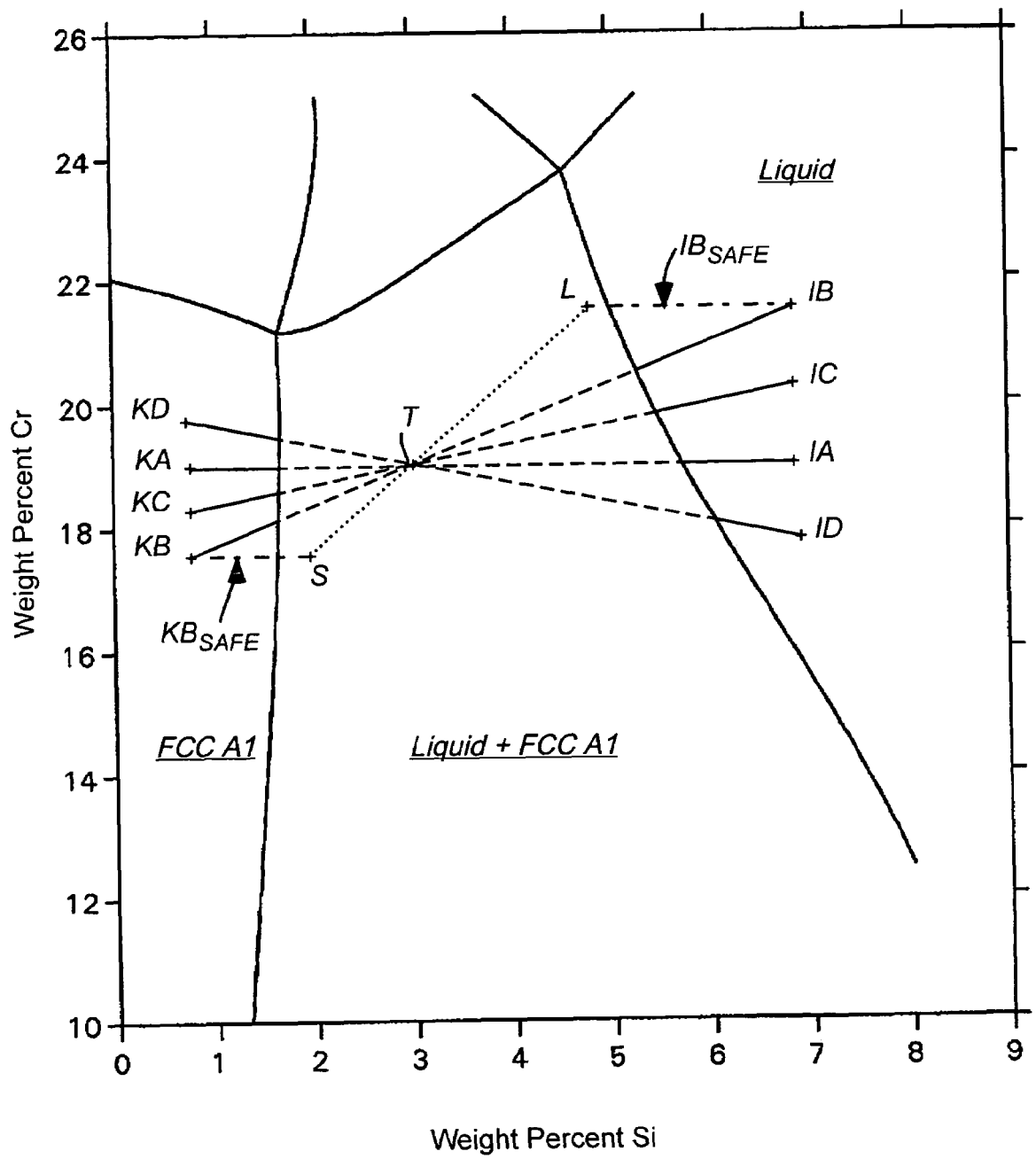
FIG. 15 is an isothermal phase diagram for Cn-7MS steel at 1261° C., relating wt % Cr to wt % Si, for a 60% vol solid.
Figure 16:
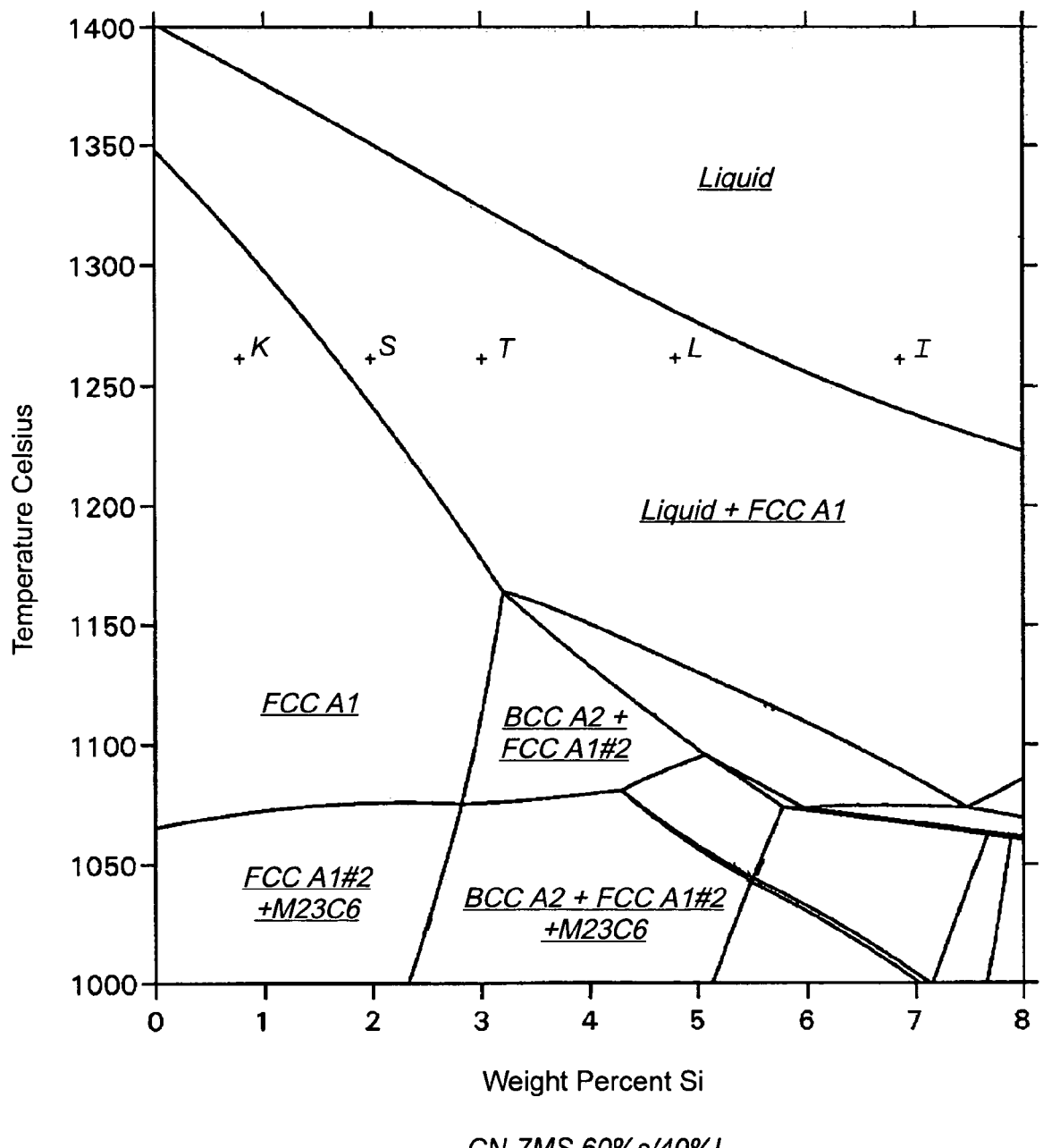
FIG. 16 is a phase diagram for Cn-7MS steel, relating temperature ° C. to wt % Si.

FIG. 15 is phase diagram at 1261° C. (1534 K) for a stainless steel, type CN-7MS, using Si alone as a melting point depressant, rather than carbon. Because stainless steels usually have low carbon concentration, it is reasonable and possible to use silicon (Si) as the MPD. FIG. 15, relates weight percent chromium (Cr) to weight percent silicon (Si). In FIG. 15, The amount of Ni is related to the amount of Cr by the equation: Cr+0.4198*Ni=28.86. This is done to show the plane of the diagram closer to the actual tie-line. FIG. 16 is a phase diagram showing the CN-7MS silicon system relating temperature (° C.) to weight percent Si, with concentrations of: Cr 19%; Mn 1%; Ni 23.5%; Mo 2.75%; Cu 1.75%; C 0.05%; Si 0 to 8% and a balance of Fe (all wt %). A target composition T in FIG. 16 at 3 wt % Si is shown, along with complementary skeleton composition K of Si (0.754% wt) and infiltrant composition I (6.836% wt) at 1261° C.

FIG. 15 shows an equilibrium solid composition S of about 1.96% wt Si and 17.53% wt Cr, and an equilibrium liquid composition L of about 4.78% wt Si and 21.51% wt Cr. It also shows the same compositions for the basic style method at KA and IA for the skeleton and infiltrant, respectively, showing also the concentration of Cr at about 19%. (These are also analogous to the skeleton K and Infiltrant I above).

The near tie-line style composition for skeleton and infiltrant would be at KB (0.754 w % Si; 17.53 w % Cr) and IB (6.836 w % Si; 21.51 w % Cr) respectively.

There is quite a bit of solubility of Si in the system, nearly 3% (FIG. 16), so that the infiltrated material will be nearly single phase when homogenized. The second phase that will form near 3% Si upon cooling is ferrite (BCC), which is a phase found normally in many steels.

Heat Treating

The foregoing discussion has primarily addressed infiltrating a body, and holding it at the infiltration temperature, until infiltration is complete. It has not addressed heat treating after infiltration. The following discussion addresses heat treating.

In general, conventional heat treating techniques (analytical and operational) are applicable to infiltrated bodies. Three broad categories of infiltrated bodies have been described: those with complete solubility of the MPD in the austenite, for instance austenitic-manganese steel; those with large but not complete solubility of the MPD, such as A3; and those that show limited solubility of the MPD, such as D2.

Turning first to the completely soluble e.g., austenitic manganese, FIG. 19 and FIG. 6 are instructive. Here it can be seen that, by reducing the temperature from the equilibrium infiltration temperature, to, for instance about 1100° C., the infiltrated body will transform from the two-phase body discussed, to a one phase, wholly solid FCC body, in which all of the Carbon is fully dissolved. Once cooled to this single phase, the body can be quenched to form an alloy that will retain a predominantly austenite structure, with few carbides present. The material should not be tempered. Surface hardening may be done by grit blasting or shot peening.

Homoogenization

Turning to a partially soluble example, such as A3, helpful reference is made to FIGS. 7 and 14. The material will be austenitized in the two phase FCC and VC region.

The table below shows, for a 60% solid basic method A3 alloy heat treated at 1150° C., the amounts of the phase present and carbon content. The initial difference in carbon content between skeleton and infiltrant is 2.67−0.37=2.30% wt carbon. During homogenization, the skeleton has increased its carbon content from 0.37% wt to 1.12% wt. The carbon concentration in the infiltrant has decreased from 2.67% wt to 1.45% wt. After homogenization there is a carbon content difference of 1.45−1.12=0.33% wt C between the formerly skeleton region and formerly infiltrant region. Thus after heat treatment, there is only a small difference in the amount of carbon present between the originally skeleton and infiltrant regions. This assumes that all the VC carbide formed at equilibrium at 1150° C. is present in the infiltrated region and none in the skeleton, resulting in a difference of 2.5% wt carbide between the skeleton and infiltrant. This shows that substantial homogenization has occurred in this alloy.

The VC is stable in the field, which is very helpful, because it helps to pin the austenite grain boundaries, and not to suffer from grain growth during heat treatment, as compared, for instance to austenitic-manganese steel.

TABLE HT-1

Heat Treating A3 Steel Basic Style Infiltration

| | just after infiltration | Austenitize at 1150° C. | | |
|---|---|---|---|---|
| | wt % C | wt % FCC | wt % VC | wt % C |
| skeleton region | 0.37 | 100 | 0 | 1.12 |
| infiltrant region | 2.67 | 97.5 | 2.5 | 1.45 |
| target ideal | 1.25 | 99.1 | 0.9 | 1.25 |

Turning next to an example of a system where there is only limited solubility of carbon in the skeleton, D2 is a suitable example, and reference should be made to FIG. 3 and FIG. 8. The table below shows, for a 60% solid basic method D2 alloy heat treated at 1150° C., the amounts of the phase present and carbon content. There is an initial difference in carbon content of 3.5−0.3=3.2% wt C between the skeleton and infiltrant. After homogenization, there is a carbon content difference of 2.61−0.76=1.85% wt C between the heat treated skeleton region and infiltrant region. The skeleton region has increased its carbon content from 0.3% wt to 0.76% wt. The infiltrant region has decreased its carbon content from 3.5% wt to 2.61% wt. Despite some carbon rearrangement, there is still a large difference in carbon content between the skeleton and infiltrant. This assumes that all the $M_7C_3$ carbide formed at equilibrium at 1150° C. is present in the infiltrated region and none in the skeleton region, resulting in a carbide difference of 25.1 wt % between skeleton and infiltrant. The carbides that do not dissolve in the FCC solid are typically the largest carbides. Further, the carbide phase tends to coarsen, if heated for long times, by a dissolution reprecipitation mechanism, also known as Oswald ripening. This shows that some homogenization has been achieved in this alloy, but not as much as in the A3 alloy. Further, it can be seen from comparison of the two alloys that at the heat treating temperature, the D2 contains 9.28 wt % chromium carbides, while the A3 contains only 0.9 wt % vanadium carbides.

TABLE HT-2

Heat Treating D2 Steel, Basic Style

| | just after infiltration | Austenitize at 1150° C. | | |
|---|---|---|---|---|
| | wt % C | wt % FCC | wt % M$_7$C$_3$ | wt % C |
| skeleton region | 0.3 | 100 | 0 | 0.76 |
| infiltrant region | 3.5 | 74.9 | 25.1 | 2.61 |
| target ideal | 1.5 | 90.7 | 9.3 | 1.5 |

Custom D2 powder with low carbon content and a particle size <150 μm was fabricated to perform infiltration testing. Successful infiltrations using the basic style method were possible with powder size ranging from 25 μm to 150 μm. With a starting packing fraction of ~60% vol, the optimal infiltration temperature is between 1270° C. and 1280° C. Lower temperatures resulted in incomplete infiltrations and higher temperatures increased the risk of erosion. This results in an equilibrium solid fraction of about 70% wt, which corresponds to ~10% solidification during infiltration. The infiltrated samples reached around 99% of the theoretical density of D2 tool steel. The cause for the slight lower density was microporosity found in cross sections.

As test specimens for the heat treatment and mechanical testing, samples with powder size ranging from 90 μm to 125 μm were infiltrated at 1270° C. Table HT3 lists the chemical compositions of the skeleton, the infiltrant and the infiltrated sample. The Cr concentration slightly exceeds the specification due to manufacturing variations from specification.

TABLE HT3

D2 Chemical Composition of Skeleton, Infiltrant and Infiltrated sample

| | C | Cr | Mn | Mo | Ni | Si | V |
|---|---|---|---|---|---|---|---|
| Skeleton | 0.36 | 13.28 | 0.26 | 1.02 | 0.06 | 0.22 | 1.05 |
| Infiltrant | 3.71 | 13.28 | 0.26 | 1.02 | 0.06 | 0.22 | 1.05 |
| Infiltrated sample | 1.5 | 13.28 | 0.26 | 1.02 | 0.06 | 0.22 | 1.05 |
| D2 | 1.40–1.50 | 11.00–13.00 | 0.6 max | 0.70–1.20 | 0.30 max | 0.6 max | 1.10 max |

The infiltrated test specimens and commercial D2 tool steel were austenitized for 30 min in a temperature range between 850° C. and 1150° C. and quenched in air to examine the hardening behavior. Both reached as quenched hardness of around 60 HRC. The difference was an optimal austenitizing temperature of 1030° C. for the commercial D2 tool steel and 1080° C. for the infiltrated samples. The reason for this is the different microstructure. The commercial D2 tool steel had a fine dispersion of carbide, whereas the infiltrated samples had a more or less closed carbide network on the grain boundaries. This results in a larger diffusion distance for the homogenization of carbon of the austenite during austenitizing.

Mechanical Properties of Infiltrated Skeleton

To examine toughness, impact tests were carried out using undersized (9×9 mm) unnotched Charpy test bars. The samples were tested in the as-quenched state, and following single tempers of 1 hour at 200, 300 and 400° C. For comparison, bars were also made from commercial wrought D2 tool steel and subject to the same processing. A summary of the impact toughness measured in Joules is in the Table MP-IS below. There is very little difference between the impact strength of the two types of material.

TABLE MP-IS

| Tempering Temperature | Impact strength (Joules) | |
|---|---|---|
| | Infiltrated D2 | Wrought D2 |
| As quenched | 4.2 | 4.9 |
| 200° C. | 5.5 | 5.4 |
| 300° C. | 3.9 | 4.2 |
| 400° C. | 4.0 | 4.8 |

The hardness of the same samples, infiltrated and commercial wrought in the as-quenched and tempered at 200, 300 and 400° C. was also measured. These values are shown in the following Table MP-H. There is no significant difference between the hardening response of the two types of samples.

TABLE MP-H

| Tempering Temperature | Hardness, Rockwell C scale | |
|---|---|---|
| | Infiltrated D2 | Wrought D2 |
| As quenched | 55.7 | 55.4 |
| 200° C. | 55.3 | 55.7 |
| 300° C. | 55.7 | 54.8 |
| 400° C. | 56.6 | 55.2 |

Partial Summary

Inventions disclosed and described herein include methods of infiltrating metal skeletons with an infiltrant of a similar composition, but with a melting point depressant to produce a steel product. Inventions disclosed herein include methods of infiltrating, methods of designing an infiltration process, methods of establishing appropriate complementary pairs of skeleton and infiltrant compositions, to arrive at a bulk composition that can be infiltrated, and that is sufficiently near to a desired target. Additional inventions disclosed also include metal products made according to the methods of infiltration and design, and formulations for metal powders to constitute skeletons and infiltrants, either alone, or as complementary pairs. The inventors also consider to be their invention the foregoing inventions, further in combination with steps to homogenize infiltrated bodies, either at or near the infiltration temperature, or at lower temperatures, such as at an austenitizing temperature.

The methods of designing a process can be used to develop systems having one, two or more elements as part of the melting point depressant agent, to be used for any of the modes of complementarity discussed. The methods of design, including packing fraction driven and skeleton composition driven, include a large number of steps to arrive most precisely at a desired outcome. The invention also includes methods with fewer steps, some of which may become unnecessary or superfluous for an experienced operator. For instance, it may not be necessary to explicitly decide upon a temperature margin $T_{SAFE}$ as the operator may be able to just estimate what amount of carbon to remove from the equilibrium solid amount to achieve a skeleton that will surely not sag during infiltration at a given temperature. Further, the order that the steps are taken is not necessarily as set forth on the flow charts. Thus, it is considered an invention hereof to perform the methods of designing systems by conducting the steps in different orders, or with some of the steps removed, and, in some cases, with additional steps added.

Thus, this document discloses many related inventions.

One invention disclosed herein is a method for fabricating a steel part having a target bulk composition T of iron (Fe) and N additional basic elements $E_1, E_2, \ldots E_N$, where $N \geq 1$, each present in a respective mass percentage $M_{1,T}$, $M_{2,T}, \ldots M_{N,T}$ and a melting point depressant agent $E_{MPD}$, present in a mass percentage $M_{MPD,T}$. The method comprises the steps of: providing a skeleton of interconnected adhered metal particles having a network of interconnected porosities throughout, the particles packed at a packing fraction $V_{PF}$, the particles having a composition consisting essentially of: iron and the N basic elements $E_1, E_2, \ldots E_N$, each present in a respective mass percentage $M_{1,K}$, $M_{2,K}, \ldots M_{N,K}$; and the Melting Point Depressant agent $E_{MPD}$, present in a mass percentage $M_{MPD,K}$. The method further comprises providing an infiltrant having a composition consisting essentially of: iron and the same N elements $E_1, E_2, \ldots E_N$, each present in a respective mass percentage $M_{1,I}, M_{2,I}, \ldots M_{N,I}$; and the Melting Point Depressant agent $E_{MPD}$, present in a mass percentage $M_{MPD,I}$, where $M_{MPD,I} > M_{MPD,T} > M_{MPD,K}$. The infiltrant composition is complementary to the skeleton composition, relative to the bulk target composition T. The method also comprises infiltrating the skeleton with the infiltrant, at an infiltration temperature $T_{infil}$ the infiltration being driven primarily by capillary pressure. The infiltration temperature, the infiltrant composition and the skeleton composition are such that: $T_{infil}$ is below a solidus temperature for the skeleton; $T_{infil}$ is above a liquidus temperature for the infiltrant; and at the infiltration temperature, $T_{infil}$, at chemical equilibrium, a body having the target composition T, has at least about 7 vol % liquid, and is less than about 50 vol % liquid.

According to preferred embodiments, the melting point depressant agent can be a single element agent of either Carbon or Silicon, without any other elements that have a significant melting point depressing activity, as composed in the infiltrant as compared to the skeleton. Or, the melting point depressant agent can be Carbon and Silicon together, again, without any other elements that have a significant melting point depressing activity. Or, either carbon or silicon or both can be used with other melting point depressants, which have a relatively high solubility and a relatively high diffusivity in the skeleton. By relatively high, it is meant generally high enough so that an infiltrated part can be homogenized to near homogeneity in a time period that is reasonable, generally less than 24 hours, and preferably less than 15 hours, and most preferably less than three hours, given an operator's cost structure.

According to a preferred embodiment, the melting point depressant agent has a maximum solubility $M_{MPD-max}$ in iron (Fe), and the melting point depressant mass percentage in the target composition $M_{MPD,T}$ is less than about 2* $M_{MPD-max}$ and more preferably, less than $M_{MPD-max}$.

According to yet another preferred embodiment, the method further comprises subjecting the infiltrated skeleton to conditions such that a portion of the melting point depressant diffuses from the infiltrated porosities into the metal powder, and at least partial diffusional solidification occurs. For instance, diffusional solidification of at least 10% or more of the volume of the infiltrated infiltrant can occur.

Still another preferred embodiment further comprises providing an infiltrant having a composition that is complementary to the composition of the skeleton with respect to the target bulk composition, in a mode that is between a near tie-line mode and a reverse slope mode, or, between a near tie-line mode and a basic mode. Other preferred embodiments are characterized by providing infiltrant and skeleton pairs that are complementary in an off tie-line mode.

Various preferred embodiments include using a target bulk composition of a steel selected from the group consisting of: D2, M2, 440C, Austenitic Manganese Grade C, A3, 06, 410 and T8. In those cases, it is a preferred embodiment to employ carbon as the principal, or only significant melting point depressant. Other preferred embodiments include using a target bulk composition of a steel selected from the group consisting of: CN-7MS CF-10SMnN, in which cases it is convenient that silicon be the principal or only melting point depressant. With a target bulk composition comprising a steel selected from the group consisting of: H13, S6 And ACI-HF, both silicon and carbon can be used as components of a melting point depressant agent.

In yet another preferred embodiment, the melting point depressant agent is present in the skeleton in a mass percentage between zero and the mass percentage of the melting point depressant agent in an equilibrium solid phase of the target composition at a temperature where the target composition is 93 vol % solid. The N basic additional elements are present in the skeleton in respective mass percentages, as follows, for n=1 to N: $M_{n,k} = M_{n,T} + R_n * (M_{n,S} - M_{n,T})$ with $-1 \leq R_n \leq 1$ for each basic additional element. The melting point depressant agent is present in the infiltrant in a mass percentage as follows: $M_{MPD,I} = M_{MPD,K} + (M_{MPD,T} - M_{MPD,K})/M_I$; and the N basic additional elements are present in the infiltrant in respective mass percentages, as follows, for n=1 to N: $M_{n,I} = M_{n,T} + R_n * (M_{n,L} - M_{n,T})$, with $-1 \leq R_n \leq 1$ for each basic additional element.

For most applications, it is advantageous that the slowest diffusing elements of the melting point depressant agent have a diffusivity in the skeleton at 1100° C. of greater than $4 \times 10^{-16}$ cm²/sec or, more preferably, of greater than $2 \times 10^{-15}$ cm²/sec.

According to another preferred embodiment, an invention includes maintaining the skeleton after infiltration at the infiltration temperature for a period of time less than fifteen hours, and, more preferably, less than 3 hours, with the melting point depressant having a diffusivity such that substantial homogeneity is achieved. A related invention includes the step of maintaining the skeleton after infiltration at an austenitizing temperature for a period of time less than 3 hours, the melting point depressant having a diffusivity such that substantial homogeneity is achieved.

Another embodiment that is preferred is a method for fabricating a steel part having a target bulk composition T as set forth in the row entitled Target range in the immediately following table:

|  | C | Cr | Mn | Mo | Ni | Si | V | Fe |
|---|---|---|---|---|---|---|---|---|
| Target Range | 1.4–1.6 | 11–13 | 0.6 max | 0.7–1.0 | 0.3 max | 0.6 max | 1.1 max | bal |
| Infiltrant - B | 3.50 | 17.20 | 0.6 max | 2.0 | 0.3 max | 0.6 max | 2.30 | bal |
| Skeleton - B | 0.30 | 9.76 | 0.6 max | 0.57 | 0.3 max | 0.6 max | 0.48 | bal |
| Infiltrant - D | 3.79 | 9.84 | 0.6 max | 0.58 | 0.3 max | 0.6 max | 0.46 | bal |
| Skeleton - D | 0.13 | 12.93 | 0.6 max | 1.18 | 0.3 max | 0.6 max | 1.22 | bal | of iron (Fe) and carbon, present in a mass percentage within a range as specified in the column headed by symbol C, and additional basic elements listed, each present in a respective mass percentage within a range set forth in a column headed by the respective element symbol. The method of fabricating comprises the steps of: providing a skeleton of interconnected adhered metal particles having a network of interconnected porosities throughout, the particles packed at a packing fraction $V_{PF}$. The particles have a composition consisting essentially of: iron and the additional basic elements each present in a respective mass percentage between those as specified in a column headed by the respective element symbol in: the row entitled Skeleton-B; and the row entitled Skeleton-D; and Carbon, present in a mass percentage between zero and the mass percentage of carbon in an equilibrium solid phase of the target composition at a temperature where the target composition T is 93 vol % solid. The method further comprises providing an infiltrant having a composition consisting essentially of: iron and the same additional basic elements each present in a respective mass percentage between approximately what is specified in a column headed by the respective element symbol in: a row entitled Infiltrant-B; and a row entitled Infiltrant-D; and Carbon, present in a mass percentage of at least the mass percentage of carbon in the equilibrium liquid phase of the target composition, at a temperature where the target composition is 50 vol % liquid. The infiltrant composition and the skeleton composition further are complementary relative to the target composition T. The method also includes infiltrating the skeleton with the infiltrant, at the infiltration temperature $T_{infil}$, the infiltration being driven primarily by capillary pressure, the infiltration temperature, the infiltrant composition and the skeleton composition further being such that: $T_{infil}$ is below a solidus temperature for the skeleton; $T_{infil}$ is above a liquidus temperature for the infiltrant; and at the infiltration temperature, $T_{intil}$, at chemical equilibrium, a body having the target composition T, has at least about 7% vol liquid, and is less than about 50% vol liquid. Such a method would include essentially any combination of infiltrant and skeleton discussed above for the D2 steel system, for packing fractions between 50 vol % and 70 vol %, for all modes between reverse slope and near tie line.

A further preferred embodiment is a method similar to that just mentioned, but where the infiltrant and skeleton compositions are in a complementary mode between that of a near tie-line and a basic mode. The step of providing a skeleton further comprises providing a skeleton of particles having a composition consisting essentially of: iron and the additional basic elements, each present in a respective mass percentage between approximately as specified in the column headed by the respective element symbol in: a row entitled Skeleton-A of the immediately following table:

|  | C | Cr | Mn | Mo | Ni | Si | V | Fe |
|---|---|---|---|---|---|---|---|---|
| Infiltrant - A | 3.50 | 12.00 | 0.6 max | 1.00 | 0.4 max | 0.6 max | 1.00 | bal |
| Skeleton - A | 0.30 | 12.00 | 0.6 max | 1.00 | 0.4 max | 0.6 max | 1.00 | bal | and in the row entitled Skeleton-B. Also present in the skeleton is Carbon, present in the same mass percentage just specified. The step of providing an infiltrant further comprises providing an infiltrant having a composition consisting essentially of: iron and the same additional basic elements each present in a respective mass percentage between approximately as specified in the column headed by the respective element symbol in: the row entitled Infiltrant-A; and the row entitled Infiltrant-B; and Carbon, present in the same infiltrant mass percentage just specified.

Still another preferred embodiment is similar to the last two, but is for CN-7MS Steel, but with silicon being the principal MPD, rather than carbon, where the corresponding table for the Infiltrant-D and Skeleton-D values, and the Infiltrant-B and Skeleton-B values is:

|  | C | Cr | Mn | Mo | Ni | Si | Cu | Fe |
|---|---|---|---|---|---|---|---|---|
| Target Range | 0.07 max | 18.0–20.0 | 1.5 max | 2.5–3.0 | 22.0–25.0 | 1.5 max | 1.5–2.0 | bal |
| Infiltrant - B | 0.11 | 21.51 | 1.5 max | 3.04 | 17.52 | 6.84 | 1.68 | bal |
| Skeleton - B | 0.02 | 17.53 | 1.5 max | 2.58 | 27.00 | 0.75 | 1.79 | bal |
| Infiltrant - D | 0.05 | 17.75 | 1.5 max | 2.61 | 26.49 | 6.92 | 1.79 | bal |
| Skeleton - D | 0.05 | 19.74 | 1.5 max | 2.84 | 21.75 | 0.71 | 1.73 | bal |

Further, for the modes between the near tie line and the basic modes, the corresponding table for the Infiltrant-A and Skeleton-A values is:

|  | C | Cr | Mn | Mo | Ni | Si | Cu | Fe |
|---|---|---|---|---|---|---|---|---|
| Infiltrant - A | 0.05 | 19.00 | 1.5 max | 2.75 | 23.50 | 6.84 | 1.75 | bal |
| Skeleton - A | 0.05 | 19.00 | 1.5 max | 2.75 | 23.50 | 0.75 | 1.75 | bal |

Yet another preferred embodiment is similar to the preceding four, but is for H13 Steel, with silicon and carbon being the principal elements of the MPD agent, rather than carbon or silicon alone. The corresponding table for the Infiltrant-D and Skeleton-D values, and the Infiltrant-B and Skeleton-B values is:

|  | C | Cr | Mn | Mo | Ni | Si | V | Fe |
|---|---|---|---|---|---|---|---|---|
| Target Range | 0.32–0.45 | 4.75–5.5 | 0.2–0.5 | 1.1–1.75 | 0.3 max | 0.8–1.0 | 0.8–1.0 | bal |
| Infiltrant - B | 0.88 | 5.73 | 0.33 | 1.80 | 0.3 max | 2.00 | 1.31 | bal |
| Skeleton - B | 0.05 | 4.78 | 0.33 | 1.18 | 0.3 max | 0.37 | 0.81 | bal |
| Infiltrant - D | 0.88 | 4.86 | 0.33 | 1.23 | 0.3 max | 2.09 | 0.85 | bal |
| Skeleton - D | 0.05 | 5.34 | 0.33 | 1.54 | 0.3 max | 0.31 | 1.10 | bal |

Moreover, for the modes between the near tie line and the basic modes, the corresponding table for the Infiltrant-A and Skeleton-A values is:

|  | C | Cr | Mn | Mo | Ni | Si | V | Fe |
|---|---|---|---|---|---|---|---|---|
| Infiltrant - A | 0.88 | 5.15 | 0.33 | 1.42 | 0.3 max | 2.00 | 1.00 | bal |
| Skeleton - A | 0.05 | 5.15 | 0.33 | 1.42 | 0.3 max | 0.37 | 1.00 | bal |

Yet another preferred embodiment is a method for designing a process for fabricating a steel part by infiltrating a skeleton of metal particles. The design method comprises the steps of: selecting a target bulk composition T of iron (Fe) and N additional basic elements $E_1$, $E_2$, ... $E_N$, where $N \geq 1$, each element present in a respective mass percentage $M_{1,T}$, $M_{2,T}$, ... $M_{N,T}$, and a melting point depressant (MPD) agent $E_{MPD}$, present in a mass percentage $M_{MPD,T}$; and selecting a particle type, having a representative size, and packing to a packing fraction $V_{PF}=V_K$, with a corresponding void fraction $V_V=100\%-V_K$. The process further entails determining a temperature, $T_{PF}$, at which the composition T has a solid portion $V_S$ equal in volume to $V_K$ and a liquid portion $V_L$ equal in volume to $V_V$. A tie line composition at $T_{PF}$ is determined for the solid and liquid portions, comprising mass percentages of each of the elements of the target composition T, the mass percentages designated: for the solid $M_{1,S}$, $M_{2,S}$, ... $M_{N,S}$ respectively, and the MPD agent $M_{MPD,S}$; and for the liquid $M_{1,L}$, $M_{2,L}$ ... $M_{N,L}$ respectively, and the MPD agent $M_{MPD,L}$. A mass percentage $M_S$, of the solid portion and a mass percentage $M_L$, of the liquid portion, is determined, where $M_S+M_L=100\%$. A skeleton and an infiltrant composition for the basic elements is determined, each comprising mass percentages of iron and each of the basic elements of the target composition T, the mass percentages designated, for the skeleton $M_{1,K}$, $M_{2,K}$, ... $M_{N,K}$ respectively and for the infiltrant designated $M_{1,I}$, $M_{2,I}$, ... $M_{N,I}$ respectively. A temperature range $T_{SAFE}$ is selected, and a skeleton solidus temperature, $T_{KS}$, equal to $T_{PF}+T_{SAFE}$ is also determined. A mass percent of the MPD agent in the skeleton, designated $M_{MPD,K}$, at $T_{KS}$ is established and a mass percent of the MPD agent in the infiltrant, designated $M_{MPD,I}$, at $T_{KS}$, such that $M_{MPD,I}=M_{MPD,K}+(M_{MPD,T}-M_{MPD,K})/M_I$, whereby the mass percentage of the MPD element in a product formed by infiltrating the skeleton with the infiltrant is equal to the target mass percentage of the MPD element $M_{MPD, T}$; An amount of solidification of infiltrant during infiltration, is selected, the amount designated $\Delta V$. The volume of solid upon any such solidification $V_S=V_K+\Delta V$ is calculated. An infiltration temperature $T_{infil}$ at which the target composition T has a solid volume fraction $V_S$ is proposed. The skeleton may be infiltrated at this temperature.

A related preferred embodiment further entails the steps of: determining a liquidus temperature $T_{IL}$, for the infiltrant composition of the basic elements in mass percentages $M_{1,I}$, $M_{2,I}$, ... $M_{N,I}$ and the MPD element in mass percentage $M_{MPD,I}$; and comparing the infiltrant liquidus temperature $T_{IL}$ to the proposed infiltration temperature $T_{infil}$. If $T_{IL}<T_{infil}$, then the skeleton can be infiltrated with the infiltrant composition at the proposed infiltration temperature $T_{infil}$. If $T_{IL} \geq T_{infil}$, then it is useful to reevaluate at least one of the parameters PF, $T_{SAFE}$, or $\Delta V$ and return to the step of selecting a particle type.

Specific preferred instances of the foregoing relate to different modes of complementarity. According to one, the step of determining a skeleton composition for the basic elements comprises assigning the mass percentages designated $M_{1,K}$, $M_{2,K}$, ... $M_{N,K}$ equal to the corresponding mass percentages of the basic elements in the target composition, $M_{1,T}$, $M_{2,T}$, ... $M_{N,T}$ respectively. Further, the step of determining an infiltrant composition for the basic elements, comprises assigning the mass percentages designated $M_{1,I}$, $M_{2,I}$, ... $M_{N,I}$ as follows: $M_{1,I}=M_{1,K}$; $M_{2,I}=M_{2,K}$; and $M_{N,I}=M_{N,K}$.

According to another mode of complementarity, the step of determining a skeleton composition for the basic elements comprises assigning the mass percentages equal to the corresponding mass percentages of the basic elements in the tie line solid portion composition, $M_{1,S}$, $M_{2,S}$, ... $M_{N,S}$ respectively; and the step of determining an infiltrant composition for the basic elements, comprises assigning the mass percentages as follows: $M_{1,I}=M_{1,K}+(M_{1,T}-M_{1,K})/M_L$; $M_{2,I}=M_{2,K}+(M_{2,T}-M_{2,K})/M_L$; and $M_{N,I}=M_{N,K}+(M_{N,T}-M_{N,K})/M_L$.

With still another mode of complementarity, a preferred method includes the step of determining a skeleton composition, comprising, for the basic elements, designating a respective factor $R_1$, $R_2$, ... $R_N$, where each $R_n$ factor $0 \leq R_n \leq 1$, and where at least one $R_n$ factor $0<R_n<1$. The mass are assigned percentages as follows; $M_{1,K}=M_{1,T}+R_1(M_{1,S}-M_{1,T})$; $M_{2,K}=M_{2,T}+R_2(M_{2,S}-M_{2,T})$; and $M_{N,K}=M_{N,T}+R_N(M_{N,S}-M_{N,T})$. The step of determining an infiltrant composition for the basic elements, comprises assigning the mass percentages as follows: $M_{1,I}=M_{1,K}+(M_{1,T}-M_{1,K})/M_L$; $M_{2,I}=M_{2,K}+(M_{2,T}-M_{2,K})/M_L$; and $M_{N,I}=M_{N,K}+(M_{N,T}-M_{N,K})/M_L$.

In even yet another mode of complementarity, a preferred method includes steps that are identical to that immediately mentioned, except that each $R_n$ factor $-1 \leq R_n \leq 0$, and where at least one $R_n$ factor $R_n < 0$.

Many techniques and aspects of the inventions have been described herein. The person skilled in the art will understand that many of these techniques can be used with other disclosed techniques, even if they have not been specifically described in use together. For instance, the techniques described with an MPD of C or Si, can be used with the other, or both. Conventional heat treating can be applied to such infiltrated parts.

This disclosure describes and discloses more than one invention. The inventions are set forth in the claims of this and related documents, not only as filed, but also as developed during prosecution of any patent application based on this disclosure. The inventors intend to claim all of the various inventions to the limits permitted by the prior art, as it is subsequently determined to be. No feature described herein is essential to each invention disclosed herein. Thus, the inventors intend that no features described herein, but not claimed in any particular claim of any patent based on this disclosure, should be incorporated into any such claim.

Some assemblies of hardware, or groups of steps, are referred to herein as an invention. However, this is not an admission that any such assemblies or groups are necessarily patentably distinct inventions, particularly as contemplated by laws and regulations regarding the number of inventions that will be examined in one patent application, or unity of invention. It is intended to be a short way of saying an embodiment of an invention.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's rule.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing the functions in combination with other claimed elements as specifically claimed.

What is claimed is:

1. A method for fabricating a steel part having a target bulk composition T of iron (Fe) and N additional basic elements $E_1, E_2, \ldots E_N$, where $N \geq 1$, each present in a respective mass percentage $M_{1,T}, M_{2,T}, \ldots M_{N,T}$, and a melting point depressant agent $E_{MPD}$, present in a mass percentage $M_{MPD,T}$, comprising the steps of:
   a. providing a skeleton of interconnected adhered metal particles having a network of interconnected porosities throughout, said particles packed at a packing fraction $V_{PF}$, said particles having a composition consisting essentially of:
      i. iron and said N basic elements $E_1, E_2, \ldots E_N$, each present in a respective mass percentage $M_{1,K}, M_{2,K}, \ldots M_{N,K}$; and
      ii. said Melting Point Depressant agent $E_{MPD}$, present in a mass percentage $M_{MPD,K}$;
   b. providing an infiltrant having a composition consisting essentially of:
      i. iron and said same N elements $E_1, E_2, \ldots E_N$, each present in a respective mass percentage $M_{1,I}, M_{2,I}, \ldots M_{N,I}$; and
      ii. said Melting Point Depressant agent $E_{MPD}$, present in a mass percentage $M_{MPD,I}$, where $M_{MPD,I} > M_{MPD,T} > M_{MPD,K}$;
   said infiltrant composition being complementary to said skeleton composition, relative to said bulk target composition T; and
   d. infiltrating said skeleton with said infiltrant, at an infiltration temperature $T_{infil}$, said infiltration being driven primarily by capillary pressure, said infiltration temperature, said infiltrant composition and said skeleton composition being such that:
      i. $T_{infil}$ is below a solidus temperature for said skeleton;
      ii. $T_{infil}$ is above a liquidus temperature for said infiltrant; and
      iii. at said infiltration temperature, $T_{infil}$, at chemical equilibrium, a body having said target composition T, has at least about 7 vol % liquid, and is less than about 50 vol % liquid.

2. The method of claim 1, said Melting Point Depressant agent $E_{MPD}$, further having relatively high diffusivity in said skeleton.

3. The method of claim 2, said Melting Point Depressant agent $E_{MPD}$, further having relatively high solubility in said skeleton.

4. The method of claim 2, said melting point depressant agent having a maximum solubility $M_{MPD-max}$ in iron (Fe), said melting point depressant mass percentage in said target composition $M_{MPD,T}$ being less than about $2*M_{MPD-max}$.

5. The method of claim 1, said Melting Point Depressant agent $E_{MPD}$, further having relatively high solubility in said skeleton.

6. The method of claim 1, said melting point depressant agent having a maximum solubility $M_{MPD-max}$ in iron (Fe), said melting point depressant mass percentage in said target composition $M_{MPD,T}$ being less than about $2*M_{MPD-max}$.

7. The method of claim 1, said melting point depressant element having a maximum solubility $M_{MPD-max}$ in iron (Fe), said melting point depressant mass percentage in said target composition $M_{MPD,T}$ being less than about $M_{MPD-max}$.

8. The method of claim 1, said melting point depressant agent comprising carbon (C).

9. The method of claim 1, said melting point depressant agent comprising silicon (Si).

10. The method of claim 1, said melting point depressant agent consisting essentially of C and Si.

11. The method of claim 1, said melting point depressant agent consisting essentially of elements selected from the group consisting of C and Si.

12. The method of claim 1, further comprising the step of subjecting said infiltrated skeleton to conditions such that a portion of said melting point depressant diffuses from said porosities into said metal particles, and at least partial diffusional solidification occurs.

13. The method of claim 12, further where at least 10% of said infiltrated infiltrant volume solidifies at said infiltration temperature $T_{infil}$.

14. The method of claim 1, said step of providing infiltrant comprising providing an infiltrant having a composition that is complementary to said composition of said skeleton with respect to said target bulk composition, in a mode that is between a near tie-line mode and a reverse slope mode.

15. The method of claim 1, said step of providing infiltrant comprising providing an infiltrant having a composition that is complementary to said composition of said skeleton with respect to said target bulk composition, in a mode that is between a near tie-line mode and a basic mode.

16. The method of claim 1, said step of providing infiltrant comprising providing an infiltrant having a composition that is complementary to said composition of said skeleton with respect to said target bulk composition, in an off tie-line mode.

17. The method of claim 16, said target bulk composition comprising a steel selected from the group consisting of: H13, S6 And ACI-HF.

18. The method of claim 1, said melting point depressant agent consisting essentially of carbon.

19. The method of claim 18, said target bulk composition comprising a steel selected from the group consisting of: D2, M2, 440C, Austenitic Manganese Grade C, A3, 06, 410 and T8.

20. The method of claim 1, said melting point depressant agent consisting essentially of silicon.

21. The method of claim 19, said target bulk composition comprising CN-7MS.

22. The method of claim 19, said target bulk composition comprising CF-10SMnN.

23. The method of claim 1, said steel target composition comprising D2.

24. The method of claim 1, said steel target composition comprising M2.

25. The method of claim 1, said steel target composition comprising 440C.

26. The method of claim 1, said steel target composition comprising Austenitic Manganese Grade C.

27. The method of claim 1, said steel target composition comprising A3.

28. The method of claim 1, said steel target composition comprising 06.

29. The method of claim 1, said steel target composition comprising T8.

n=1 to N: $M_{n,K}=M_{n,T}+R_n*(M_{n,S}-M_{n,T})$, with $-1 \leq R_n \leq 1$ for each basic additional element;

c. said melting point depressant agent is present in said infiltrant in a mass percentage as follows: $M_{MPD,I}=(M_{MPD,K}+(M_{MPD,T}-M_{MPD,K})/M_I$; and d. said N basic additional elements are present in said infiltrant in respective mass percentages, as follows, for n=1 to N: $M_{n,I}=M_{n,T}+R_n*(M_{n,L}-M_{n,T})$, with $-1 \leq R_n \leq 1$ for each basic additional element;

wherein said variables are used as defined in the specification hereof.

31. The method of claim 30, further wherein, for both said basic additional elements present in said skeleton and said infiltrant, $0 \leq R_n \leq 1$ for each basic additional element.

32. The method of claim 1, said melting point depressant agent having a diffusivity in said skeleton at 1100° C. of greater than $2 \times 10^{-15}$ cm$^2$/sec.

33. The method of claim 1, said melting point depressant agent having a diffusivity in said skeleton at 1100° C. of greater than $4 \times 10^{-16}$ cm$^2$/sec.

34. The method of claim 1, said skeleton comprising particles of a nominal diameter L said diffusivity D of said melting point depressant agent being such that a Metric=$L^2/D$ is less than or equal to approximately $1.4 \times 10^6$ seconds.

35. The method of claim 1, further comprising the step of maintaining said skeleton after infiltration at said infiltration temperature for a period of time less than fifteen hours, said melting point depressant having a diffusivity such that substantial homogeneity is achieved.

36. The method of claim 1, further comprising the step of maintaining said skeleton after infiltration at said infiltration temperature for a period of time less than 3 hours, said melting point depressant having a diffusivity such that substantial homogeneity is achieved.

37. The method of claim 1, further comprising the step of maintaining said skeleton after infiltration at an austenitizing temperature for a period of time less than 3 hours, said melting point depressant having a diffusivity such that substantial homogeneity is achieved.

38. A method for fabricating a steel part having a target bulk composition T as set forth in the row entitled Target range in the immediately following table:

|  | C | Cr | Mn | Mo | Ni | Si | V | Fe |
|---|---|---|---|---|---|---|---|---|
| Target Range | 1.4–1.6 | 11–13 | 0.6 max | 0.7–1.0 | 0.3 max | 0.6 max | 1.1 max | balance |
| Infiltrant - B | 3.50 | 17.20 | 0.6 max | 2.0 | 0.3 max | 0.6 max | 2.30 | balance |
| Skeleton - B | 0.30 | 9.76 | 0.6 max | 0.57 | 0.3 max | 0.6 max | 0.48 | balance |
| Infiltrant - D | 3.79 | 9.84 | 0.6 max | 0.58 | 0.3 max | 0.6 max | 0.46 | balance |
| Skeleton - D | 0.13 | 12.93 | 0.6 max | 1.18 | 0.3 max | 0.6 max | 1.22 | balance |

30. The method of claim 1, further wherein:

a. said melting point depressant agent is present in said skeleton in a mass percentage $M_{MDP,K}$ between zero and the mass percentage of said melting point depressant agent in an equilibrium solid phase at a temperature where the target composition is 93 vol % solid;

b. said N basic additional elements are present in said skeleton in respective mass percentages, as follows, for of iron (Fe) and carbon, present in a mass percentage within a range as specified in a column headed by symbol C, and additional basic elements listed, each present in a respective mass percentage within a range set forth in a column headed by said respective element symbol, said method of fabricating comprising the steps of:

a. providing a skeleton of interconnected adhered metal particles having a network of interconnected porosities throughout, said particles packed at a packing fraction $V_{PF}$, said particles having a composition consisting essentially of:
  i. iron and said additional basic elements each present in a respective mass percentage between those as specified in a column headed by said respective element symbol in: a row entitled Skeleton-B; and a row entitled Skeleton-D; and
  ii. Carbon, present in a mass percentage between zero and the mass percentage of carbon in an equilibrium solid phase at a temperature where said target composition T is 93 vol % solid;
b. providing an infiltrant having a composition consisting essentially of:
  i. iron and said same additional basic elements each present in a respective mass percentage between approximately as specified in a column headed by said respective element symbol in: a row entitled Infiltrant-B; and a row entitled Infiltrant-D; and
  ii. Carbon, present in a mass percentage of at least the mass percentage of carbon in an equilibrium liquid phase, at a temperature where the target composition is 50 vol % liquid;
  said infiltrant composition and said skeleton composition further being complementary relative to said target composition T; and
c. infiltrating said skeleton with said infiltrant, at said infiltration temperature $T_{infil}$, said infiltration being driven primarily by capillary pressure, said infiltration temperature, said infiltrant composition and said skeleton composition further being such that:

|  | C | Cr | Mn | Mo | Ni | Si | V | Fe |
|---|---|---|---|---|---|---|---|---|
| Infiltrant - A | 3.50 | 12.00 | 0.6 max | 1.00 | 0.4 max | 0.6 max | 1.00 | balance |
| Skeleton - A | 0.30 | 12.00 | 0.6 max | 1.00 | 0.4 max | 0.6 max | 1.00 | balance | and in said row entitled Skeleton-B; and
  ii. Carbon, present in said mass percentage between zero and the mass percentage of carbon in an equilibrium solid phase at a temperature where said target composition T is 93 vol % solid;
b. said step of providing an infiltrant further comprising providing an infiltrant having a composition consisting essentially of:
  i. iron and said same additional basic elements each present in a respective mass percentage between approximately as specified in said column headed by said respective element symbol in: said row entitled Infiltrant-A; and said row entitled Infiltrant-B; and
  ii. Carbon, present in said mass percentage of at least the mass percentage of carbon in an equilibrium liquid phase, at a temperature where the target composition is 50 vol % liquid.

40. A method for fabricating a steel part having a target bulk composition T as set forth in the row entitled Target range in the immediately following table:

|  | C | Cr | Mn | Mo | Ni | Si | V | Fe |
|---|---|---|---|---|---|---|---|---|
| Target Range | 0.32–0.45 | 4.75–5.5 | 0.2–0.5 | 1.1–1.75 | 0.3 max | 0.8–1.0 | 0.8–1.0 | bal |
| Infiltrant - B | 0.88 | 5.73 | 0.33 | 1.80 | 0.3 max | 2.00 | 1.31 | bal |
| Skeleton - B | 0.05 | 4.78 | 0.33 | 1.18 | 0.3 max | 0.37 | 0.81 | bal |
| Infiltrant - D | 0.88 | 4.86 | 0.33 | 1.23 | 0.3 max | 2.09 | 0.85 | bal |
| Skeleton - D | 0.05 | 5.34 | 0.33 | 1.54 | 0.3 max | 0.31 | 1.10 | bal | i. $T_{infil}$ is below a solidus temperature for said skeleton;
  ii. $T_{infil}$ is above a liquidus temperature for said infiltrant; and
  iii. at said infiltration temperature, $T_{infil}$, at chemical equilibrium, a body having said target composition T, has at least about 7% vol liquid, and is less than about 50% vol liquid.

39. The method of claim 38, further wherein:
a. said step of providing a skeleton further comprising providing a skeleton of particles having a composition consisting essentially of:
  i. iron and said additional basic elements, each present in a respective mass percentage between approximately as specified in said column headed by said respective element symbol in: a row entitled Skeleton-A of the immediately following table:

of iron (Fe) and Silicon, present in a mass percentage within a range as specified in a column headed by symbol Si, and Carbon, present in a mass percentage within a range as specified in a column headed by symbol C, and additional basic elements listed, each present in a respective mass percentage within a range set forth in a column headed by said respective element symbol, said method of fabricating comprising the steps of:
a. providing a skeleton of interconnected adhered metal particles having a network of interconnected porosities throughout, said particles packed at a packing fraction $V_{PF}$, said particles having a composition consisting essentially of:
  i. iron and said additional basic elements each present in a respective mass percentage between those as specified in a column headed by said respective element symbol in: a row entitled Skeleton-B; and a row entitled Skeleton-D; and
  ii. Silicon and Carbon, each present in a mass percentage between zero and the mass percentage of silicon and carbon, respectively, in an equilibrium solid phase at a temperature where said target composition T is 93 vol % solid;

b. providing an infiltrant having a composition consisting essentially of:
  i. iron and said same additional basic elements each present in a respective mass percentage between approximately as specified in a column headed by said respective element symbol in: a row entitled Infiltrant-B; and a row entitled Infiltrant-D; and
  ii. silicon and Carbon, each present in a mass percentage of at least the mass percentage of silicon and carbon, respectively, in an equilibrium liquid phase, at a temperature where the target composition is 50 vol % liquid;
  said infiltrant composition and said skeleton composition further being complementary relative to said target composition T; and c. infiltrating said skeleton with said infiltrant, at said infiltration temperature $T_{infil}$, said infiltration being driven primarily by capillary pressure, said infiltration temperature, said infiltrant composition and said skeleton composition further being such that:
  i. $T_{infil}$ is below a solidus temperature for said skeleton;
  ii. $T_{infil}$ is above a liquidus temperature for said infiltrant; and
  iii. at said infiltration temperature, $T_{infil}$, at chemical equilibrium, a body having said target composition T, has at least about 7% vol liquid, and is less than about 50% vol liquid.

41. The method of claim 40, further wherein:
a. said step of providing a skeleton further comprising providing a skeleton of particles having a composition consisting essentially of:
  i. iron and said additional basic elements, each present in a respective mass percentage between approximately as specified in said column headed by said respective element symbol in: a row entitled Skeleton-A of the immediately following table:

|  | C | Cr | Mn | Mo | Ni | Si | V | Fe |
|---|---|---|---|---|---|---|---|---|
| Infiltrant - A | 0.88 | 5.15 | 0.33 | 1.42 | 0.3 max | 2.00 | 1.00 | balance |
| Skeleton - A | 0.05 | 5.15 | 0.33 | 1.42 | 0.3 max | 0.37 | 1.00 | balance | and in said row entitled Skeleton-B; and
  ii. Silicon and Carbon, each present in a mass percentage between zero and the mass percentage of silicon and carbon, respectively, in an equilibrium solid phase at a temperature where said target composition T is 93 vol % solid;

b. said step of providing an infiltrant further comprising providing an infiltrant having a composition consisting essentially of:
  i. iron and said same additional basic elements each present in a respective mass percentage between approximately as specified in said column headed by said respective element symbol in: said row entitled Infiltrant-A; and said row entitled Infiltrant-B; and
  ii. silicon and Carbon, each present in a mass percentage of at least the mass percentage of silicon and carbon, respectively, in an equilibrium liquid phase, at a temperature where the target composition is 50 vol % liquid.

42. A method for fabricating a steel part having a target bulk composition T as set forth in the row entitled Target range in the immediately following table:

|  | C | Cr | Mn | Mo | Ni | Si | Cu | Fe |
|---|---|---|---|---|---|---|---|---|
| Target Range | 0.07 max | 18.0–20.0 | 1.5 max | 2.5–3.0 | 22.0–25.0 | 1.5 max | 1.5–2.0 | bal |
| Infiltrant - B | 0.11 | 21.51 | 1.5 max | 3.04 | 17.52 | 6.84 | 1.68 | bal |
| Skeleton - B | 0.02 | 17.53 | 1.5 max | 2.58 | 27.00 | 0.75 | 1.79 | bal |
| Infiltrant - D | 0.05 | 17.75 | 1.5 max | 2.61 | 26.49 | 6.92 | 1.79 | bal |
| Skeleton - D | 0.05 | 19.74 | 1.5 max | 2.84 | 21.75 | 0.71 | 1.73 | bal | of iron (Fe) and silicon, present in a mass percentage within a range as specified in a column headed by symbol Si, and additional basic elements listed, each present in a respective mass percentage within a range set forth in a column headed by said respective element symbol said method of fabricating comprising the steps of:

a. providing a skeleton of interconnected adhered metal particles having a network of interconnected porosities throughout, said particles packed at a packing fraction $V_{PF}$, said particles having a composition consisting essentially of:
  i. iron and said additional basic elements each present in a respective mass percentage between those as specified in a column headed by said respective element symbol in: a row entitled Skeleton-B; and a row entitled Skeleton-D; and
  ii. silicon, present in a mass percentage between zero and the mass percentage of silicon in an equilibrium solid phase at a temperature where said target composition T is 93 vol % solid;

b. providing an infiltrant having a composition consisting essentially of:

i. iron and said same additional basic elements each present in a respective mass percentage between approximately as specified in a column headed by said respective element symbol in: a row entitled Infiltrant-B; and a row entitled Infiltrant-D; and ii. silicon, present in a mass percentage of at least the mass percentage of silicon in an equilibrium liquid phase, at a temperature where the target composition is 50 vol % liquid;

said infiltrant composition and said skeleton composition further being complementary relative to said target composition T; and c. infiltrating said skeleton with said infiltrant, at said infiltration temperature $T_{infil}$, said infiltration being driven primarily by capillary pressure, said infiltration temperature, said infiltrant composition and said skeleton composition further being such that:

i. $T_{infil}$ is below a solidus temperature for said skeleton;

ii. $T_{infil}$ is above a liquidus temperature for said infiltrant; and iii. at said infiltration temperature, $T_{infil}$, at chemical equilibrium, a body having said target composition T, has at least about 7% vol liquid, and is less than about 50% vol liquid.

43. The method of claim 42, further wherein:

a. said step of providing a skeleton further comprising providing a skeleton of particles having a composition consisting essentially of:

i. iron and said additional basic elements, each present in a respective mass percentage between approximately as specified in said column headed by said respective element symbol in: a row entitled Skeleton-A of the immediately following table:

|  | C | Cr | Mn | Mo | Ni | Si | Cu | Fe |
|---|---|---|---|---|---|---|---|---|
| Infiltrant - A | 0.05 | 19.00 | 1.5 max | 2.75 | 23.50 | 6.84 | 1.75 | bal |
| Skeleton - A | 0.05 | 19.00 | 1.5 max | 2.75 | 23.50 | 0.75 | 1.75 | bal | and in said row entitled Skeleton-B; and ii. silicon, present in said mass percentage between zero and the mass percentage of silicon in an equilibrium solid phase at a temperature where said target composition T is 93 vol % solid;

b. said step of providing an infiltrant further comprising providing an infiltrant having a composition consisting essentially of:

i. iron and said same additional basic elements each present in a respective mass percentage between approximately as specified in said column headed by said respective element symbol in: said row entitled Infiltrant-A; and said row entitled Infiltrant-B; and ii. silicon, present in said mass percentage of at least the mass percentage of silicon in an equilibrium liquid phase, at a temperature where the target composition is 50 vol % liquid.

* * * * *